US012410688B2

(12) United States Patent
Benson et al.

(10) Patent No.: US 12,410,688 B2
(45) Date of Patent: Sep. 9, 2025

(54) SYSTEMS AND TECHNIQUES FOR POWER MANAGEMENT

(71) Applicant: Helmerich & Payne Technologies, LLC, Tulsa, OK (US)

(72) Inventors: Todd W. Benson, Dallas, TX (US); Richard Kulavik, Frisco, TX (US)

(73) Assignee: Helmerich & Payne Technologies, LLC, Tulsa, OK (US)

( * ) Notice: Subject to any disclaimer, the term of this patent is extended or adjusted under 35 U.S.C. 154(b) by 0 days.

(21) Appl. No.: 17/454,248

(22) Filed: Nov. 9, 2021

(65) Prior Publication Data

US 2022/0145730 A1 May 12, 2022

Related U.S. Application Data

(60) Provisional application No. 63/191,809, filed on May 21, 2021, provisional application No. 63/144,336,
(Continued)

(51) Int. Cl.
*E21B 41/00* (2006.01)
*B60R 16/033* (2006.01)
*H02J 3/00* (2006.01)

(52) U.S. Cl.
CPC ........ *E21B 41/0085* (2013.01); *B60R 16/033* (2013.01); *H02J 3/003* (2020.01)

(58) Field of Classification Search
CPC ..... E21B 41/0085; H02J 3/003; B60R 16/033
(Continued)

(56) References Cited

U.S. PATENT DOCUMENTS

2006/0276938 A1   12/2006   Miller
2009/0195074 A1   8/2009   Buiel
(Continued)

FOREIGN PATENT DOCUMENTS

| CN | 109101703 B | * | 7/2022 | ............ G06F 30/20 |
| WO | 2019165335 A1 | | 8/2019 | |
| WO | WO-2019232515 A1 | * | 12/2019 | ........... G05B 19/042 |

OTHER PUBLICATIONS

PCT/US2021/072311, "International Search Report and Written Opinion", Apr. 5, 2022, 11 pages.
(Continued)

*Primary Examiner* — Daniel Kessie
*Assistant Examiner* — Dru M Parries
(74) *Attorney, Agent, or Firm* — Kilpatrick Townsend & Stockton LLP

(57) ABSTRACT

A power controller may monitor a power required by each of a plurality of power loads coupled to a power distribution bus. The power loads can include a plurality of devices for oil and gas exploration or production. The devices can include a plurality of drilling rigs or equipment associated with one or more of the drilling rigs. The power controller may monitor the power supplied by each of a plurality of power sources coupled to the power distribution bus. The power sources can include power from any two or more of the following: an electric utility, an electric grid, a natural gas turbine, a battery, a solar power generator, a wind generator, and a geothermal generator. The power controller may adjust the power supplied to a first one of the plurality of power loads based at least in part on a first one of the plurality of power loads.

19 Claims, 21 Drawing Sheets

Related U.S. Application Data filed on Feb. 1, 2021, provisional application No. 63/112,083, filed on Nov. 10, 2020.

(58) Field of Classification Search
USPC .......................................................... 307/9.1
See application file for complete search history.

(56) References Cited

U.S. PATENT DOCUMENTS

| | | |
|---|---|---|
| 2009/0312885 A1 | 12/2009 | Buiel |
| 2011/0074165 A1 | 3/2011 | Grimes et al. |
| 2014/0175881 A1 | 6/2014 | Creed |
| 2020/0144853 A1 | 5/2020 | Andersen et al. |
| 2021/0310333 A1* | 10/2021 | Althowiqeb ............ E21B 17/22 |
| 2022/0074297 A1* | 3/2022 | Zheng ..................... E21B 44/00 |

OTHER PUBLICATIONS

PCT/US2021/072311, "Invitation to Pay Additional Fees and, Where Applicable, Protest Fee", Jan. 20, 2022, 2 pages.

Bilgin, et al., "World's First Hybrid Drilling Rig", Society of Petroleum Engineers, Available online At: https://onepetro.org/SPEDC/proceedings-abstract/20DC/2-20DC/D091S008R002/447239?redirectedFrom=PDF, Feb. 25, 2020, 19 pages.

International Application No. PCT/US2021/072311, "International Preliminary Report on Patentability", May 25, 2023, 8 pages.

EP21893062.6, "Extended European Search Report", Nov. 19, 2024, 9 pages.

* cited by examiner

SYSTEMS AND TECHNIQUES FOR POWER MANAGEMENT

CROSS-REFERENCES TO RELATED APPLICATIONS

This application claims priority to U.S. Provisional Application No. 63/112,083, filed Nov. 10, 2020 entitled "Power Automation and Control" the disclosure of which is incorporated by reference in its entirety and for all purposes. This application claims priority to U.S. Provisional Application No. 63/144,336, filed Feb. 1, 2021 entitled "Systems And Techniques For Controlling MicroGrids" the disclosure of which is incorporated by reference in its entirety and for all purposes. This application claims priority to U.S. Provisional Application No. 63/191,809, filed May 21, 2021 entitled "Systems And Techniques For Controlling MicroGrids" the disclosure of which is incorporated by reference in its entirety and for all purposes.

BACKGROUND

Electrical power at remote drilling locations can include utility power, remote power generation systems, portable battery power (which can be portable, fixed, or a combination thereof), and renewable energy sources. The demand for electrical power can also vary based on current operations at the oil field. Peak electrical power load demands can exceed available electrical power sources if not properly managed and scheduled. Oil drilling operations can take advantage of available natural gas byproducts of oil drilling operations to reduce demand for electrical energy from other sources (e.g., utility power). As drilling operations transition to full automation, techniques for improving power generation and control can be implemented for drilling.

BRIEF SUMMARY

Certain embodiments of the present invention can provide methods, systems, and apparatuses for electrical power generation and control for drilling rig systems. A mobile power device is also disclosed.

In some aspects, a system for electrical power generation and control includes: a controller comprising a processor; a memory coupled to the processor, wherein the memory comprises a plurality of instructions executable by the processor to perform operations comprising: receiving information regarding current electrical power requirements for a drilling rig based at least in part on oil field operations; receiving information regarding projected electrical power requirements for the drilling rig based at least in part on the oil field operations; determining a current power generation capacity for an electrical power source; and determining one or more actions based on a plurality of factors to optimize power generation and load requirements for the drilling rig.

In some aspects, the one or more actions delay one or more oil field operations that cause a spike in the current power requirements.

In some aspects, the one or more actions reduce a power requirement of an electrical power driven system until a generator is activated or a power storage device is charged above a threshold power level.

In some aspects, the one or more actions include adjusting the current power generation capacity in anticipation of a pending load transition.

In some aspects, the adjusting the current power generation capacity includes reducing an output of a power generation system when the pending load transition is to a state of lower current requirement.

In some aspects, the adjusting the current power generation capacity includes increasing an output of a power generation system when the pending load transition is to a state of higher current requirements.

In some aspects, a method comprising: receiving information regarding current electrical power requirements for a drilling rig based at least in part on oil field operations; receiving information regarding projected electrical power requirements for the drilling rig based at least in part on the oil field operations; determining a current power generation capacity for an electrical power source; and determining one or more actions based on a plurality of factors to optimize power generation and load requirements for the drilling rig.

In some aspects, the projected electrical power requirements for the drilling rig is based at least in part on stored historical load profiles.

In some aspects, the plurality of factors include at least one of a commercial loss of rig productivity, an impact to well bore placement and quality, an impact to ESG emissions, an impact to fuel consumption for power generation systems, and an impact to rig safety.

In some aspects, the method includes generating power using regenerative power techniques by converting kinetic energy of the drilling rig into electrical energy for charging a power storage device of the drilling rig.

In some aspects, the operations further comprise: determining a time for generating power using regenerative power techniques based at least in part in current operations or forecast operations of an oil field.

In some aspects, the operations further comprise: adjusting generator output during the time for generating power using regenerative power techniques.

In some aspects, the method includes determining a charge state of the power storage device prior to generating power using regenerative power techniques; comparing the charge state of the power storage device with a charge threshold; and ceasing the generating power using regenerative power techniques if the charge state of the power storage device exceeds the charge threshold.

In some aspects, the method includes applying a resistive load to convert unnecessary electrical power into heat.

In some aspects, the method includes diverting excess power capacity to other electrical systems without passing through the power storage device.

In some aspects, the operations further comprise: determining that the current electrical power requirements or the projected electrical power requirements will exceed the current power generation capacity.

In some aspects, a mobile power device includes: a chassis connected to a vehicle body comprising one or more power storage units; a power control system electrically connected to the one or more power storage units; and a docking interface to connect the one or more power storage units to an external load.

In some aspects, a power generation system configured to charge the one or more power storage units.

In some aspects, the power generation system comprises at least one of a mechanical power charging system, a hydrocarbon fuel based generator, or a capacitor system, or any combination thereof.

In some aspects, the docking interface is configured to power at least one of a crane, a suction pump, a fork lift, a front end elevator, and any combination thereof.

In some aspects, the one or more power storage units provides electrical power for an electrical motor in the chassis that allows the mobile power device to move under its own power.

In some aspects, a method for electrical power generation and control includes: determining a battery charge level for a rechargeable power source; comparing the battery charge level with a threshold power level; and postponing charging the rechargeable power until the battery charge level is below the threshold power level for a threshold time period.

In some aspects, the method includes receiving information relating to one or more oil field operations; determining a recovery time following the one more oil field operations, the recovery time allows the rechargeable power source to stabilize from a pulse cycle; delaying measurement of the battery charge level until after the recovery time.

In some aspects, the method includes receiving information on a current life cycle of the rechargeable power source; and adjusting a charging threshold for charging the rechargeable power source based at least in part on the current life cycle.

In some aspects, the method includes receiving information relating to a state of a rig during one or more oil field operations; and determine an optimal time to recharge the rechargeable power source based at least in part on the information.

In some aspects, the method includes receiving information relating to a state of a rig during one or more oil field operations within a predetermined time history, the state of the rig provides information on a chemistry of the rechargeable power source; determining a rate for recharging the rechargeable power source based at least in part on the received information; and adjusting the recharging of the rechargeable power source to the determined rate.

In some aspects, the method includes receiving information relating to a state of a rig during one or more oil field operations; determining a minimum safe charge level for the rechargeable power source based at least in part on the state of the rig; and setting a threshold for recharging the rechargeable power source above the minimum safe charge level.

In some aspects, the method includes determining a temperature of the rechargeable power source; and adjusting the temperature of the rechargeable power source based at least in part on the determined temperature.

Other embodiments of the invention are directed to systems, apparatus, and computer readable media associated with methods described herein. In one embodiment, the computer readable medium contains instructions for receiving data and analyzing data, but not instructions for directing a machine to create the data (e.g. sequencing nucleic acid molecules). In another embodiment, the computer readable medium does contain instructions for directing a machine to create the data. In one embodiment, a computer program product comprises a computer readable medium storing a plurality of instructions for controlling a processor to perform an operation for methods described herein. Embodiments are also directed to computer systems configured to perform the steps of any of the methods described herein, potentially with different components performing a respective step or a respective group of steps.

Reference to the remaining portions of the specification, including the drawings and claims, will realize other features and advantages of embodiments of the present invention. Further features and advantages, as well as the structure and operation of various embodiments of the present invention, are described in detail below with respect to the accompanying drawings. In the drawings, like reference numbers can indicate identical or functionally similar elements.

Certain embodiments of the present disclosure can provide methods, systems, and apparatuses for electrical power generation and control for drilling rig systems.

In some aspects, a method includes: monitoring a power required by each of a plurality of power loads coupled to a power distribution bus, wherein the plurality of power loads comprise a plurality of devices for oil and gas exploration or production, wherein the plurality of devices include a plurality of drilling rigs or equipment associated with one or more of the drilling rigs, pump jacks, hydraulic fracturing equipment; monitoring the power supplied by each of a plurality of power sources coupled to the power distribution bus, wherein the plurality of power sources include power from any two or more of the following: an electric utility, an electric grid, a natural gas turbine, a battery, a solar power generator, and a wind power generator, and a geothermal power generator; and adjusting an amount of power supplied to a first one of the plurality of power loads based at least in part on a first one of the plurality of power loads, wherein adjusting comprises at least one of increasing or decreasing, wherein the plurality of power loads and power sources are located within a geographic region. The geographic region may vary in size for any one of a variety of reasons, including topography, proximity to the same basin for oil and gas exploration or production, and due to other available power sources outside the region or inside the region. In some cases, the geographic region may be just one or a few miles in diameter, or may be as large as 10, 20, 50, or 100 miles in diameter. It is anticipated that connecting various power loads and power sources within a MicroGrid as described herein may require installing transmission lines, and the need for such lines may further define the appropriate size of a particular MicroGrid.

In some aspects, the plurality of power sources further comprise one or more natural gas turbine generators, each coupled to a natural gas source, which may for example be a well associated with a drilling rig or a well associated with a pump jack. It should be noted that a pump jack is just one example of a potential lifting system and the term "pump jack" should be understood herein to refer to any artificial lift system to lift oil and/or gas from a well. Gas could also be supplied by a natural gas tank or the like.

In some aspects, the method includes receiving data from each of the plurality of power loads regarding upcoming operations of the respective one of the plurality of power loads and a timing thereof; and responsive to the data received from the plurality of power loads, increasing the amount of power supplied to at least one of the plurality of power loads so that the at least one of the plurality of power loads will have additional power for the upcoming operations when needed by the at least one of the plurality of power loads.

In some aspects, the method includes determining an amount of power potentially available from each of the plurality of power sources; determining which one or more of the plurality of power sources provides power with less environmental impact than other of the plurality of power sources; and selecting the one or more of the plurality of power sources with less environmental impact to provide the amount of power supplied to the plurality of power loads.

In some aspects, the environmental impact comprises at least one of a calculated carbon footprint, a number of particulates introduced into an environment, and a net energy consumption.

In some aspects, the method includes determining the amount of power potentially available from each of the plurality of power sources; determining which one or more of the plurality of power sources provides power with less noise than other of the plurality of power sources; and selecting the one or more of the plurality of power sources with less noise to provide the amount of power supplied to the plurality of power loads.

In some aspects, a power control system for a local power grid system includes: a processor; a memory coupled to the processor, wherein the memory stores instructions executable by the processor for: receiving information from a plurality of power sources coupled to form a power grid, wherein the power sources comprise one or more natural gas turbine generators, one or more batteries, one or more solar power generators, one or more wind power generators, one or more geothermal power generators, a second power grid, or a power generation facility of a utility; receiving information from a plurality of power loads, wherein the plurality of power loads comprise one or more drilling rigs or equipment for drilling, one or more pump jacks, one or more items of equipment for hydraulic fracturing, and wherein the plurality of power loads are located within a 50 mile diameter of one another; responsive to information received from one or more of the plurality of power loads, determining that at least one of the plurality of power loads will either increase its power consumption or decrease its power consumption, and a timing of the increase or decrease; and responsive to the timing of the increase or decrease, determining when to add more power to a power distribution bus coupled to the plurality of power sources and power loads or to decrease the power supplied to a distribution bus.

In some aspects, the instructions further comprise instructions for determining a desired operating capacity for a natural gas turbine generator responsive to the determining of when to add more power or decrease the power supplied.

In some aspects, the instructions further comprise instructions for sending a control signal to one or more pump jacks or one or more drilling rigs to provide natural gas to the natural gas turbine generator and an amount thereof.

In some aspects, a non-transitory computer-readable medium storing a set of instructions includes: one or more instructions that, when executed by one or more processors of a power control system, cause the power control system to: monitor a power required by each of a plurality of power loads coupled to a power distribution bus, wherein the plurality of power loads comprise a plurality of devices for oil and gas exploration or production, wherein the plurality of devices include a plurality of drilling rigs or equipment associated with one or more of the drilling rigs, pump jacks, hydraulic fracturing equipment; monitor the power supplied by each of a plurality of power sources coupled to a power distribution bus, wherein the plurality of power sources include power from any two or more of the following: an electric utility, an electric grid, a natural gas turbine, a battery, a solar power generator, and a wind power generator, and a geothermal power generator; and adjust an amount of power supplied to a first one of the plurality of power loads based at least in part on a first one of the plurality of power loads, wherein adjusting comprises at least one of increasing or decreasing, wherein the plurality of power loads and power sources are located within a geographic region of less than 100 miles in diameter.

In some aspects, the plurality of power sources further comprise one or more natural gas turbine generators, each coupled to a natural gas source associated with a drilling rig or a pump jack.

In some aspects, the one or more instructions further cause the power control system to: receive data from each of the plurality of power loads regarding upcoming operations of the respective plurality of power loads and a timing thereof; and responsive to the data received from the plurality of power loads, increasing the amount of power supplied to at least one of the plurality of power loads so that the at least one of the plurality of power loads will have sufficient power for an upcoming operation when needed by the at least one of the plurality of power loads.

In some aspects, the one or more instructions further cause the power control system to: determine an amount of power potentially available from each of the plurality of power sources; determine which one or more of the plurality of power sources provides power with less environmental impact than other of the plurality of power sources; and select the one or more of the plurality of power sources with less environmental impact to provide the amount of power supplied to the plurality of power loads.

In some aspects, the environmental impact comprises at least one of a calculated carbon footprint, a number of particulates introduced into an environment, and a net energy consumption.

In some aspects, the one or more instructions further cause the power control system to: determine the amount of power potentially available from each of the plurality of power sources; determine which one or more of the plurality of power sources provides power with less noise than other of the plurality of power sources; and select the one or more of the plurality of power sources with less noise to provide the amount of power supplied to the one or more of the plurality of power loads.

In some aspects, a power control system includes: one or more memories; and one or more processors, communicatively coupled to the one or more memories, configured to: monitor a power required by each of a plurality of power loads coupled to a power distribution bus, wherein the plurality of power loads comprise a plurality of devices for oil and gas exploration or production, wherein the plurality of devices include a plurality of drilling rigs or equipment associated with one or more of the drilling rigs, pump jacks, hydraulic fracturing equipment; monitor the power supplied by each of a plurality of power sources coupled to the power distribution bus, wherein the plurality of power sources include power from any two or more of the following: an electric utility, an electric grid, a natural gas turbine, a battery, a solar power generator, and a wind power generator, and a geothermal power generator; and adjust an amount of power supplied to a first one of the plurality of power loads based at least in part on a first one of the plurality of power loads, wherein adjusting comprises at least one of increasing or decreasing, wherein the plurality of power loads and power sources are located within a geographic region of less than 100 miles in diameter.

In some aspects, the plurality of power sources further comprise one or more natural gas turbine generators, each coupled to a natural gas source associated with a drilling rig or a pump jack.

In some aspects, the one or more processors are further configured to: receive data from the plurality of power loads regarding upcoming operations of each of the plurality of power loads and a timing thereof; and responsive to the data received from the plurality of power loads, increasing the amount of power supplied to at least one of the plurality of power loads so that the at least one of the plurality of power loads will have sufficient power for an upcoming operation when needed by the at least one of the plurality of power loads.

In some aspects, the one or more processors are further configured to: determine an amount of power potentially available from each of the plurality of power sources; determine which one or more of the plurality of power sources provides power with less environmental impact than other of the plurality of power sources; and select the one or more of the plurality of power sources with less environmental impact to provide the amount of power supplied to the at least one of the plurality of power loads.

In some aspects, the environmental impact comprises at least one of a calculated carbon footprint, a number of particulates introduced into an environment, and a net energy consumption.

In some aspects, the one or more processors are further configured to: determine the amount of power potentially available from each of the plurality of power sources; determine which one or more of the plurality of power sources provides power with less noise than other of the plurality of power sources; and select the one or more of the plurality of power sources with less noise to provide the amount of power supplied to the at least one of the plurality of power loads.

Other embodiments of the disclosure are directed to systems, apparatus, and computer readable media associated with methods described herein. In one embodiment, the computer readable medium contains instructions for receiving data and analyzing data, but not instructions for directing a machine to create the data (e.g. sequencing nucleic acid molecules). In another embodiment, the computer readable medium does contain instructions for directing a machine to create the data. In one embodiment, a computer program product comprises a computer readable medium storing a plurality of instructions for controlling a processor to perform an operation for methods described herein. Embodiments are also directed to computer systems configured to perform the steps of any of the methods described herein, potentially with different components performing a respective step or a respective group of steps.

In some aspects, a method includes: monitoring a power required by each of a plurality of power loads coupled to a power distribution bus, wherein the plurality of power loads comprise a plurality of devices for oil and gas exploration or production, wherein the plurality of devices include a plurality of drilling rigs or equipment associated with one or more of the drilling rigs, pump jacks, hydraulic fracturing equipment; monitoring the power supplied by each of a plurality of power sources coupled to the power distribution bus, wherein the plurality of power sources include power from any two or more of the following: an electric utility, an electric grid, a natural gas turbine, a battery, a solar power generator, and a wind power generator, and a geothermal power generator; and adjusting an amount of power supplied to a first one of the plurality of power loads based at least in part on a first one of the plurality of power loads, wherein adjusting comprises at least one of increasing or decreasing, wherein the plurality of power loads and power sources are located within a geographic region. The geographic region may vary in size for any one of a variety of reasons, including topography, proximity to the same basin for oil and gas exploration or production, and due to other available power sources outside the region or inside the region. In some cases, the geographic region may be just one or a few miles in diameter, or may be as large as 10, 20, 50, or 100 miles in diameter. It is anticipated that connecting various power loads and power sources within a MicroGrid as described herein may require installing transmission lines, and the need for such lines may further define the appropriate size of a particular MicroGrid.

In some aspects, the plurality of power sources further comprise one or more natural gas turbine generators, each coupled to a natural gas source, which may for example be a well associated with a drilling rig or a well associated with a pump jack. It should be noted that a pump jack is just one example of a potential lifting system and the term "pump jack" should be understood herein to refer to any artificial lift system to lift oil and/or gas from a well. Gas could also be supplied by a natural gas tank or the like.

In some aspects, the method includes receiving data from each of the plurality of power loads regarding upcoming operations of the respective one of the plurality of power loads and a timing thereof; and responsive to the data received from the plurality of power loads, increasing the amount of power supplied to at least one of the plurality of power loads so that the at least one of the plurality of power loads will have additional power for the upcoming operations when needed by the at least one of the plurality of power loads.

In some aspects, the method includes determining an amount of power potentially available from each of the plurality of power sources; determining which one or more of the plurality of power sources provides power with less environmental impact than other of the plurality of power sources; and selecting the one or more of the plurality of power sources with less environmental impact to provide the amount of power supplied to the plurality of power loads.

In some aspects, the environmental impact comprises at least one of a calculated carbon footprint, a number of particulates introduced into an environment, and a net energy consumption.

In some aspects, the method includes determining the amount of power potentially available from each of the plurality of power sources; determining which one or more of the plurality of power sources provides power with less noise than other of the plurality of power sources; and selecting the one or more of the plurality of power sources with less noise to provide the amount of power supplied to the plurality of power loads.

In some aspects, a power control system for a local power grid system includes: a processor; a memory coupled to the processor, wherein the memory stores instructions executable by the processor for: receiving information from a plurality of power sources coupled to form a power grid, wherein the power sources comprise one or more natural gas turbine generators, one or more batteries, one or more solar power generators, one or more wind power generators, one or more geothermal power generators, a second power grid, or a power generation facility of a utility; receiving information from a plurality of power loads, wherein the plurality of power loads comprise one or more drilling rigs or equipment for drilling, one or more pump jacks, one or more items of equipment for hydraulic fracturing, and wherein the plurality of power loads are located within a 50 mile diameter of one another; responsive to information received from one or more of the plurality of power loads, determining that at least one of the plurality of power loads will either increase its power consumption or decrease its power consumption, and a timing of the increase or decrease; and responsive to the timing of the increase or decrease, determining when to add more power to a power distribution bus coupled to the plurality of power sources and power loads or to decrease the power supplied to a distribution bus.

In some aspects, the instructions further comprise instructions for determining a desired operating capacity for a natural gas turbine generator responsive to the determining of when to add more power or decrease the power supplied.

In some aspects, the instructions further comprise instructions for sending a control signal to one or more pump jacks or one or more drilling rigs to provide natural gas to the natural gas turbine generator and an amount thereof.

In some aspects, a non-transitory computer-readable medium storing a set of instructions includes: one or more instructions that, when executed by one or more processors of a power control system, cause the power control system to: monitor a power required by each of a plurality of power loads coupled to a power distribution bus, wherein the plurality of power loads comprise a plurality of devices for oil and gas exploration or production, wherein the plurality of devices include a plurality of drilling rigs or equipment associated with one or more of the drilling rigs, pump jacks, hydraulic fracturing equipment; monitor the power supplied by each of a plurality of power sources coupled to a power distribution bus, wherein the plurality of power sources include power from any two or more of the following: an electric utility, an electric grid, a natural gas turbine, a battery, a solar power generator, and a wind power generator, and a geothermal power generator; and adjust an amount of power supplied to a first one of the plurality of power loads based at least in part on a first one of the plurality of power loads, wherein adjusting comprises at least one of increasing or decreasing, wherein the plurality of power loads and power sources are located within a geographic region of less than 100 miles in diameter.

In some aspects, the plurality of power sources further comprise one or more natural gas turbine generators, each coupled to a natural gas source associated with a drilling rig or a pump jack.

In some aspects, the one or more instructions further cause the power control system to: receive data from each of the plurality of power loads regarding upcoming operations of the respective plurality of power loads and a timing thereof; and responsive to the data received from the plurality of power loads, increasing the amount of power supplied to at least one of the plurality of power loads so that the at least one of the plurality of power loads will have sufficient power for an upcoming operation when needed by the at least one of the plurality of power loads.

In some aspects, the one or more instructions further cause the power control system to: determine an amount of power potentially available from each of the plurality of power sources; determine which one or more of the plurality of power sources provides power with less environmental impact than other of the plurality of power sources; and select the one or more of the plurality of power sources with less environmental impact to provide the amount of power supplied to the plurality of power loads.

In some aspects, the environmental impact comprises at least one of a calculated carbon footprint, a number of particulates introduced into an environment, and a net energy consumption.

In some aspects, the one or more instructions further cause the power control system to: determine the amount of power potentially available from each of the plurality of power sources; determine which one or more of the plurality of power sources provides power with less noise than other of the plurality of power sources; and select the one or more of the plurality of power sources with less noise to provide the amount of power supplied to the one or more of the plurality of power loads.

In some aspects, a power control system includes: one or more memories; and one or more processors, communicatively coupled to the one or more memories, configured to: monitor a power required by each of a plurality of power loads coupled to a power distribution bus, wherein the plurality of power loads comprise a plurality of devices for oil and gas exploration or production, wherein the plurality of devices include a plurality of drilling rigs or equipment associated with one or more of the drilling rigs, pump jacks, hydraulic fracturing equipment; monitor the power supplied by each of a plurality of power sources coupled to the power distribution bus, wherein the plurality of power sources include power from any two or more of the following: an electric utility, an electric grid, a natural gas turbine, a battery, a solar power generator, and a wind power generator, and a geothermal power generator; and adjust an amount of power supplied to a first one of the plurality of power loads based at least in part on a first one of the plurality of power loads, wherein adjusting comprises at least one of increasing or decreasing, wherein the plurality of power loads and power sources are located within a geographic region of less than 100 miles in diameter.

In some aspects, the plurality of power sources further comprise one or more natural gas turbine generators, each coupled to a natural gas source associated with a drilling rig or a pump jack.

In some aspects, the one or more processors are further configured to: receive data from the plurality of power loads regarding upcoming operations of each of the plurality of power loads and a timing thereof; and responsive to the data received from the plurality of power loads, increasing the amount of power supplied to at least one of the plurality of power loads so that the at least one of the plurality of power loads will have sufficient power for an upcoming operation when needed by the at least one of the plurality of power loads.

In some aspects, the one or more processors are further configured to: determine an amount of power potentially available from each of the plurality of power sources; determine which one or more of the plurality of power sources provides power with less environmental impact than other of the plurality of power sources; and select the one or more of the plurality of power sources with less environmental impact to provide the amount of power supplied to the at least one of the plurality of power loads.

In some aspects, the environmental impact comprises at least one of a calculated carbon footprint, a number of particulates introduced into an environment, and a net energy consumption.

In some aspects, the one or more processors are further configured to: determine the amount of power potentially available from each of the plurality of power sources; determine which one or more of the plurality of power sources provides power with less noise than other of the plurality of power sources; and select the one or more of the plurality of power sources with less noise to provide the amount of power supplied to the at least one of the plurality of power loads.

Other embodiments of the disclosure are directed to systems, apparatus, and computer readable media associated with methods described herein. In one embodiment, the computer readable medium contains instructions for receiving data and analyzing data, but not instructions for directing a machine to create the data (e.g. sequencing nucleic acid molecules). In another embodiment, the computer readable medium does contain instructions for directing a machine to create the data. In one embodiment, a computer program product comprises a computer readable medium storing a plurality of instructions for controlling a processor to perform an operation for methods described herein. Embodiments are also directed to computer systems configured to perform the steps of any of the methods described herein, potentially with different components performing a respective step or a respective group of steps.

Reference to the remaining portions of the specification, including the drawings and claims, will realize other features and advantages of embodiments of the present disclosure. Further features and advantages, as well as the structure and operation of various embodiments of the present disclosure, are described in detail below with respect to the accompanying drawings. In the drawings, like reference numbers can indicate identical or functionally similar elements.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
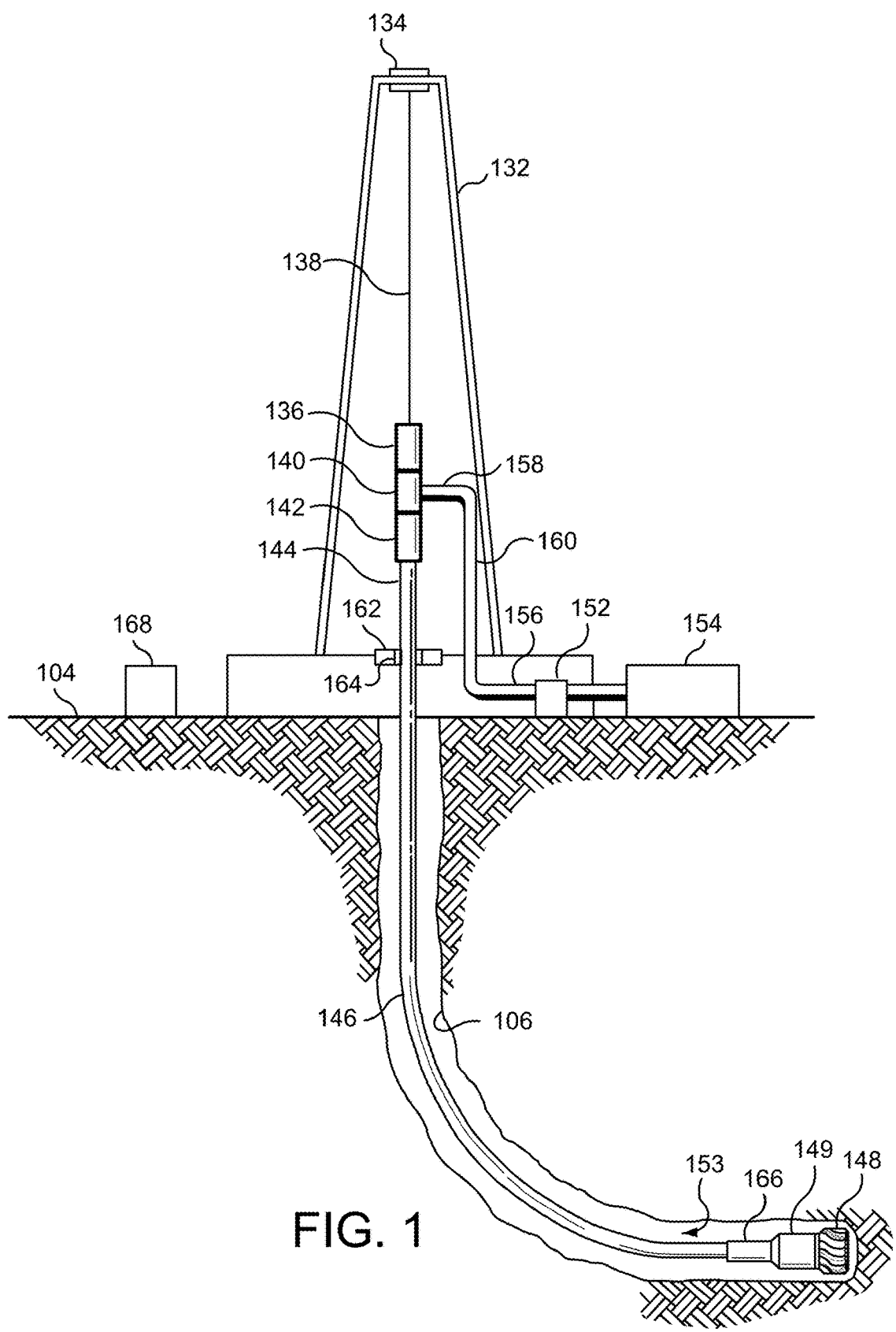
FIG. 1 is a depiction of a drilling system for drilling a borehole.

In the following description, details are set forth by way of example to facilitate discussion of the disclosed subject matter. It is noted, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

Drilling a well typically involves a substantial amount of human decision-making during the drilling process. For example, geologists and drilling engineers use their knowledge, experience, and the available information to make decisions on how to plan the drilling operation, how to accomplish the drilling plan, and how to handle issues that arise during drilling. However, even the best geologists and drilling engineers perform some guesswork due to the unique nature of each borehole. Furthermore, a directional human driller performing the drilling may have drilled other boreholes in the same region and so may have some similar experience. However, during drilling operations, a multitude of input information and other factors may affect a drilling decision being made by a human operator or specialist, such that the amount of information may overwhelm the cognitive ability of the human to properly consider and factor into the drilling decision. Furthermore, the quality or the error involved with the drilling decision may improve with larger amounts of input data being considered, for example, such as formation data from a large number of offset wells. For these reasons, human specialists may be unable to achieve desirable drilling decisions, particularly when such drilling decisions are made under time constraints, such as during drilling operations when continuation of drilling is dependent on the drilling decision and, thus, the entire drilling rig waits idly for the next drilling decision. Furthermore, human decision-making for drilling decisions can result in expensive mistakes, because drilling errors can add significant cost to drilling operations. In some cases, drilling errors may permanently lower the output of a well, resulting in substantial long-term economic losses due to the lost output of the well.

For the purpose of this disclosure, oil field operations can include any and all operations related to exploration and production of oil and/or natural gas, including but not limited to preparing for drilling, drilling (e.g., surveying, planning, drilling), rotating, raising, lowering, and adding or removing segments of pipe for a drill string, pumping operations (e.g., a mud pump), casing, cementing, hydraulic fracturing, workover and recovery operations, lifting and pump jack operations, and further include the use automation tools and systems, transportation tools, electronic sensors, computing systems, and communication devices.

A well plan may be updated based on new stratigraphic information from the wellbore, as it is being drilled. This stratigraphic information can be gained on one hand from measurement while drilling (MWD) and logging while drilling (LWD) sensor data, but could also include other reference well data, such as drilling dynamics data or sensor data giving information, for example, on the hardness of the rock in individual strata layers being drilled through.

A method for updating the well plan with additional stratigraphic data may first combine the various parameters into a single characteristic function, both for the subject well and every offset well. For every pair of subject well and offset well, a heat map can be computed to display the misfit between the characteristic functions of the subject and offset wells. The heat maps may then enable the identification of paths (x (MD), y (MD)), parameterized by the measured depth (MD) along the subject well. These paths uniquely describe the vertical depth of the subject well relative to the geology (e.g., formation) at every offset well. Alternatively, the characteristic functions of the offset wells can be combined into a single characteristic function at the location of the subject wellbore. This combined characteristic function changes along the subject well with changes in the stratigraphy. The heat map may also be used to identify stratigraphic anomalies, such as structural faults, stringers, and breccia. The identified paths may be used in updating the well plan with the latest data to steer the wellbore into the geological target(s) and keep the wellbore in the target zone.

Referring now to the drawings in FIG. 1, a drilling system 100 is illustrated in one embodiment as a top drive system. As shown, the drilling system 100 includes a derrick 132 on the surface 104 of the earth and is used to drill a borehole 106 into the earth. Typically, drilling system 100 is used at a location corresponding to a geographic formation 102 in the earth that is known.

In FIG. 1, derrick 132 includes a crown block 134 to which a travelling block 136 is coupled via a drilling line 138. In drilling system 100, a top drive 140 is coupled to the travelling block 136 and may provide rotational force for drilling. A saver sub 142 may sit between the top drive 140 and a drill pipe 144 that is part of a drill string 146. Top drive 140 may rotate drill string 146 via the saver sub 142, which in turn may rotate a drill bit 148 of a bottom hole assembly (BHA) 149 in borehole 106 passing through formation 102. Also visible in drilling system 100 is a rotary table 162 that may be fitted with a master bushing 164 to hold drill string 146 when not rotating.

A mud pump 152 may direct a fluid mixture (e.g., the mud 153) from a mud pit 154 into drill string 146. Mud pit 154 is shown schematically as a container, but it is noted that various receptacles, tanks, pits, or other containers may be used. Mud 153 may flow from mud pump 152 into a discharge line 156 that is coupled to a rotary hose 158 by a standpipe 160. Rotary hose 158 may then be coupled to top drive 140, which includes a passage for mud 153 to flow into borehole 106 via drill string 146 from where mud 153 may emerge at drill bit 148. Mud 153 may lubricate drill bit 148 during drilling and, due to the pressure supplied by mud pump 152, mud 153 may return via borehole 106 to surface 104.

In drilling system 100, drilling equipment (see also FIG. 5) is used to perform the drilling of borehole 106, such as top drive 140 (or rotary drive equipment) that couples to drill string 146 and BHA 149 and is configured to rotate drill string 146 and apply pressure to drill bit 148. Drilling system 100 may include control systems such as a Weight-on-Bit (WOB)/differential pressure control system 522, a positional/rotary control system 524, a fluid circulation control system 526, and a sensor system 528, as further described below with respect to FIG. 5. The control systems may be used to monitor and change drilling rig settings, such as the WOB or differential pressure to alter the Rate of Penetration (ROP) or the radial orientation of the toolface, change the flow rate of drilling mud, and perform other operations. Sensor system 528 may be for obtaining sensor data about the drilling operation and drilling system 100, including the downhole equipment. For example, sensor system 528 may include MWD or logging while drilling (LWD) tools for acquiring information, such as toolface and formation logging information, that may be saved for later retrieval, transmitted with or without a delay using any of various communication means (e.g., wireless, wireline, or mud pulse telemetry), or otherwise transferred to steering control system 168. As used herein, an MWD tool is enabled to communicate downhole measurements without substantial delay to the surface 104, such as using mud pulse telemetry, while a LWD tool is equipped with an internal memory that stores measurements when downhole and can be used to download a stored log of measurements when the LWD tool is at the surface 104. The internal memory in the LWD tool may be a removable memory, such as a universal serial bus (USB) memory device or another removable memory device. It is noted that certain downhole tools may have both MWD and LWD capabilities. Such information acquired by sensor system 528 may include information related to hole depth, bit depth, inclination angle, azimuth angle, true vertical depth, gamma count, standpipe pressure, mud flow rate, rotary rotations per minute (RPM), bit speed, ROP, WOB, among other information. It is noted that all or part of sensor system 528 may be incorporated into a control system, or in another component of the drilling equipment. As drilling system 100 can be configured in many different implementations, it is noted that different control systems and subsystems may be used.

Sensing, detection, measurement, evaluation, storage, alarm, and other functionality may be incorporated into a downhole tool 166 or BHA 149, or elsewhere along drill string 146 to provide downhole surveys of borehole 106. Accordingly, downhole tool 166 may be an MWD tool or a LWD tool or both, and may accordingly utilize connectivity to the surface 104, local storage, or both. In different implementations, gamma radiation sensors, magnetometers, accelerometers, and other types of sensors may be used for the downhole surveys. Although downhole tool 166 is shown in singular in drilling system 100, it is noted that multiple instances (not shown) of downhole tool 166 may be located at one or more locations along drill string 146.

In some embodiments, formation detection and evaluation functionality may be provided via a steering control system 168 on the surface 104. Steering control system 168 may be located in proximity to derrick 132 or may be included with drilling system 100. In other embodiments, steering control system 168 may be remote from the actual location of borehole 106 (see also FIG. 4). For example, steering control system 168 may be a stand-alone system or may be incorporated into other systems included with drilling system 100.

In operation, steering control system 168 may be accessible via a communication network (see also FIG. 10), and may accordingly receive formation information via the communication network. In some embodiments, steering control system 168 may use the evaluation functionality to provide corrective measures, such as a convergence plan to overcome an error in the well trajectory of borehole 106 with respect to a reference, or a planned well trajectory. The convergence plans or other corrective measures may depend on a determination of the well trajectory, and therefore may be improved in accuracy using surface steering, as disclosed herein.

In particular embodiments, at least a portion of steering control system 168 may be located in downhole tool 166 (not shown). In some embodiments, steering control system 168 may communicate with a separate controller (not shown) located in downhole tool 166. In particular, steering control system 168 may receive and process measurements received from downhole surveys, and may perform the calculations described herein for surface steering using the downhole surveys and other information referenced herein.

In drilling system 100, to aid in the drilling process, data is collected from borehole 106, such as from sensors in BHA 149, downhole tool 166, or both. The collected data may include the geological characteristics of formation 102 in which borehole 106 was formed, the attributes of drilling system 100, including BHA 149, and drilling information such as WOB, drilling speed, and other information pertinent to the formation of borehole 106. The drilling information may be associated with a particular depth or another identifiable marker to index collected data. For example, the collected data for borehole 106 may capture drilling information indicating that drilling of the well from 1,000 feet to 1,200 feet occurred at a first ROP through a first rock layer with a first WOB, while drilling from 1,200 feet to 1,500 feet occurred at a second ROP through a second rock layer with a second WOB (see also FIG. 2). In some applications, the collected data may be used to virtually recreate the drilling process that created borehole 106 in formation 102, such as by displaying a computer simulation of the drilling process. The accuracy with which the drilling process can be recreated depends on a level of detail and accuracy of the collected data, including collected data from a downhole survey of the well trajectory.

The collected data may be stored in a database that is accessible via a communication network for example. In some embodiments, the database storing the collected data for borehole 106 may be located locally at drilling system 100, at a drilling hub that supports a plurality of drilling systems 100 in a region or at a database server accessible over the communication network that provides access to the database (see also FIG. 4). At drilling system 100, the collected data may be stored at the surface 104 or downhole in drill string 146, such as in a memory device included with BHA 149 (see also FIG. 10). Alternatively, at least a portion of the collected data may be stored on a removable storage medium, such as using steering control system 168 or BHA 149 that is later coupled to the database in order to transfer the collected data to the database, which may be manually performed at certain intervals, for example.

In FIG. 1, steering control system 168 is located at or near the surface 104 where borehole 106 is being drilled. Steering control system 168 may be coupled to equipment used in drilling system 100 and may also be coupled to the database, whether the database is physically located locally, regionally, or centrally (see also FIGS. 4 and 5). Accordingly, steering control system 168 may collect and record various inputs, such as measurement data from a magnetometer and an accelerometer that may also be included with BHA 149.

Steering control system 168 may further be used as a surface steerable system, along with the database, as described above. The surface steerable system may enable an operator to plan and control drilling operations while drilling is being performed. The surface steerable system may itself also be used to perform certain drilling operations, such as controlling certain control systems that, in turn, control the actual equipment in drilling system 100 (see also FIG. 5). The control of drilling equipment and drilling operations by steering control system 168 may be manual, manual-assisted, semi-automatic, or automatic, in different embodiments.

Manual control may involve direct control of the drilling rig equipment, albeit with certain safety limits to prevent unsafe or undesired actions or collisions of different equipment. To enable manual-assisted control, steering control system 168 may present various information, such as using a graphical user interface (GUI) displayed on a display device (see FIG. 8), to a human operator, and may provide controls that enable the human operator to perform a control operation. The information presented to the user may include live measurements and feedback from the drilling rig and steering control system 168, or the drilling rig itself, and may further include limits and safety-related elements to prevent unwanted actions or equipment states, in response to a manual control command entered by the user using the GUI.

To implement semi-automatic control, steering control system 168 may itself propose or indicate to the user, such as via the GUI, that a certain control operation, or a sequence of control operations, should be performed at a given time. Then, steering control system 168 may enable the user to imitate the indicated control operation or sequence of control operations, such that once manually started, the indicated control operation or sequence of control operations is automatically completed. The limits and safety features mentioned above for manual control would still apply for semi-automatic control. It is noted that steering control system 168 may execute semi-automatic control using a secondary processor, such as an embedded controller that executes under a real-time operating system (RTOS), that is under the control and command of steering control system 168. To implement automatic control, the step of manual starting the indicated control operation or sequence of operations is eliminated, and steering control system 168 may proceed with a passive notification to the user of the actions taken.

In order to implement various control operations, steering control system 168 may perform (or may cause to be performed) various input operations, processing operations, and output operations. The input operations performed by steering control system 168 may result in measurements or other input information being made available for use in any subsequent operations, such as processing or output operations. The input operations may accordingly provide the input information, including feedback from the drilling process itself, to steering control system 168. The processing operations performed by steering control system 168 may be any processing operation associated with surface steering, as disclosed herein. The output operations performed by steering control system 168 may involve generating output information for use by external entities, or for output to a user, such as in the form of updated elements in the GUI, for example. The output information may include at least some of the input information, enabling steering control system 168 to distribute information among various entities and processors.

In particular, the operations performed by steering control system 168 may include operations such as receiving drilling data representing a drill path, receiving other drilling parameters, calculating a drilling solution for the drill path based on the received data and other available data (e.g., rig characteristics), implementing the drilling solution at the drilling rig, monitoring the drilling process to gauge whether the drilling process is within a defined margin of error of the drill path, and calculating corrections for the drilling process if the drilling process is outside of the margin of error.

Accordingly, steering control system 168 may receive input information either before drilling, during drilling, or after drilling of borehole 106. The input information may comprise measurements from one or more sensors, as well as survey information collected while drilling borehole 106. The input information may also include a well plan, a regional formation history, drilling engineer parameters, downhole tool face/inclination information, downhole tool gamma/resistivity information, economic parameters, and reliability parameters, among various other parameters. Some of the input information, such as the regional formation history, may be available from a drilling hub 410, which may have respective access to a regional drilling database (DB) 412 (see FIG. 4). Other input information may be accessed or uploaded from other sources to steering control system 168. For example, a web interface may be used to interact directly with steering control system 168 to upload the well plan or drilling parameters.

As noted, the input information may be provided to steering control system 168. After processing by steering control system 168, steering control system 168 may generate control information that may be output to drilling rig 210 (e.g., to rig controls 520 that control drilling equipment 530, see also FIGS. 2 and 5). Drilling rig 210 may provide feedback information using rig controls 520 to steering control system 168. The feedback information may then serve as input information to steering control system 168, thereby enabling steering control system 168 to perform feedback loop control and validation. Accordingly, steering control system 168 may be configured to modify its output information to drilling rig 210, in order to achieve the desired results, which are indicated in the feedback information. The output information generated by steering control system 168 may include indications to modify one or more drilling parameters, the direction of drilling, and the drilling mode, among others. In certain operational modes, such as semi-automatic or automatic, steering control system 168 may generate output information indicative of instructions to rig controls 520 to enable automatic drilling using the latest location of BHA 149. Therefore, an improved accuracy in the determination of the location of BHA 149 may be provided using steering control system 168, along with the methods and operations for surface steering disclosed herein.

Figure 2:
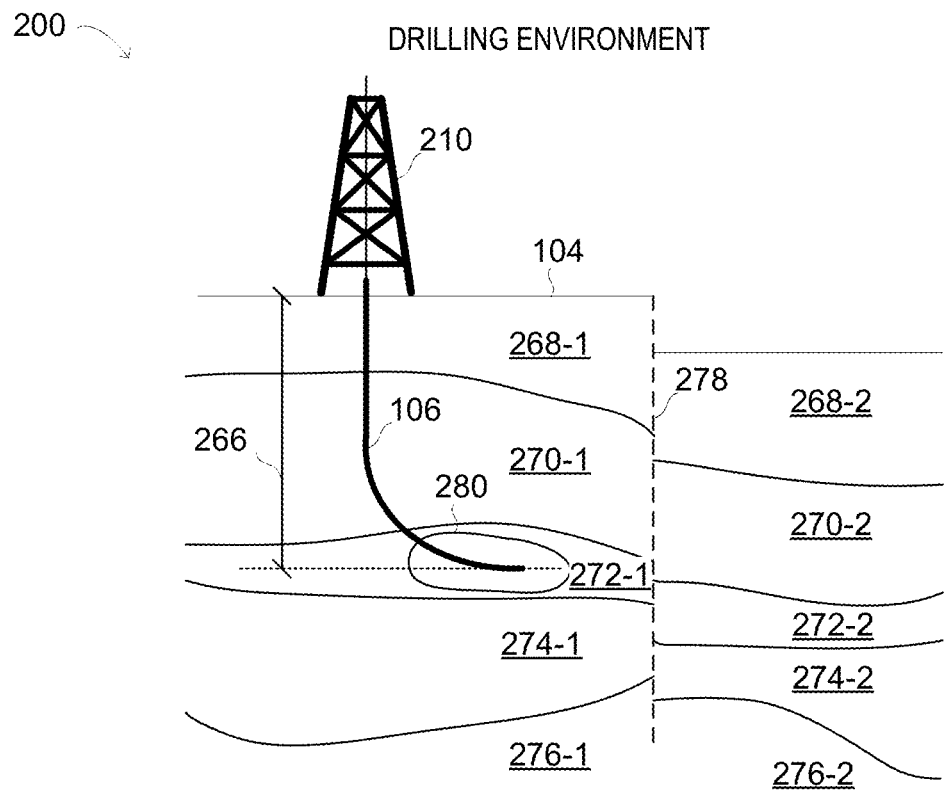
FIG. 2 is a depiction of a drilling environment including the drilling system for drilling a borehole.

Referring now to FIG. 2, a drilling environment 200 is depicted schematically and is not drawn to scale or perspective. In particular, drilling environment 200 may illustrate additional details with respect to formation 102 below the surface 104 in drilling system 100 shown in FIG. 1. In FIG. 2, drilling rig 210 may represent various equipment discussed above with respect to drilling system 100 in FIG. 1 that is located at the surface 104.

In drilling environment 200, it may be assumed that a drilling plan (also referred to as a well plan) has been formulated to drill borehole 106 extending into the ground to a true vertical depth (TVD) 266 and penetrating several subterranean strata layers. Borehole 106 is shown in FIG. 2 extending through strata layers 268-1 and 270-1, while terminating in strata layer 272-1. Accordingly, as shown, borehole 106 does not extend or reach underlying strata layers 274-1 and 276-1. A target area 280 specified in the drilling plan may be located in strata layer 272-1 as shown in FIG. 2. Target area 280 may represent a desired endpoint of borehole 106, such as a hydrocarbon producing area indicated by strata layer 272-1. It is noted that target area 280 may be of any shape and size, and may be defined using various different methods and information in different embodiments. In some instances, target area 280 may be specified in the drilling plan using subsurface coordinates, or references to certain markers, that indicate where borehole 106 is to be terminated. In other instances, target area may be specified in the drilling plan using a depth range within which borehole 106 is to remain. For example, the depth range may correspond to strata layer 272-1. In other examples, target area 280 may extend as far as can be realistically drilled. For example, when borehole 106 is specified to have a horizontal section with a goal to extend into strata layer 272-1 as far as possible, target area 280 may be defined as strata layer 272-1 itself and drilling may continue until some other physical limit is reached, such as a property boundary or a physical limitation to the length of drill string 146.

Also visible in FIG. 2 is a fault line 278 that has resulted in a subterranean discontinuity in the fault structure. Specifically, strata layers 268, 270, 272, 274, and 276 have portions on either side of fault line 278. On one side of fault line 278, where borehole 106 is located, strata layers 268-1, 270-1, 272-1, 274-1, and 276-1 are unshifted by fault line 278. On the other side of fault line 278, strata layers 268-2, 270-2, 272-2, 274-2, and 276-2 are shifted downwards by fault line 278.

Current drilling operations frequently include directional drilling to reach a target, such as target area 280. The use of directional drilling has been found to generally increase an overall amount of production volume per well, but also may lead to significantly higher production rates per well, which are both economically desirable. As shown in FIG. 2, directional drilling may be used to drill the horizontal portion of borehole 106, which increases an exposed length of borehole 106 within strata layer 272-1, and which may accordingly be beneficial for hydrocarbon extraction from strata layer 272-1. Directional drilling may also be used to alter an angle of borehole 106 to accommodate subterranean faults, such as indicated by fault line 278 in FIG. 2. Other benefits that may be achieved using directional drilling include sidetracking off of an existing well to reach a different target area or a missed target area, drilling around abandoned drilling equipment, drilling into otherwise inaccessible or difficult to reach locations (e.g., under populated areas or bodies of water), providing a relief well for an existing well, and increasing the capacity of a well by branching off and having multiple boreholes extending in different directions or at different vertical positions for the same well. Directional drilling is often not limited to a straight horizontal borehole 106, but may involve staying within a strata layer that varies in depth and thickness as illustrated by strata layer 272. As such, directional drilling may involve multiple vertical adjustments that complicate the trajectory of borehole 106.

Figure 3:
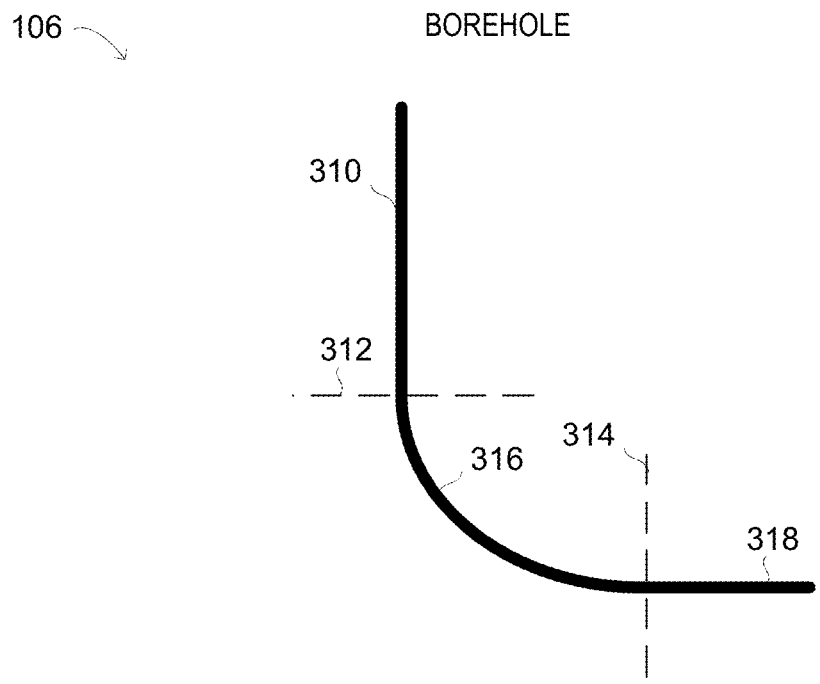
FIG. 3 is a depiction of a borehole generated in the drilling environment.

Referring now to FIG. 3, one embodiment of a portion of borehole 106 is shown in further detail. Using directional drilling for horizontal drilling may introduce certain challenges or difficulties that may not be observed during vertical drilling of borehole 106. For example, a horizontal portion 318 of borehole 106 may be started from a vertical portion 310. In order to make the transition from vertical to horizontal, a curve may be defined that specifies a so-called "build up" section 316. Build up section 316 may begin at a kick off point 312 in vertical portion 310 and may end at a begin point 314 of horizontal portion 318. The change in inclination angle in buildup section 316 per measured length drilled is referred to herein as a "build rate" and may be defined in degrees per one hundred feet drilled. For example, the build rate may have a value of 6°/100 ft., indicating that there is a six degree change in inclination angle for every one hundred feet drilled. The build rate for a particular build up section may remain relatively constant or may vary.

The build rate used for any given build up section may depend on various factors, such as properties of the formation (i.e., strata layers) through which borehole 106 is to be drilled, the trajectory of borehole 106, the particular pipe and drill collars/BHA components used (e.g., length, diameter, flexibility, strength, mud motor bend setting, and drill bit), the mud type and flow rate, the specified horizontal displacement, stabilization, and inclination angle, among other factors. An overly aggressive built rate can cause problems such as severe doglegs (e.g., sharp changes in direction in the borehole) that may make it difficult or impossible to run casing or perform other operations in borehole 106. Depending on the severity of any mistakes made during directional drilling, borehole 106 may be enlarged or drill bit 148 may be backed out of a portion of borehole 106 and re-drilled along a different path. Such mistakes may be undesirable due to the additional time and expense involved. However, if the built rate is too cautious, additional overall time may be added to the drilling process, because directional drilling generally involves a lower ROP than straight drilling. Furthermore, directional drilling for a curve is more complicated than vertical drilling and the possibility of drilling errors increases with directional drilling (e.g., overshoot and undershoot that may occur while trying to keep drill bit 148 on the planned trajectory).

Two modes of drilling, referred to herein as "rotating" and "sliding," are commonly used to form borehole 106. Rotating, also called "rotary drilling," uses top drive 140 or rotary table 162 to rotate drill string 146. Rotating may be used when drilling occurs along a straight trajectory, such as for vertical portion 310 of borehole 106. Sliding, also called "steering" or "directional drilling" as noted above, typically uses a mud motor located downhole at BHA 149. The mud motor can include an adjustable bent housing and is not powered by rotation of drill string 146. Instead, the mud motor uses hydraulic power derived from the pressurized drilling mud that circulates along borehole 106 to and from the surface 104 to directionally drill borehole 106 in buildup section 316.

Thus, sliding is used in order to control the direction of the well trajectory during directional drilling. A method to perform a slide may include the following operations. First, during vertical or straight drilling, the rotation of drill string 146 is stopped. Based on feedback from measuring equipment, such as from downhole tool 166, adjustments may be made to drill string 146, such as using top drive 140 to apply various combinations of torque, WOB, and vibration, among other adjustments. The adjustments may continue until a tool face is confirmed that indicates a direction of the bend of the mud motor is oriented to a direction of a desired deviation (i.e., build rate) of borehole 106. Once the desired orientation of the mud motor is attained, WOB to the drill bit is increased, which causes the drill bit to move in the desired direction of deviation. Once sufficient distance and angle have been built up in the curved trajectory, a transition back to rotating mode can be accomplished by rotating drill string 146 again. The rotation of drill string 146 after sliding may neutralize the directional deviation caused by the bend in the mud motor due to the continuous rotation around a centerline of borehole 106.

Figure 4:
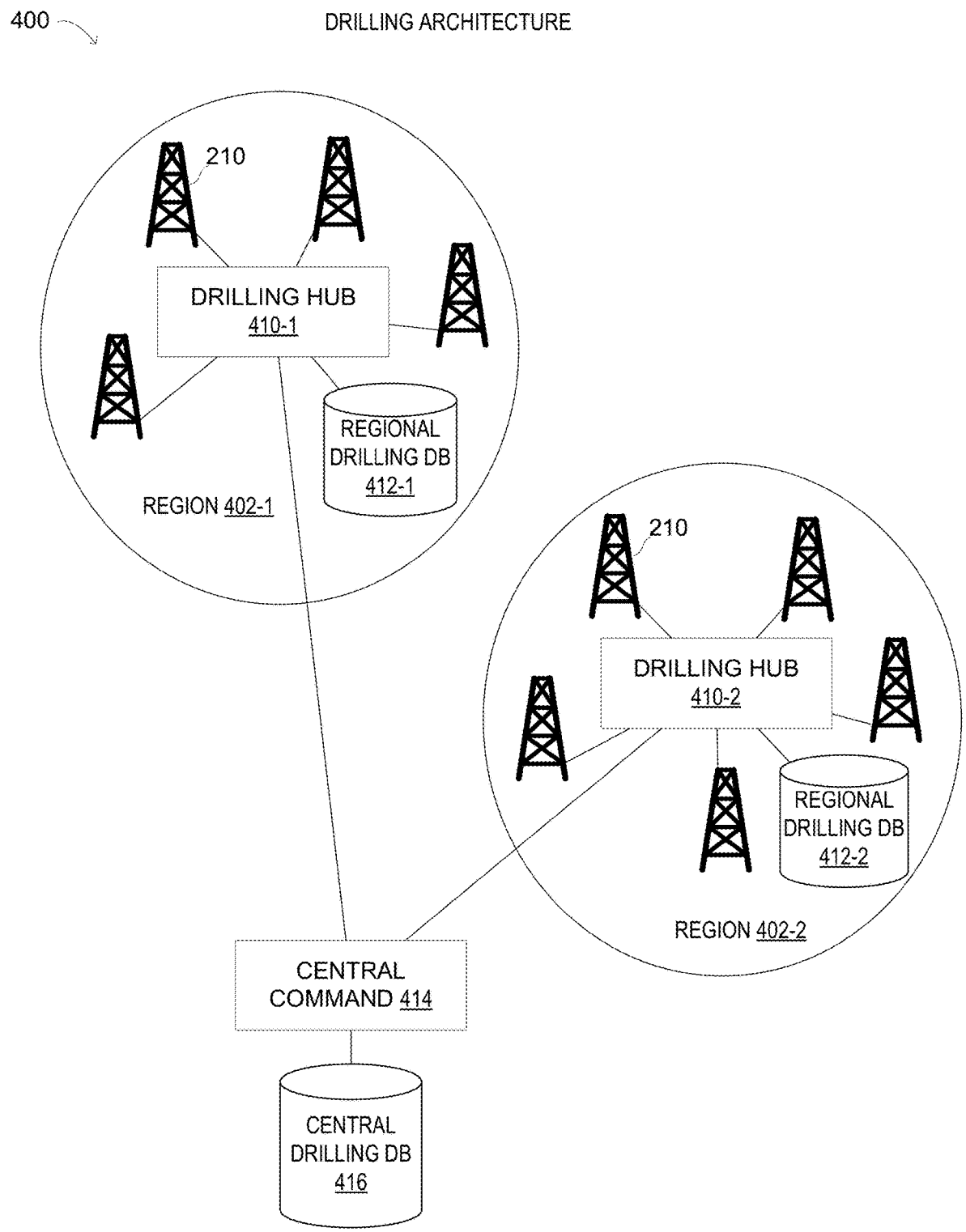
FIG. 4 is a depiction of a drilling architecture including the drilling environment.

Referring now to FIG. 4, a drilling architecture 400 is illustrated in diagram form. As shown, drilling architecture 400 depicts a hierarchical arrangement of drilling hubs 410 and a central command 414, to support the operation of a plurality of drilling rigs 210 in different regions 402. Specifically, as described above with respect to FIGS. 1 and 2, drilling rig 210 includes steering control system 168 that is enabled to perform various drilling control operations locally to drilling rig 210. When steering control system 168 is enabled with network connectivity, certain control operations or processing may be requested or queried by steering control system 168 from a remote processing resource. As shown in FIG. 4, drilling hubs 410 represent a remote processing resource for steering control system 168 located at respective regions 402, while central command 414 may represent a remote processing resource for both drilling hub 410 and steering control system 168.

Specifically, in a region 402-1, a drilling hub 410-1 may serve as a remote processing resource for drilling rigs 210 located in region 402-1, which may vary in number and are not limited to the exemplary schematic illustration of FIG. 4. Additionally, drilling hub 410-1 may have access to a regional drilling DB 412-1, which may be local to drilling hub 410-1. Additionally, in a region 402-2, a drilling hub 410-2 may serve as a remote processing resource for drilling rigs 210 located in region 402-2, which may vary in number and are not limited to the exemplary schematic illustration of FIG. 4. Additionally, drilling hub 410-2 may have access to a regional drilling DB 412-2, which may be local to drilling hub 410-2.

In FIG. 4, respective regions 402 may exhibit the same or similar geological formations. Thus, reference wells, or offset wells, may exist in a vicinity of a given drilling rig 210 in region 402, or where a new well is planned in region 402. Furthermore, multiple drilling rigs 210 may be actively drilling concurrently in region 402, and may be in different stages of drilling through the depths of formation strata layers at region 402. Thus, for any given well being drilled by drilling rig 210 in a region 402, survey data from the reference wells or offset wells may be used to create the well plan, and may be used for surface steering, as disclosed herein. In some implementations, survey data or reference data from a plurality of reference wells may be used to improve drilling performance, such as by reducing an error in estimating TVD or a position of BHA 149 relative to one or more strata layers, as will be described in further detail herein. Additionally, survey data from recently drilled wells, or wells still currently being drilled, including the same well, may be used for reducing an error in estimating TVD or a position of BHA 149 relative to one or more strata layers.

Also shown in FIG. 4 is central command 414, which has access to central drilling DB 416, and may be located at a centralized command center that is in communication with drilling hubs 410 and drilling rigs 210 in various regions 402. The centralized command center may have the ability to monitor drilling and equipment activity at any one or more drilling rigs 210. In some embodiments, central command 414 and drilling hubs 412 may be operated by a commercial operator of drilling rigs 210 as a service to customers who have hired the commercial operator to drill wells and provide other drilling-related services.

In FIG. 4, it is particularly noted that central drilling DB 416 may be a central repository that is accessible to drilling hubs 410 and drilling rigs 210. Accordingly, central drilling DB 416 may store survey information for various drilling rigs 210 in different regions 402. In some embodiments, central drilling DB 416 may serve as a backup for at least one regional drilling DB 412, or may otherwise redundantly store information that is also stored on at least one regional drilling DB 412. In turn, regional drilling DB 412 may serve as a backup or redundant storage for at least one drilling rig 210 in region 402. For example, regional drilling DB 412 may store information collected by steering control system 168 from drilling rig 210.

In some embodiments, the formulation of a drilling plan for drilling rig 210 may include processing and analyzing the collected data in regional drilling DB 412 to create a more effective drilling plan. Furthermore, once the drilling has begun, the collected data may be used in conjunction with current data from drilling rig 210 to improve drilling decisions. As noted, the functionality of steering control system 168 may be provided at drilling rig 210, or may be provided, at least in part, at a remote processing resource, such as drilling hub 410 or central command 414.

As noted, steering control system 168 may provide functionality as a surface steerable system for controlling drilling rig 210. Steering control system 168 may have access to regional drilling DB 412 and central drilling DB 416 to provide the surface steerable system functionality. As will be described in greater detail below, steering control system 168 may be used to plan and control drilling operations based on input information, including feedback from the drilling process itself. Steering control system 168 may be used to perform operations such as receiving drilling data representing a drill trajectory and other drilling parameters, calculating a drilling solution for the drill trajectory based on the received data and other available data (e.g., rig characteristics), implementing the drilling solution at drilling rig 210, monitoring the drilling process to gauge whether the drilling process is within a margin of error that is defined for the drill trajectory, or calculating corrections for the drilling process if the drilling process is outside of the margin of error.

Figure 5:
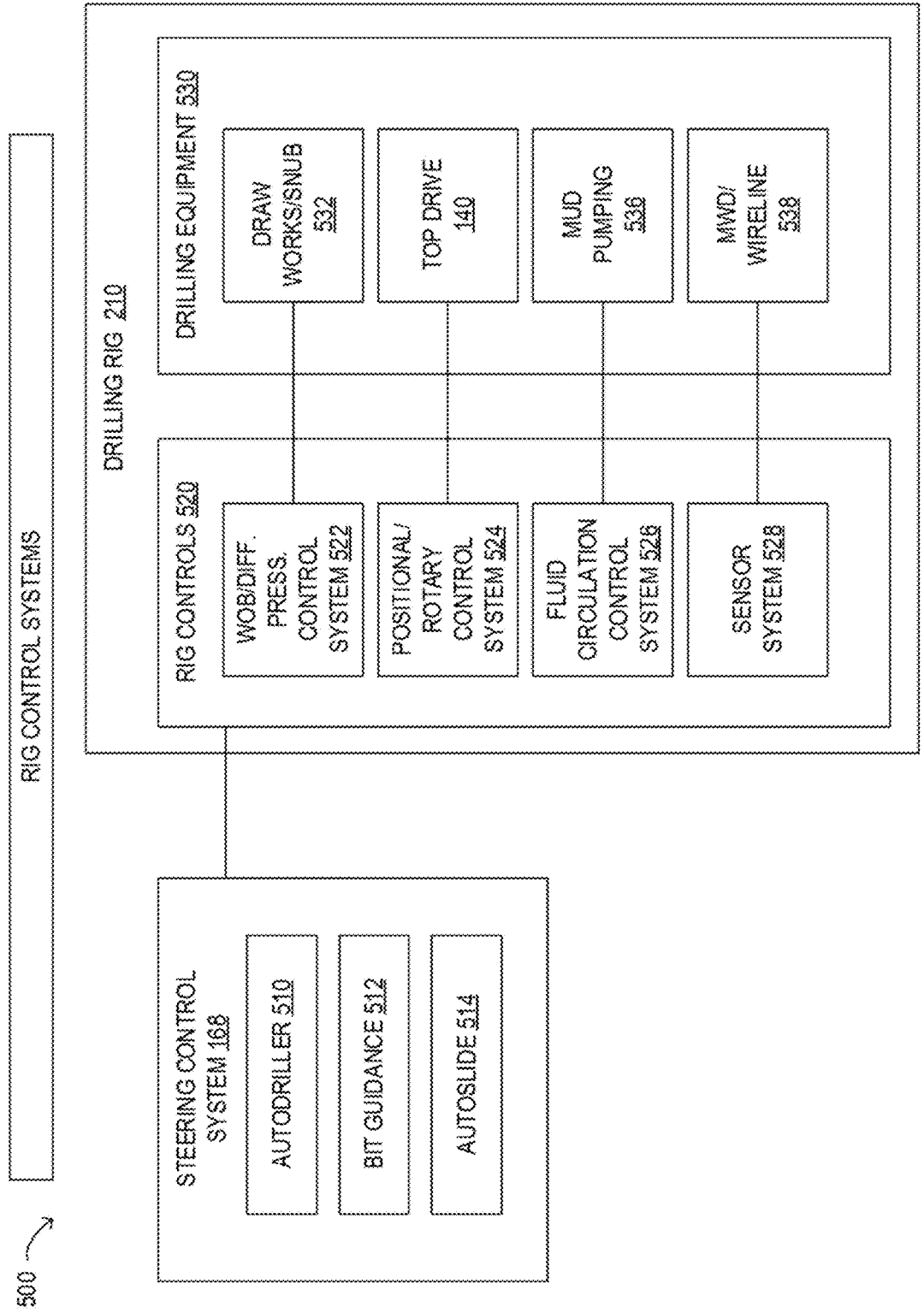
FIG. 5 is a depiction of rig control systems included in the drilling system.

Referring now to FIG. 5, an example of rig control systems 500 is illustrated in schematic form. It is noted that rig control systems 500 may include fewer or more elements than shown in FIG. 5 in different embodiments. As shown, rig control systems 500 includes steering control system 168 and drilling rig 210. Specifically, steering control system 168 is shown with logical functionality including an autodriller 510, a bit guidance 512, and an autoslide 514. Drilling rig 210 is hierarchically shown including rig controls 520, which provide secure control logic and processing capability, along with drilling equipment 530, which represents the physical equipment used for drilling at drilling rig 210. As shown, rig controls 520 include WOB/differential pressure control system 522, positional/rotary control system 524, fluid circulation control system 526, and sensor system 528, while drilling equipment 530 includes a draw works/snub 532, top drive 140, a mud pumping 536, and a measurement while drilling (MWD)/wireline 538.

Figure 10:
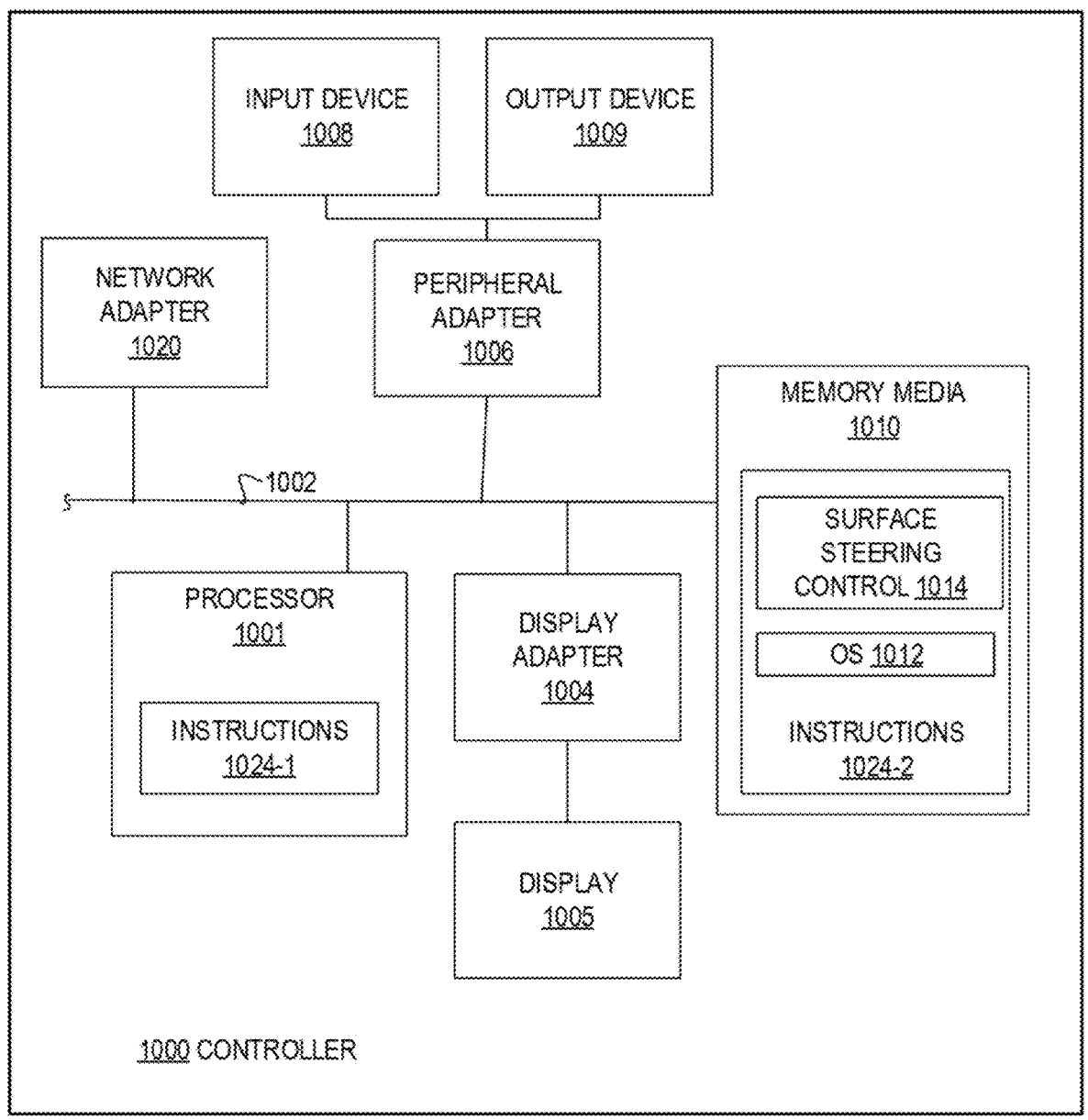
FIG. 10 is a depiction of a controller usable by the rig control systems.

Steering control system 168 represent an instance of a processor having an accessible memory storing instructions executable by the processor, such as an instance of controller 1000 shown in FIG. 10. Also, WOB/differential pressure control system 522, positional/rotary control system 524, and fluid circulation control system 526 may each represent an instance of a processor having an accessible memory storing instructions executable by the processor, such as an instance of controller 1000 shown in FIG. 10, but for example, in a configuration as a programmable logic controller (PLC) that may not include a user interface but may be used as an embedded controller. Accordingly, it is noted that each of the systems included in rig controls 520 may be a separate controller, such as a PLC, and may autonomously operate, at least to a degree. Steering control system 168 may represent hardware that executes instructions to implement a surface steerable system that provides feedback and automation capability to an operator, such as a driller. For example, steering control system 168 may cause the autodriller 510, the bit guidance 512 (also referred to as a bit guidance system (BGS)), and the autoslide 514 (among others, not shown) to be activated and executed at an appropriate time during drilling. In particular implementations, steering control system 168 may be enabled to provide a user interface during drilling, such as the user interface 850 depicted and described below with respect to FIG. 8. Accordingly, steering control system 168 may interface with rig controls 520 to facilitate manual, assisted manual, semi-automatic, and automatic operation of drilling equipment 530 included in drilling rig 210. It is noted that rig controls 520 may also accordingly be enabled for manual or user-controlled operation of drilling, and may include certain levels of automation with respect to drilling equipment 530.

In rig control systems 500 of FIG. 5, WOB/differential pressure control system 522 may be interfaced with draw works/snubbing unit 532 to control WOB of drill string 146. Positional/rotary control system 524 may be interfaced with top drive 140 to control rotation of drill string 146. Fluid circulation control system 526 may be interfaced with mud pumping 536 to control mudflow and may also receive and decode mud telemetry signals. Sensor system 528 may be interfaced with MWD/wireline 538, which may represent various BHA sensors and instrumentation equipment, among other sensors that may be downhole or at the surface.

In rig control system 500, autodriller 510 may represent an automated rotary drilling system and may be used for controlling rotary drilling. Accordingly, autodriller 510 may enable automate operation of rig controls 520 during rotary drilling, as indicated in the well plan. Bit guidance 512 may represent an automated control system to monitor and control performance and operation of the drill bit 148.

In rig control system 500, autoslide 514 may represent an automated slide drilling system and may be used for controlling slide drilling. Accordingly, autoslide 514 may enable automate operation of rig controls 520 during a slide, and may return control to steering control system 168 for rotary drilling at an appropriate time, as indicated in the well plan. In particular implementations, autoslide 514 may be enabled to provide a user interface during slide drilling to specifically monitor and control the slide. For example, autoslide 514 may rely on bit guidance 512 for orienting a tool face and on autodriller 510 to set WOB or control rotation or vibration of drill string 146.

Figures 6, 7:
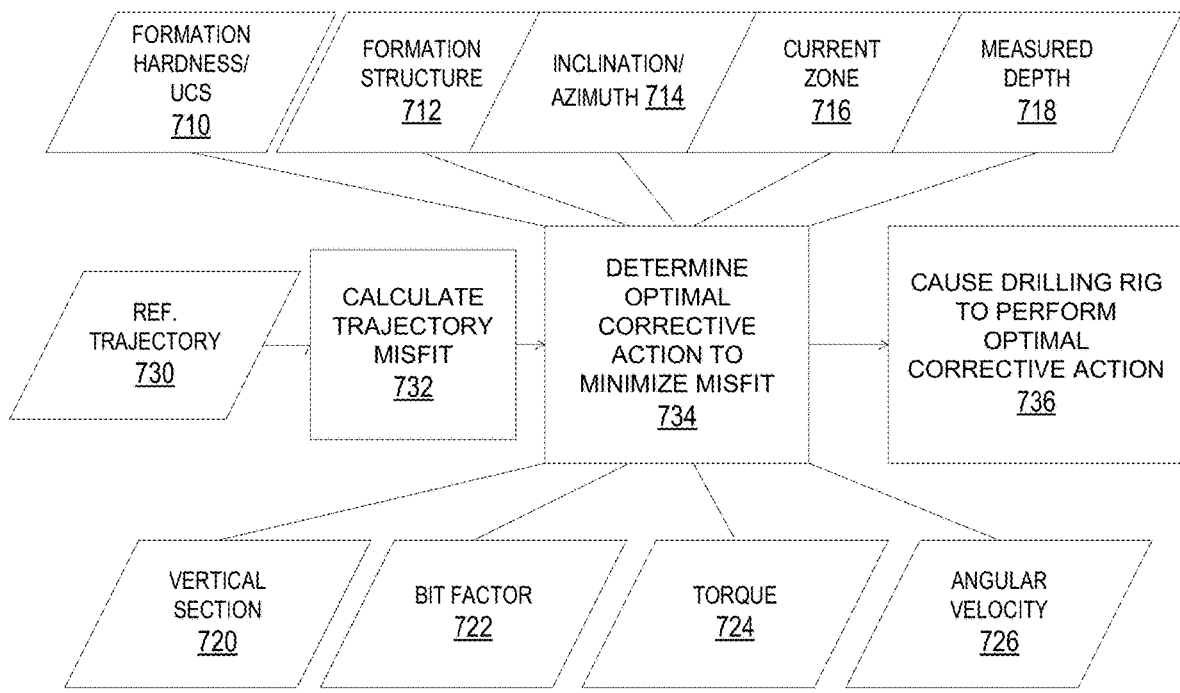
FIG. 6 is a depiction of algorithm modules used by the rig control systems.
FIG. 7 is a depiction of a steering control process used by the rig control systems.

FIG. 6 illustrates one embodiment of control algorithm modules 600 used with steering control system 168. The control algorithm modules 600 of FIG. 6 include: a slide control executor 650 that is responsible for managing the execution of the slide control algorithms; a slide control configuration provider 652 that is responsible for validating, maintaining, and providing configuration parameters for the other software modules; a BHA & pipe specification provider 654 that is responsible for managing and providing details of BHA 149 and drill string 146 characteristics; a borehole geometry model 656 that is responsible for keeping track of the borehole geometry and providing a representation to other software modules; a top drive orientation impact model 658 that is responsible for modeling the impact that changes to the angular orientation of top drive 140 have had on the tool face control; a top drive oscillator impact model 660 that is responsible for modeling the impact that oscillations of top drive 140 has had on the tool face control; an ROP impact model 662 that is responsible for modeling the effect on the tool face control of a change in ROP or a corresponding ROP set point; a WOB impact model 664 that is responsible for modeling the effect on the tool face control of a change in WOB or a corresponding WOB set point; a differential pressure impact model 666 that is responsible for modeling the effect on the tool face control of a change in differential pressure (DP) or a corresponding DP set point; a torque model 668 that is responsible for modeling the comprehensive representation of torque for surface, downhole, break over, and reactive torque, modeling impact of those torque values on tool face control, and determining torque operational thresholds; a tool face control evaluator 672 that is responsible for evaluating factors impacting tool face control and whether adjustments need to be projected, determining whether re-alignment off-bottom is indicated, and determining off-bottom tool face operational threshold windows; a tool face projection 670 that is responsible for projecting tool face behavior for top drive 140, the top drive oscillator, and auto driller adjustments; a top drive adjustment calculator 674 that is responsible for calculating top drive adjustments resultant to tool face projections; an oscillator adjustment calculator 676 that is responsible for calculating oscillator adjustments resultant to tool face projections; and an autodriller adjustment calculator 678 that is responsible for calculating adjustments to autodriller 510 resultant to tool face projections.

FIG. 7 illustrates one embodiment of a steering control process 700 for determining a corrective action for drilling. Steering control process 700 may be used for rotary drilling or slide drilling in different embodiments.

Steering control process 700 in FIG. 7 illustrates a variety of inputs that can be used to determine an optimum corrective action. As shown in FIG. 7, the inputs include formation hardness/unconfined compressive strength (UCS) 710, formation structure 712, inclination/azimuth 714, current zone 716, measured depth 718, desired tool face, vertical section 720, bit factor 722, mud motor torque 724, reference trajectory 730, vertical section 720, bit factor 722, torque 724 and angular velocity 726. In FIG. 7, reference trajectory 730 of borehole 106 is determined to calculate a trajectory misfit in a step 732. Step 732 may output the trajectory misfit to determine a corrective action to minimize the misfit at step 734, which may be performed using the other inputs described above. Then, at step 736, the drilling rig is caused to perform the corrective action.

It is noted that in some implementations, at least certain portions of steering control process 700 may be automated or performed without user intervention, such as using rig control systems 700 (see FIG. 7). In other implementations, the corrective action in step 736 may be provided or communicated (by display, short message service (SMS) message, email, or otherwise) to one or more human operators, who may then take appropriate action. The human operators may be members of a rig crew, which may be located at or near drilling rig 210, or may be located remotely from drilling rig 210.

Figure 8:
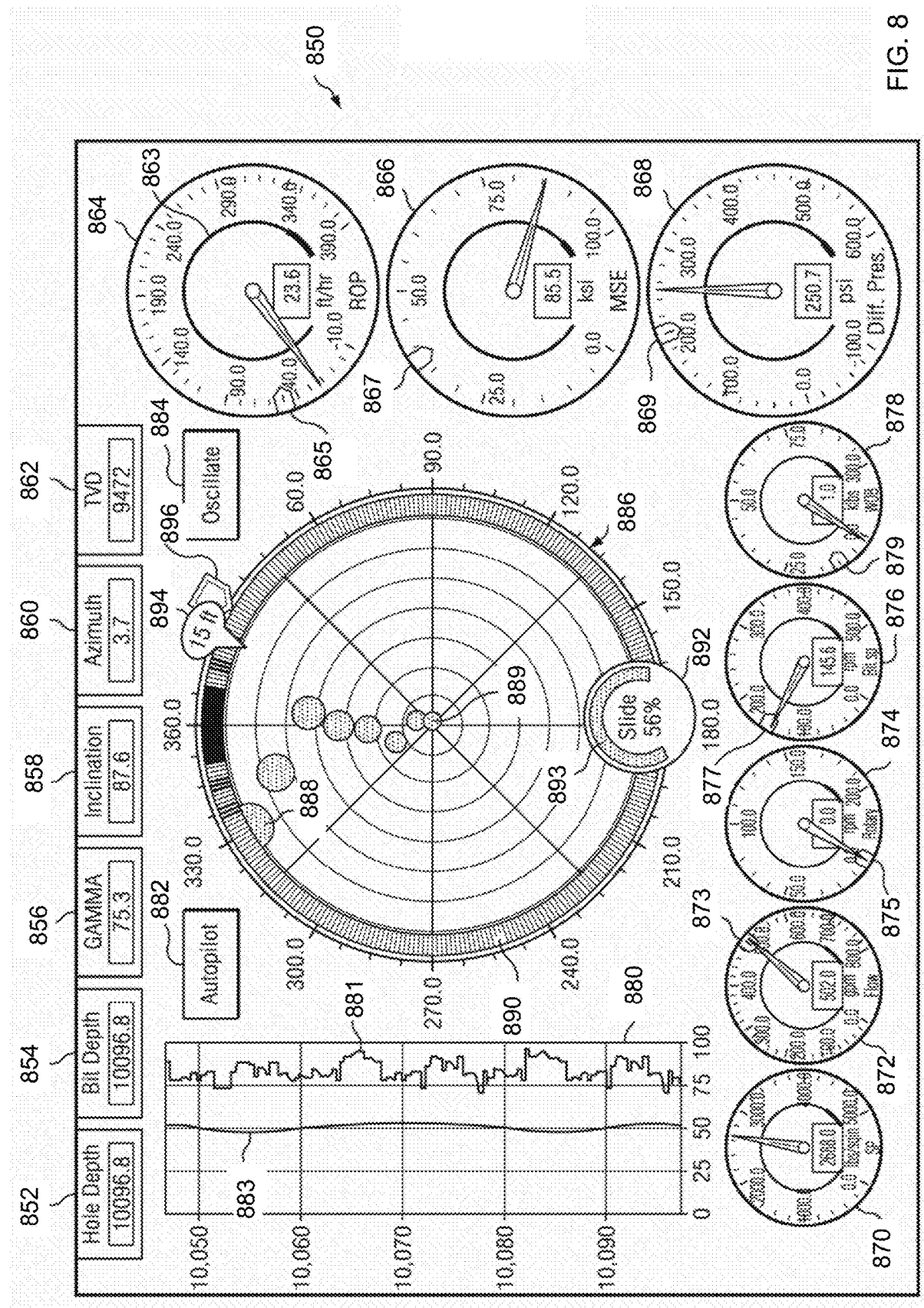
FIG. 8 is a depiction of a graphical user interface provided by the rig control systems.

Referring to FIG. 8, one embodiment of a user interface 850 that may be generated by steering control system 168 for monitoring and operation by a human operator is illustrated. User interface 850 may provide many different types of information in an easily accessible format. For example, user interface 850 may be shown on a computer monitor, a television, a viewing screen (e.g., a display device) associated with steering control system 168.

As shown in FIG. 8, user interface 850 provides visual indicators such as a hole depth indicator 852, a bit depth indicator 854, a GAMMA indicator 856, an inclination indicator 858, an azimuth indicator 860, and a TVD indicator 862. Other indicators may also be provided, including a ROP indicator 864, a mechanical specific energy (MSE) indicator 866, a differential pressure indicator 868, a standpipe pressure indicator 870, a flow rate indicator 872, a rotary RPM (angular velocity) indicator 874, a bit speed indicator 876, and a WOB indicator 878.

In FIG. 8, at least some of indicators 864, 866, 868, 870, 872, 874, 876, and 878 may include a marker representing a target value. For example, markers may be set as certain given values, but it is noted that any desired target value may be used. Although not shown, in some embodiments, multiple markers may be present on a single indicator. The markers may vary in color or size. For example, ROP indicator 864 may include a marker 865 indicating that the target value is 50 feet/hour (or 15 meters per hour (m/h)). MSE indicator 866 may include a marker 867 indicating that the target value is 37 kilopounds per square inch (ksi) (or 255 Megapascal (MPa)). Differential pressure indicator 868 may include a marker 869 indicating that the target value is 200 pounds per square inch (psi) (or 1.38 kilopascals (kPa)). ROP indicator 864 may include a marker 865 indicating that the target value is 50 feet/hour (or 15 meters/hour). Standpipe pressure indicator 870 may have no marker in the present example. Flow rate indicator 872 may include a marker 873 indicating that the target value is 500 gallons per minute (gpm) (or 31.5 liters per second (L/s)). Rotary rotations per minute (RPM) indicator 874 may include a marker 875 indicating that the target value is 0 RPM (e.g., due to sliding). Bit speed indicator 876 may include a marker 877 indicating that the target value is 150 RPM. WOB indicator 878 may include a marker 879 indicating that the target value is 10 kilopounds (klbs) (or 4,500 kilograms (kg)). Each indicator may also include a colored band (e.g., ROP band 863), or another marking, to indicate, for example, whether the respective gauge value is within a safe range (e.g., indicated by a green color), within a caution range (e.g., indicated by a yellow color), or within a danger range (e.g., indicated by a red color).

In FIG. 8, a log chart 880 may visually indicate depth versus one or more measurements (e.g., may represent log inputs relative to a progressing depth chart). For example, log chart 880 may have a Y-axis representing depth and an X-axis representing a measurement such as GAMMA count 881 (as shown), ROP 883 (e.g., empirical ROP and normalized ROP), or resistivity. An autopilot button 882 and an oscillate button 884 may be used to control activity. For example, autopilot button 882 may be used to engage or disengage autodriller 510, while oscillate button 884 may be used to directly control oscillation of drill string 146 or to engage/disengage an external hardware device or controller.

In FIG. 8, a circular chart 886 may provide current and historical tool face orientation information (e.g., which way the bend is pointed). For purposes of illustration, circular chart 886 represents three hundred and sixty degrees. A series of circles within circular chart 886 may represent a timeline of tool face orientations, with the sizes of the circles indicating the temporal position of each circle. For example, larger circles may be more recent than smaller circles, so a largest circle 888 may be the newest reading and a smallest circle 889 may be the oldest reading. In other embodiments, circles 889, 888 may represent the energy or progress made via size, color, shape, a number within a circle, etc. For example, a size of a particular circle may represent an accumulation of orientation and progress for the period of time represented by the circle. In other embodiments, concentric circles representing time (e.g., with the outside of circular chart 886 being the most recent time and the center point being the oldest time) may be used to indicate the energy or progress (e.g., via color or patterning such as dashes or dots rather than a solid line).

In user interface 850, circular chart 886 may also be color coded, with the color coding existing in a band 890 around circular chart 886 or positioned or represented in other ways. The color-coding may use colors to indicate activity in a certain direction. For example, the color red may indicate the highest level of activity, while the color blue may indicate the lowest level of activity. Furthermore, the arc range in degrees of a color may indicate the amount of deviation. Accordingly, a relatively narrow (e.g., thirty degrees) arc of red with a relatively broad (e.g., three hundred degrees) arc of blue may indicate that most activity is occurring in a particular tool face orientation with little deviation. As shown in user interface 850, the color blue may extend from approximately 22-337 degrees, the color green may extend from approximately 15-22 degrees and 337-345 degrees, the color yellow may extend a few degrees around the 13 and 345 degree marks, while the color red may extend from approximately 347-10 degrees. Transition colors or shades may be used with, for example, the color orange marking the transition between red and yellow or a light blue marking the transition between blue and green. This color-coding may enable user interface 850 to provide an intuitive summary of how narrow the standard deviation is and how much of the energy intensity is being expended in the proper direction. Furthermore, the center of energy may be viewed relative to the target. For example, user interface 850 may clearly show that the target is at 90 degrees but the center of energy is at 45 degrees.

In user interface 850, other indicators, such as a slide indicator 892, may indicate how much time remains until a slide occurs or how much time remains for a current slide. For example, slide indicator 892 may represent a time, a percentage (e.g., as shown, a current slide may be 56% complete), a distance completed, or a distance remaining. Slide indicator 892 may graphically display information using, for example, a colored bar 893 that increases or decreases with slide progress. In some embodiments, slide indicator 892 may be built into circular chart 886 (e.g., around the outer edge with an increasing/decreasing band), while in other embodiments slide indicator 892 may be a separate indicator such as a meter, a bar, a gauge, or another indicator type. In various implementations, slide indicator 892 may be refreshed by autoslide 514.

In user interface 850, an error indicator 894 may indicate a magnitude and a direction of error. For example, error indicator 894 may indicate that an estimated drill bit position is a certain distance from the planned trajectory, with a location of error indicator 894 around the circular chart 886 representing the heading. For example, FIG. 8 illustrates an error magnitude of 15 feet and an error direction of 15 degrees. Error indicator 894 may be any color but may be red for purposes of example. It is noted that error indicator 894 may present a zero if there is no error. Error indicator may represent that drill bit 148 is on the planned trajectory using other means, such as being a green color. Transition colors, such as yellow, may be used to indicate varying amounts of error. In some embodiments, error indicator 894 may not appear unless there is an error in magnitude or direction. A marker 896 may indicate an ideal slide direction. Although not shown, other indicators may be present, such as a bit life indicator to indicate an estimated lifetime for the current bit based on a value such as time or distance.

It is noted that user interface 850 may be arranged in many different ways. For example, colors may be used to indicate normal operation, warnings, and problems. In such cases, the numerical indicators may display numbers in one color (e.g., green) for normal operation, may use another color (e.g., yellow) for warnings, and may use yet another color (e.g., red) when a serious problem occurs. The indicators may also flash or otherwise indicate an alert. The gauge indicators may include colors (e.g., green, yellow, and red) to indicate operational conditions and may also indicate the target value (e.g., an ROP of 100 feet/hour). For example, ROP indicator 868 may have a green bar to indicate a normal level of operation (e.g., from 10-300 feet/hour), a yellow bar to indicate a warning level of operation (e.g., from 300-360 feet/hour), and a red bar to indicate a dangerous or otherwise out of parameter level of operation (e.g., from 360-390 feet/hour). ROP indicator 868 may also display a marker at 100 feet/hour to indicate the desired target ROP.

Furthermore, the use of numeric indicators, gauges, and similar visual display indicators may be varied based on factors such as the information to be conveyed and the personal preference of the viewer. Accordingly, user interface 850 may provide a customizable view of various drilling processes and information for a particular individual involved in the drilling process. For example, steering control system 168 may enable a user to customize the user interface 850 as desired, although certain features (e.g., standpipe pressure) may be locked to prevent a user from intentionally or accidentally removing important drilling information from user interface 850. Other features and attributes of user interface 850 may be set by user preference. Accordingly, the level of customization and the information shown by the user interface 850 may be controlled based on who is viewing user interface 850 and their role in the drilling process.

Figure 9:
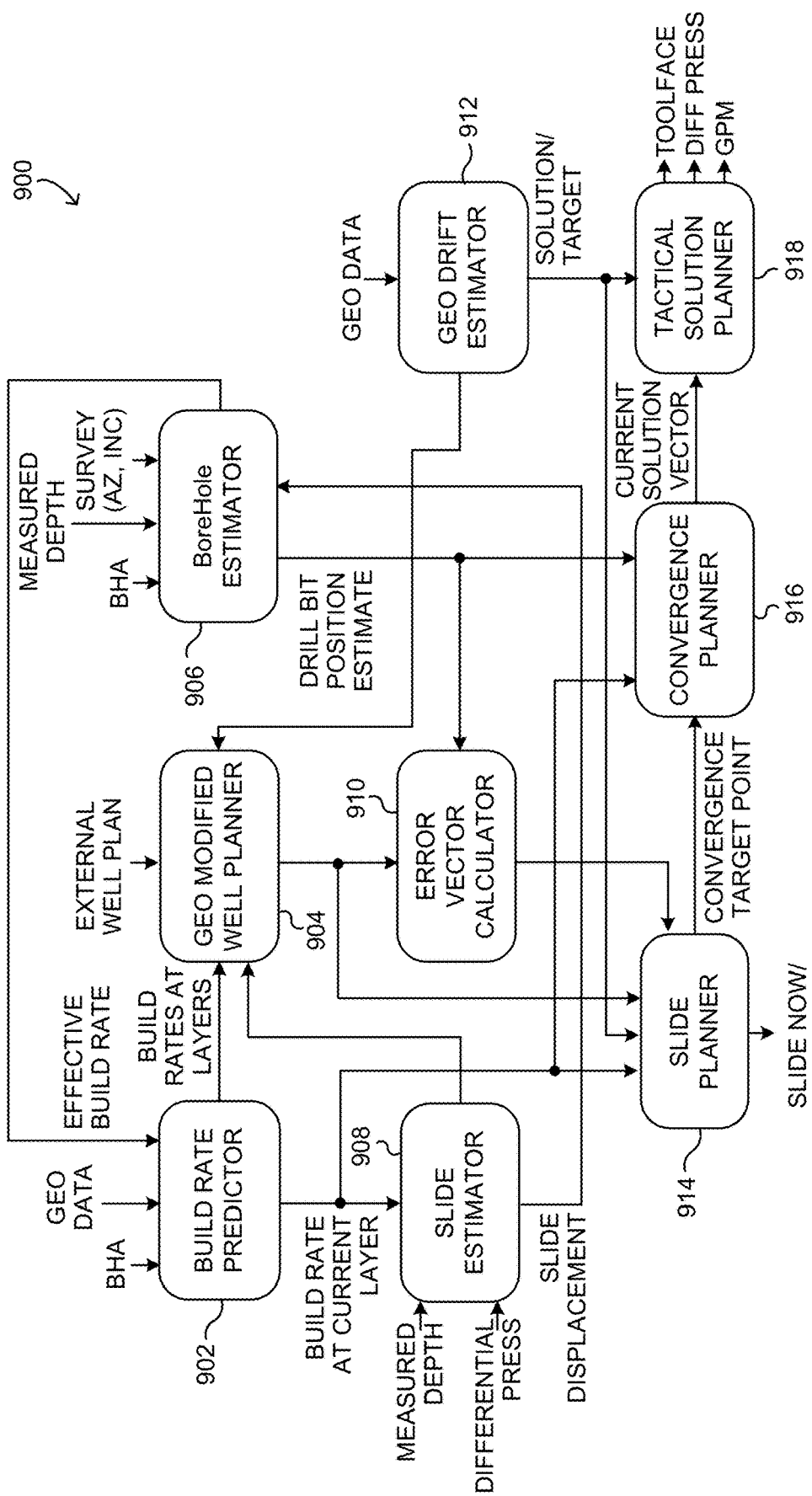
FIG. 9 is a depiction of a guidance control loop performed by the rig control systems.

Referring to FIG. 9, one embodiment of a guidance control loop (GCL) 900 is shown in further detail GCL 900 may represent one example of a control loop or control algorithm executed under the control of steering control system 168. GCL 900 may include various functional modules, including a build rate predictor 902, a geo modified well planner 904, a borehole estimator 906, a slide estimator 908, an error vector calculator 910, a geological drift estimator 912, a slide planner 914, a convergence planner 916, and a tactical solution planner 918. In the following description of GCL 900, the term "external input" refers to input received from outside GCL 900, while "internal input" refers to input exchanged between functional modules of GCL 900.

In FIG. 9, build rate predictor 902 receives external input representing BHA information and geological information, receives internal input from the borehole estimator 906, and provides output to geo modified well planner 904, slide estimator 908, slide planner 914, and convergence planner 916. Build rate predictor 902 is configured to use the BHA information and geological information to predict drilling build rates of current and future sections of borehole 106. For example, build rate predictor 902 may determine how aggressively a curve will be built for a given formation with BHA 149 and other equipment parameters.

In FIG. 9, build rate predictor 902 may use the orientation of BHA 149 to the formation to determine an angle of attack for formation transitions and build rates within a single layer of a formation. For example, if a strata layer of rock is below a strata layer of sand, a formation transition exists between the strata layer of sand and the strata layer of rock. Approaching the strata layer of rock at a 90-degree angle may provide a good tool face and a clean drill entry, while approaching the rock layer at a 45-degree angle may build a curve relatively quickly. An angle of approach that is near parallel may cause the drill bit 148 to skip off the upper surface of the strata layer of rock. Accordingly, build rate predictor 902 may calculate BHA orientation to account for formation transitions. Within a single strata layer, build rate predictor 902 may use the BHA orientation to account for internal layer characteristics (e.g., grain) to determine build rates for different parts of a strata layer. The BHA information may include bit characteristics, mud motor bend setting, stabilization and mud motor bit to bend distance. The geological information may include formation data such as compressive strength, thicknesses, and depths for formations encountered in the specific drilling location. Such information may enable a calculation-based prediction of the build rates and ROP that may be compared to both results obtained while drilling borehole 106 and regional historical results (e.g., from the regional drilling DB 412) to improve the accuracy of predictions as drilling progresses. Build rate predictor 902 may also be used to plan convergence adjustments and confirm in advance of drilling that targets can be achieved with current parameters.

In FIG. 9, geo modified well planner 904 receives external input representing a well plan, internal input from build rate predictor 902 and geo drift estimator 912, and provides output to slide planner 914 and error vector calculator 910. Geo modified well planner 904 uses the input to determine whether there is a more desirable trajectory than that provided by the well plan, while staying within specified error limits. More specifically, geo modified well planner 904 takes geological information (e.g., drift) and calculates whether another trajectory solution to the target may be more efficient in terms of cost or reliability. The outputs of geo modified well planner 904 to slide planner 914 and error vector calculator 910 may be used to calculate an error vector based on the current vector to the newly calculated trajectory and to modify slide predictions. In some embodiments, geo modified well planner 904 (or another module) may provide functionality needed to track a formation trend. For example, in horizontal wells, a geologist may provide steering control system 168 with a target inclination angle as a set point for steering control system 168 to control. For example, the geologist may enter a target to steering control system 168 of 90.5-91.0 degrees of inclination angle for a section of borehole 106. Geo modified well planner 904 may then treat the target as a vector target, while remaining within the error limits of the original well plan. In some embodiments, geo modified well planner 904 may be an optional module that is not used unless the well plan is to be modified. For example, if the well plan is marked in steering control system 168 as non-modifiable, geo modified well planner 904 may be bypassed altogether or geo modified well planner 904 may be configured to pass the well plan through without any changes.

In FIG. 9, borehole estimator 906 may receive external inputs representing BHA information, measured depth information, survey information (e.g., azimuth angle and inclination angle), and may provide outputs to build rate predictor 902, error vector calculator 910, and convergence planner 916. Borehole estimator 906 may be configured to provide an estimate of the actual borehole and drill bit position and trajectory angle without delay, based on either straight-line projections or projections that incorporate sliding. Borehole estimator 906 may be used to compensate for a sensor being physically located some distance behind drill bit 148 (e.g., 50 feet) in drill string 146, which makes sensor readings lag the actual bit location by 50 feet. Borehole estimator 906 may also be used to compensate for sensor measurements that may not be continuous (e.g., a sensor measurement may occur every 100 feet). Borehole estimator 906 may provide the most accurate estimate from the surface to the last survey location based on the collection of survey measurements. In addition, borehole estimator 906 may take the slide estimate from slide estimator 908 (described below) and extend the slide estimate from the last survey point to a current location of drill bit 148. Using the combination of these two estimates, borehole estimator 906 may provide steering control system 168 with an estimate of the drill bit's location and trajectory angle from which guidance and steering solutions can be derived. An additional metric that can be derived from the borehole estimate is the effective build rate that is achieved throughout the drilling process.

In FIG. 9, slide estimator 908 receives external inputs representing measured depth and differential pressure information, receives internal input from build rate predictor 902, and provides output to borehole estimator 906 and geo modified well planner 904. Slide estimator 908 may be configured to sample tool face orientation, differential pressure, measured depth (MD) incremental movement, MSE, and other sensor feedback to quantify/estimate a deviation vector and progress while sliding.

Traditionally, deviation from the slide would be predicted by a human operator based on experience. The operator would, for example, use a long slide cycle to assess what likely was accomplished during the last slide. However, the results are generally not confirmed until the downhole survey sensor point passes the slide portion of the borehole, often resulting in a response lag defined by a distance of the sensor point from the drill bit tip (e.g., approximately 50 feet). Such a response lag may introduce inefficiencies in the slide cycles due to over/under correction of the actual trajectory relative to the planned trajectory.

In GCL 900, using slide estimator 908, each tool face update may be algorithmically merged with the average differential pressure of the period between the previous and current tool face readings, as well as the MD change during this period to predict the direction, angular deviation, and MD progress during the period. As an example, the periodic rate may be between 10 and 60 seconds per cycle depending on the tool face update rate of downhole tool 166. With a more accurate estimation of the slide effectiveness, the sliding efficiency can be improved. The output of slide estimator 908 may accordingly be periodically provided to borehole estimator 906 for accumulation of well deviation information, as well to geo modified well planner 904. Some or all of the output of the slide estimator 908 may be output to an operator, such as shown in the user interface 850 of FIG. 8.

In FIG. 9, error vector calculator 910 may receive internal input from geo modified well planner 904 and borehole estimator 906. Error vector calculator 910 may be configured to compare the planned well trajectory to an actual borehole trajectory and drill bit position estimate. Error vector calculator 910 may provide the metrics used to determine the error (e.g., how far off) the current drill bit position and trajectory are from the well plan. For example, error vector calculator 910 may calculate the error between the current bit position and trajectory to the planned trajectory and the desired bit position. Error vector calculator 910 may also calculate a projected bit position/projected trajectory representing the future result of a current error.

In FIG. 9, geological drift estimator 912 receives external input representing geological information and provides outputs to geo modified well planner 904, slide planner 914, and tactical solution planner 918. During drilling, drift may occur as the particular characteristics of the formation affect the drilling direction. More specifically, there may be a trajectory bias that is contributed by the formation as a function of ROP and BHA 149. Geological drift estimator 912 is configured to provide a drift estimate as a vector that can then be used to calculate drift compensation parameters that can be used to offset the drift in a control solution.

In FIG. 9, slide planner 914 receives internal input from build rate predictor 902, geo modified well planner 904, error vector calculator 910, and geological drift estimator 912, and provides output to convergence planner 916 as well as an estimated time to the next slide. Slide planner 914 may be configured to evaluate a slide/drill ahead cost calculation and plan for sliding activity, which may include factoring in BHA wear, expected build rates of current and expected formations, and the well plan trajectory. During drill ahead, slide planner 914 may attempt to forecast an estimated time of the next slide to aid with planning. For example, if additional lubricants (e.g., fluorinated beads) are indicated for the next slide, and pumping the lubricants into drill string 146 has a lead time of 30 minutes before the slide, the estimated time of the next slide may be calculated and then used to schedule when to start pumping the lubricants. Functionality for a loss circulation material (LCM) planner may be provided as part of slide planner 914 or elsewhere (e.g., as a stand-alone module or as part of another module described herein). The LCM planner functionality may be configured to determine whether additives should be pumped into the borehole based on indications such as flow-in versus flow-back measurements. For example, if drilling through a porous rock formation, fluid being pumped into the borehole may get lost in the rock formation. To address this issue, the LCM planner may control pumping LCM into the borehole to clog up the holes in the porous rock surrounding the borehole to establish a more closed-loop control system for the fluid.

In FIG. 9, slide planner 914 may also look at the current position relative to the next connection. A connection may happen every 90 to 100 feet (or some other distance or distance range based on the particulars of the drilling operation) and slide planner 914 may avoid planning a slide when close to a connection or when the slide would carry through the connection. For example, if the slide planner 914 is planning a 50-foot slide but only 20 feet remain until the next connection, slide planner 914 may calculate the slide starting after the next connection and make any changes to the slide parameters to accommodate waiting to slide until after the next connection. Such flexible implementation avoids inefficiencies that may be caused by starting the slide, stopping for the connection, and then having to reorient the tool face before finishing the slide. During slides, slide planner 914 may provide some feedback as to the progress of achieving the desired goal of the current slide. In some embodiments, slide planner 914 may account for reactive torque in drill string 146. More specifically, when rotating is occurring, there is a reactional torque wind up in drill string 146. When the rotating is stopped, drill string 146 unwinds, which changes tool face orientation and other parameters. When rotating is started again, drill string 146 starts to wind back up. Slide planner 914 may account for the reactional torque so that tool face references are maintained, rather than stopping rotation and then trying to adjust to a desired tool face orientation. While not all downhole tools may provide tool face orientation when rotating, using one that does supply such information for GCL 900 may significantly reduce the transition time from rotating to sliding.

In FIG. 9, convergence planner 916 receives internal inputs from build rate predictor 902, borehole estimator 906, and slide planner 914, and provides output to tactical solution planner 918. Convergence planner 916 is configured to provide a convergence plan when the current drill bit position is not within a defined margin of error of the planned well trajectory. The convergence plan represents a path from the current drill bit position to an achievable and desired convergence target point along the planned trajectory. The convergence plan may take account the amount of sliding/drilling ahead that has been planned to take place by slide planner 914. Convergence planner 916 may also use BHA orientation information for angle of attack calculations when determining convergence plans as described above with respect to build rate predictor 902. The solution provided by convergence planner 916 defines a new trajectory solution for the current position of drill bit 148. The solution may be immediate without delay, or planned for implementation at a future time that is specified in advance.

In FIG. 9, tactical solution planner 918 receives internal inputs from geological drift estimator 912 and convergence planner 916, and provides external outputs representing information such as tool face orientation, differential pressure, and mud flow rate. Tactical solution planner 918 is configured to take the trajectory solution provided by convergence planner 916 and translate the solution into control parameters that can be used to control drilling rig 210. For example, tactical solution planner 918 may convert the solution into settings for control systems 522, 524, and 526 to accomplish the actual drilling based on the solution. Tactical solution planner 918 may also perform performance optimization to optimizing the overall drilling operation as well as optimizing the drilling itself (e.g., how to drill faster).

Other functionality may be provided by GCL 900 in additional modules or added to an existing module. For example, there is a relationship between the rotational position of the drill pipe on the surface and the orientation of the downhole tool face. Accordingly, GCL 900 may receive information corresponding to the rotational position of the drill pipe on the surface. GCL 900 may use this surface positional information to calculate current and desired tool face orientations. These calculations may then be used to define control parameters for adjusting the top drive 140 to accomplish adjustments to the downhole tool face in order to steer the trajectory of borehole 106.

For purposes of example, an object-oriented software approach may be utilized to provide a class-based structure that may be used with GCL 900 or other functionality provided by steering control system 168. In GCL 900, a drilling model class may be defined to capture and define the drilling state throughout the drilling process. The drilling model class may include information obtained without delay. The drilling model class may be based on the following components and sub-models: a drill bit model, a borehole model, a rig surface gear model, a mud pump model, a WOB/differential pressure model, a positional/rotary model, an MSE model, an active well plan, and control limits. The drilling model class may produce a control output solution and may be executed via a main processing loop that rotates through the various modules of GCL 900. The drill bit model may represent the current position and state of drill bit 148. The drill bit model may include a three dimensional (3D) position, a drill bit trajectory, BHA information, bit speed, and tool face (e.g., orientation information). The 3D position may be specified in north-south (NS), east-west (EW), and true vertical depth (TVD). The drill bit trajectory may be specified as an inclination angle and an azimuth angle. The BHA information may be a set of dimensions defining the active BHA. The borehole model may represent the current path and size of the active borehole. The borehole model may include hole depth information, an array of survey points collected along the borehole path, a gamma log, and borehole diameters. The hole depth information is for current drilling of borehole 106. The borehole diameters may represent the diameters of borehole 106 as drilled over current drilling. The rig surface gear model may represent pipe length, block height, and other models, such as the mud pump model, WOB/differential pressure model, positional/rotary model, and MSE model. The mud pump model represents mud pump equipment and includes flow rate, standpipe pressure, and differential pressure. The WOB/differential pressure model represents draw works or other WOB/differential pressure controls and parameters, including WOB. The positional/rotary model represents top drive or other positional/rotary controls and parameters including rotary RPM and spindle position. The active well plan represents the target borehole path and may include an external well plan and a modified well plan. The control limits represent defined parameters that may be set as maximums and/or minimums. For example, control limits may be set for the rotary RPM in the top drive model to limit the maximum RPMs to the defined level. The control output solution may represent the control parameters for drilling rig 210.

Each functional module of GCL 900 may have behavior encapsulated within a respective class definition. During a processing window, the individual functional modules may have an exclusive portion in time to execute and update the drilling model. For purposes of example, the processing order for the functional modules may be in the sequence of geo modified well planner 904, build rate predictor 902, slide estimator 908, borehole estimator 906, error vector calculator 910, slide planner 914, convergence planner 916, geological drift estimator 912, and tactical solution planner 918. It is noted that other sequences may be used in different implementations.

In FIG. 9, GCL 900 may rely on a programmable timer module that provides a timing mechanism to provide timer event signals to drive the main processing loop. While steering control system 168 may rely on timer and date calls driven by the programming environment, timing may be obtained from other sources than system time. In situations where it may be advantageous to manipulate the clock (e.g., for evaluation and testing), a programmable timer module may be used to alter the system time. For example, the programmable timer module may enable a default time set to the system time and a time scale of 1.0, may enable the system time of steering control system 168 to be manually set, may enable the time scale relative to the system time to be modified, or may enable periodic event time requests scaled to a requested time scale.

Referring now to FIG. 10, a block diagram illustrating selected elements of an embodiment of a controller 1000 for performing surface steering according to the present disclosure. In various embodiments, controller 1000 may represent an implementation of steering control system 168. In other embodiments, at least certain portions of controller 1000 may be used for control systems (e.g., autodriller 510, bit guidance 512, autoslide 514, WOB/differential pressure control system 522, positional/rotary control system 524, and fluid circulation control system 526 (see FIG. 5).

In the embodiment depicted in FIG. 10, controller 1000 includes processor 1001 coupled via shared bus 1002 to storage media collectively identified as memory media 1010.

Controller 1000, as depicted in FIG. 10, further includes network adapter 1020 that interfaces the controller 1000 to a network (not shown in FIG. 10). In embodiments suitable for use with user interfaces, controller 1000, as depicted in FIG. 10, may include peripheral adapter 1006, which provides connectivity for the use of input device 1008 and output device 1009. Input device 1008 may represent a device for user input, such as a keyboard or a mouse, or even a video camera. Output device 1009 may represent a device for providing signals or indications to a user, such as loudspeakers for generating audio signals.

Controller 1000 is shown in FIG. 10 including display adapter 1004 and further includes a display device 1005. Display adapter 1004 may interface shared bus 1002, or another bus, with an output port for one or more display devices, such as display device 1005. Display device 1005 may be implemented as a liquid crystal display screen, a computer monitor, a television or the like. Display device 1005 may comply with a display standard for the corresponding type of display. Standards for computer monitors include analog standards such as video graphics array (VGA), extended graphics array (XGA), etc., or digital standards such as digital visual interface (DVI), high-definition multimedia interface (HDMI), among others. A television display may comply with standards such as NTSC (National Television System Committee), PAL (Phase Alternating Line), or another suitable standard. Display device 1005 may include an output device 1009, such as one or more integrated speakers to play audio content, or may include an input device 1008, such as a microphone or video camera.

In FIG. 10, memory media 1010 encompasses persistent and volatile media, fixed and removable media, and magnetic and semiconductor media. Memory media 1010 is operable to store instructions, data, or both. Memory media 1010 as shown includes sets or sequences of instructions 1024-2, namely, an operating system 1012 and surface steering control 1014. Operating system 1012 may be a UNIX or UNIX-like operating system, a Windows® family operating system, or another suitable operating system. Instructions 1024 may also reside, completely or at least partially, within processor 1001 during execution thereof. It is further noted that processor 1001 may be configured to receive instructions 1024-1 from instructions 1024-2 via shared bus 1002. In some embodiments, memory media 1010 is configured to store and provide executable instructions for executing GCL 900, as mentioned previously, among other methods and operations disclosed herein.

I. Variable Load Drilling Execution and Automation Integration:

Drilling operations (e.g., drilling a stand with AutoStand and running casing) can present a variable load to the power generation system of the drilling system 100. A power generation system for a drilling system 100 can include multiple diesel power generators or may include multi-fuel generators, high line power, turbines, dedicated gas generators, generation running of field or flare gas, battery storage devices, capacitor storage systems, flywheel energy storage, mechanical potential energy storage devices, solar panels, wind turbines or any combination of these elements. The drilling process can include four primary loads including the top drive that rotates the drill string, the pumps that provide hydraulic horsepower and pump fluid through the system, the drawworks that lifts and lowers the drill pipe into the hole, and the local use of power by facilities and other applications around the rig site.

Figure 11:
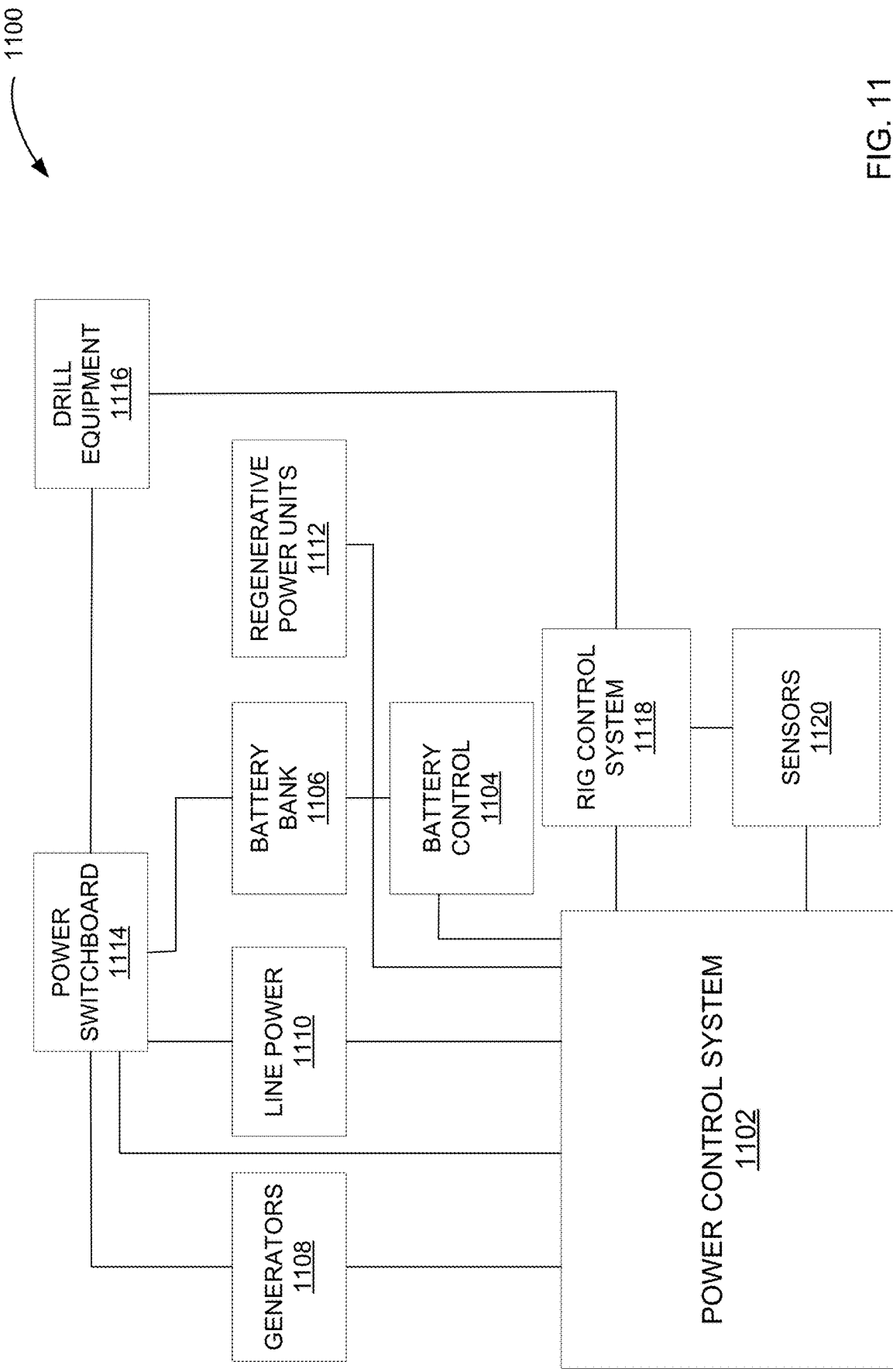
FIG. 11 illustrates an exemplary electrical power system architecture according with embodiments of the disclosure.

FIG. 11 illustrates an exemplary electrical power system architecture 1100 according with embodiments of the disclosure, such as for the drilling system 100. The electrical power system architecture 1100 can include a power control system 1102. The power control system 1102 can, among other things, send instructions to the battery control system 1104. The battery control system 1104 can receive instructions from the power control system 1102 and can control the charging of the batteries 1106. The batteries 1106 can include one or more rechargeable power cells. The rechargeable power cells can include but are not limited to lithium ion batteries, lead acid batteries, nickel-cadmium batteries, and nickel-metal hydride batteries. Other types of secondary batteries can be used.

The batteries 1106 can provide electrical power to the drilling system 100 and its various equipment. The batteries 1106 can supplement other electrical power (e.g., one or more generators 1108, line power 1110, or regenerative power units 1112) for the drilling system 100. The power control system 1102 can control the selection of source of electrical power through the power switchboard 1114. The power switchboard 1114 can direct electrical power to the batteries 1106 to recharge.

The power control system 1102 can receive various inputs from the rig control system 1118 and one or more sensors 1120. The rig control system 1118 can be the controller 1000 as shown in FIG. 10. The one or more sensors 1120 can include a temperature sensor, a barometric pressure sensor, a relative humidity sensor, and a wind sensor, among others.

In various embodiments a power control system 1102 can delay a functional transition that would result in a current requirement spike or reduce the aggressiveness of any power driven system (e.g., drilling system) until a generator 1108 can be turned on or a battery 1106 or other storage device can be charged to a more suitable level. This delay and drilling activity can be balanced against the commercial loss of productivity, the impact to well bore placement and quality, the impact to environmental, social, governance (ESG) emissions, the impact to fuel consumption and the impact to safety to make a holistically preferred/optimized solution. The techniques can include evaluating the above factors and calculating an optimized power plan based on the goals and priorities of the operator.

In various embodiments, the power control system 1102 can be programmed to proactively adjust the power generation in anticipation of a pending load transition. If a power system of the drilling rig 210, as shown in FIG. 2, is transitioning into a lower current state, the power control system 1102 can reduce the output or fully turn off generation elements (e.g., the generators 1108, the line power 1110, or regenerative power units 1112). The power control system 1102 can predict increased power requirement of the drilling rig that may increase risk for an event and proactively increase additional power capacity online to support this requirement.

The two approaches mentioned above are different from a system that simply reacts to a load applied or trends and provides a different level of efficiency and safety potential. Both approaches are instead proactive and involve either forecasting or controlling the expected future power loads rather than the current technologies that are reactionary by nature.

The power control approaches can be completely automated with a programmed computer control system or can be used as a recommendation for providing inputs to the driller or anyone else involved on or off rig site when the power configuration is less than optimized. The power control system 1102 can also benefit from trend changes and forecasting of power leveraging large amounts of data from the local or large-scale historical load profiles. For example, it can be anticipated that a pending formation may increase load or even increase probability of stalling or getting stuck leading to greater power reserve proactive planning/efforts. As another example, there is also a direct correlation in the load seen by the pump systems and the flow restriction from the drill pipe that increases as the drilling rig adds additional drill pipe to the system as drilling rig goes deeper and power generation capacity can be adjusted accordingly, including automatically by the power control system 1102.

The power control system 1102 can also recognize microstalls from a downhole mud motor and therefore anticipate a greater probability of a larger stall requiring more aggressive action and power consumption from the rig. This type of planning/compensation can be used in conjunction or in concert with functions such as AutoStall, an application that is designed to recognize downhole tool stalling and adjust drilling rig drilling settings automatically.

The power control system 1102 can use automation to adapt operations and activities on a supply side to adjust the load capacity of an offsite power source such as line power 1110 sourcing from a nearby or distant power plant where it could be desirable to constrain certain loads to only be present at certain times of the day. The supply side power requirements can be forecasted based on typical history or can be directly controlled by digital coordination and Internet of things (TOT) type systems. This model and application of load control is similar to that of heating ventilation air conditioning (HVAC) networked coordination with power plant capacity to avoid brown out conditions when the weather strains the total local grid system.

In all the above examples, a cost or value can be assigned to the ESG component of any operational or automation tradeoffs. This can be in the form of carbon dioxide ($CO^2$) production tracking, and assigning a value to that defined by the market or the operator. It could be cheaper to drill slower or drill with a different sequence of operations when fully considering the ESG cost/impact. At an even more macro point of view, the planning of the well and the tool selection can encompass a modeled power consumption profile that can suggest geometry or tool selection that will result in a truly economic and environmentally optimized output. This could be driven by reducing the number of generators 1108 or power requirements in general but could also be used to plan different drilling functions or operations to be completed at different times of the day, such as when power resources are cheaper or otherwise advantaged for things like environmental output or safety. For example, a series of costs may be determined for a series of different oilfield operations, such as higher costs for drilling slower, costs for delaying certain operations to reduce noise during certain times, costs for scheduling certain operations to occur at times when the power demands on a grid are lower or when power supplies to the grid are higher, costs associated with the availability of power from different sources at different times (e.g., power from natural gas from the well versus power from a diesel generator), as well as costs associated with one or more ESG factors as noted above. A control system may be programmed to determine the a number of options available for the oilfield operation(s), including operating and drilling parameters, timing and scheduling of the same, and can determine the power demands and power supplies associated with each of the options available, as well as the various costs associated therewith, and can select an optimum solution from among the options as the one with the lowest costs. It should be appreciated that, although cost is used in this example, other options could be used to determine and select among the options, such as the total amount of energy used for an oilfield operation (e.g., selecting as an optimum solution the option that uses the least energy), the total environmental impact (e.g., selecting as an optimum solution the option that is determined to have the least carbon footprint or the least environmental impact). Further, it should be noted that the options can be constrained by rules that prohibit or require that certain oilfield operations only use certain power sources, a certain mix of power sources, or that certain oilfield operations only occur during certain times of the day or while other certain oilfield operations are either occurring or not occurring. Moreover, the options can be constrained so that certain oilfield operations only occur (or not occur) during certain times (e.g., to minimize noise during the hours from 10 p.m. to 8 a.m. if a residential area is near the oilfield operations). It should thus be appreciated that the present disclosure allows for a flexible approach that can be adapted to analyze, monitor, and control oilfield operations so as to achieve an optimum approach, and that the optimum approach may differ depending on the situation and the relevant circumstances.

Figure 12:
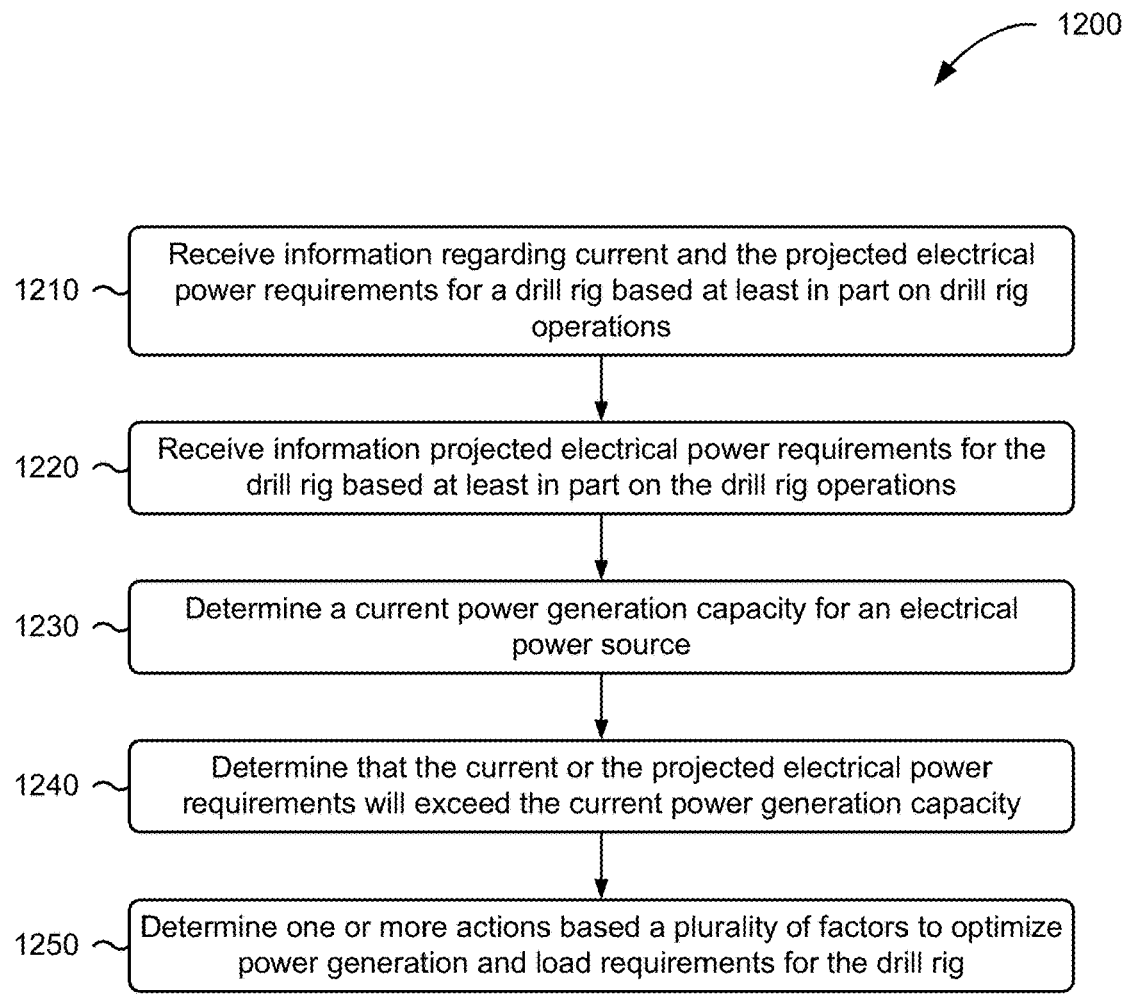
FIG. 12 illustrates an exemplary flow diagram for a technique of electrical power generation and control.

FIG. 12 is a flowchart of an example process 1200 associated with power automation and control. In some implementations, one or more process blocks of FIG. 12 may be performed by a power generation and control system (e.g., power generation and control system 1100 of FIG. 11). In some implementations, one or more process blocks of FIG. 12 may be performed by another device or a group of devices separate from or including the power generation and control system 1100. Additionally, or alternatively, one or more process blocks of FIG. 12 may be performed by one or more components of the power control system 1102, such as the rig control system 1118, the battery control system 1104, the one or more generators 1108, the batteries 1106, or the regenerative power units 1112.

As shown in FIG. 12, process 1200 may include receiving information regarding current electrical power requirements for a drilling system 100 based at least in part on oil field operations (block 1210). For example, the power generation and control system may receive information regarding current and the projected electrical power requirements for a drilling rig based at least in part on oil field operations, as described above. The current electrical power requirements can be received from the rig control system 1118.

As further shown in FIG. 12, process 1200 may include receiving information about projected electrical power requirements for the drilling rig based at least in part on the oil field operations (block 1220). For example, the power generation and control system may receive information projected electrical power requirements for the drilling rig based at least in part on the oil field operations, as described above. The projected electrical power requirements can be received from the rig control system 1118.

As further shown in FIG. 12, process 1200 may include determining a current power generation capacity for an electrical power source (block 1230). For example, the power generation and control system may determine a current power generation capacity for an electrical power source (e.g., a batteries 1106, generators 1108, line power 1110, or regenerative power units 1112), as described above.

As further shown in FIG. 12, process 1200 may include determining that the current or the projected electrical power requirements will exceed the current power generation capacity (block 1240). For example, the power generation and control system 1100 may determine that the current or the projected electrical power requirements will exceed the current power generation capacity, as described above.

As further shown in FIG. 12, process 1200 may include determining one or more actions based a plurality of factors to optimize power generation and load requirements for the drilling rig (block 1250). For example, the power generation and control system 1100 may determine one or more actions based a plurality of factors to optimize power generation and load requirements for the drilling rig, as described above.

Process 1200 may include additional implementations, such as any single implementation or any combination of implementations described below and/or in connection with one or more other processes described elsewhere herein.

In a first implementation, the one or more actions delay one or more oil field operations that cause a spike in current requirement.

In a second implementation, alone or in combination with the first implementation, the one or more actions reduce a power requirement of an electrical power driven system until a generator is activated or a power storage device is charged above a threshold power level.

In a third implementation, alone or in combination with one or more of the first and second implementations, the one or more actions include adjusting the power generation capacity in anticipation of a pending load transition.

In a fourth implementation, alone or in combination with one or more of the first through third implementations, the adjusting the power generation capacity includes reducing an output of the power generation system when the pending load transition is to a state of lower current requirement.

In a fifth implementation, alone or in combination with one or more of the first through fourth implementations, the adjusting the power generation capacity includes increasing an output of the power generation system when the pending load transition is to a state of higher current requirements.

In a sixth implementation, alone or in combination with one or more of the first through fifth implementations, the projected electrical power requirements for the drilling rig is based at least in part on stored historical load profiles.

In a seventh implementation, alone or in combination with one or more of the first through sixth implementations, the plurality of factors include at least one of a commercial loss of rig productivity, an impact to well bore placement and quality, an impact to ESG emissions, an impact to fuel consumption for power generation systems, and an impact to rig safety.

In an eighth implementation, alone or in combination with one or more of the first through seventh implementations, process 1200 includes generating power using regenerative power techniques by converting kinetic energy of the drilling rig into electrical energy for charging a power storage system of the drilling rig.

In a ninth implementation, alone or in combination with one or more of the first through eighth implementations, process 1200 includes determining a time for generating power using regenerative power techniques based at least in part in the current operations or forecast operations of the drilling rig.

In a tenth implementation, alone or in combination with one or more of the first through ninth implementations, process 1200 includes adjusting generator output during the time for generating power using regenerative power techniques.

In an eleventh implementation, alone or in combination with one or more of the first through tenth implementations, process 1200 includes determining a charge state of the power storage device prior to generating power using regenerative power techniques, comparing the charge state of the power storage device with a charge threshold, and ceasing the generating power using regenerative power techniques if the charge state of the power storage device exceeds the charge threshold.

In a twelfth implementation, alone or in combination with one or more of the first through eleventh implementations, process 1200 includes applying a resistive load to convert unnecessary electrical power into heat.

In a thirteenth implementation, alone or in combination with one or more of the first through twelfth implementations, process 1200 includes diverting available power to other electrical systems without passing through the power storage device.

Although FIG. 12 shows example blocks of process 1200, in some implementations, process 1200 may include additional blocks, fewer blocks, different blocks, or differently arranged blocks than those depicted in FIG. 12. Additionally, or alternatively, two or more of the blocks of process 1200 may be performed in parallel.

II. Automation Advantage with Regenerative Power

Regenerative power can be a consideration when planning an overall power generation system. Many activities use electric loads to provide mechanical resistance to drilling motion similar to regenerative braking on electric cars. Prediction or intentional sequencing to regulate or plan for regenerative potential or anticipated net in rush of current into any storage device is another opportunity to optimize power generation in the drilling system 100. This can be done, as mentioned above, in a fully automated system or in a partially automated system where recommendations or warnings are given to an operator on or off rig site. Power generation and control systems can be programmed to predict and plan for such current inducing activities to ensure that the storage device being used has the capacity to accept the additional charge whether it is in a battery or other energy storage device. In the case of full automation, for example, a generator may be shut down to allow for one or more batteries to discharge to allow for capacity for anticipated motion of the drawworks that will generate power to charge the batteries. Proper storage resource management applied in this way will allow for a much higher degree of fuel consumption efficiency as well as allow for reduced carbon emissions. Further, a hybrid approach for the use of resistive loads or "choppers" that convert unnecessary energy into heat can be combined with this battery management to ensure the load needed to provide braking or other rig system controls is supported to maintain safety while optimizing energy capture wherever practical.

In some cases, a real-time near balanced approach might be accomplished where the electrical loads can be harnessed to provide additional current for other operations with or without having to pass through an energy storage system. For example, the electrical load created to reduce the speed of drawworks lowering the pipe into the hole could be used to supply additional torque and/or RPM to the drill string through the top drive. This essentially allows repurposing of the regenerative power directly in real time rather than allocating to storage or converting the available energy to heat and losing its economic value. As with the examples above a hybrid or proportional combination of energy capture and energy repurposing can be accomplished at the same time. In another example energy for things like mud tank agitation or heating can be sourced as a function of regenerative power assets in real time to avoid waste with the sequence of drilling operations and mud system operation being proactively planned to make most efficient use.

A combination of regenerative power capacity optimization along with sequence planning and forecasting coupled further with the ability to plan the complete effort in advance of commencing drilling provide a holistic opportunity to perform planning, real-time, and predictive optimization of the complete power system in consideration for overall drilling performance and environmental impact.

III. Multi-Purpose Mobile Energy Storage Device

Figure 13:
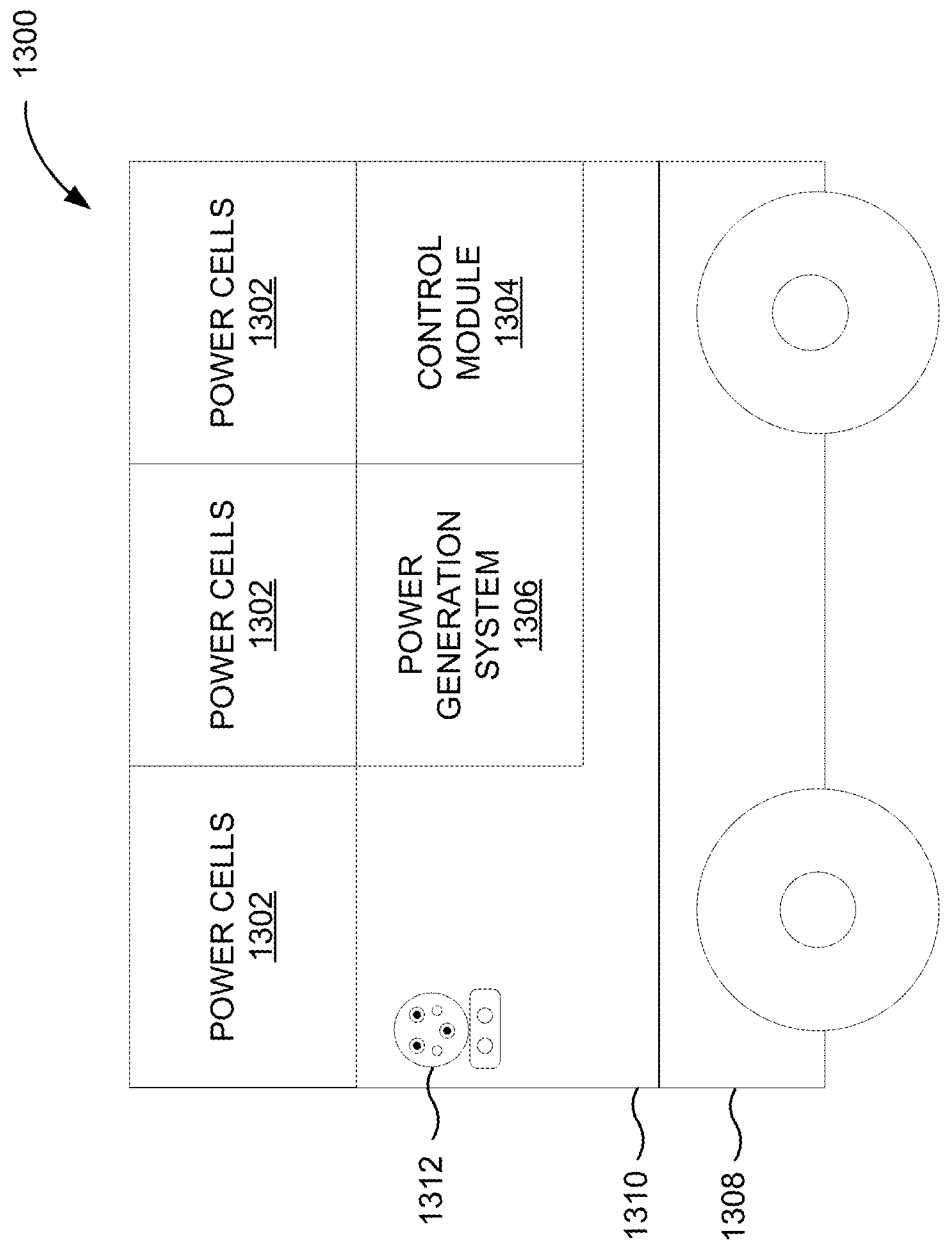
FIG. 13 illustrates an exemplary mobile power unit.

FIG. 13 illustrates an exemplary mobile power device 1300, which may be used with drilling system 100. The mobile power device 1300 can include a chassis 1308 connected to a vehicle body 1310. In various embodiments, the chassis 1308 can include powertrain to allow the mobile power device 1300 to operate under its own power to move under its own power. The powertrain can be an electric motor powertrain. The electric motor can receive electrical power from one or more power cells 1302. In other embodiments, the powertrain can use other fuels (e.g., hydrogen fuel cell or fossil fuels such as gasoline, kerosene, or natural gas). The vehicle body 1310 can include one or more power cells 1302. The mobile power device 1300 can include a power control module 1304 electrically connected to the one or more power cells 1302. The mobile power device 1300 can include a docking interface 1312 to connect the one or more power cells 1302 to an external load.

The mobile power device 1300 can include a power generation system 1306 (e.g., a generator) configured to charge the one or more power cells 1302. The power generation system 1306 can include one or more solar panels, a windmill, or an alternator if the mobile power system 1300 includes a hydrocarbon based fuel engine. The power generation system 1306 can include at least one of a mechanical power charging system, a hydrocarbon fuel based generator, or a capacitor system, or any combination thereof.

The docking interface 1312 can be configured to power at least one of a crane, a suction pump, a fork lift, a front end elevator, and any combination thereof.

In various embodiments, the power storage system 1300 can provides electrical power for an electrical motor connected to the chassis 1308.

The energy storage devices mentioned in the automated power generation system above can come in many forms including mechanical, battery capacitor based as well as a hybrid of several technologies. Some of these can include mobility features in their design and can be repurposed when the drilling rig 210, as shown in FIG. 2, or other functions are not in need of the power. The mobile power units 1300 can also be used as a power source for the rig move and for conveyance to and from rig location. The mobile power unit 1300 can be a pure storage based system or can be hybrid in nature similar to hybrid vehicle such as the hybrid vehicle allowing for a hydrocarbon based generator to be used to provide energy when the power cells 1302 are not sufficiently charged or does not have the peak current output required to support a given load.

Further, a docking interface 1312 can be used to allow for rapid deployment of scalable mobile power devices 1300.

The docking interface 1312 can be automated in the physical connection or can be a simple plugin type architecture similar to how electric cars plug into charging stations. The intent is for the mobile power device 1300 to be usable as a storage device as well as a low emissions base vehicle or "skateboard" as is often referenced in the electric vehicle market.

IV. Battery Charging Techniques

Batteries do not work well for high pulses over long periods of time. A general rule of thumb for batteries is that a battery will be at 50% capacity after 1000 charges. If a battery experiences a large pulse drain dropping the battery charge to a 95% battery level and then the battery is charged, the battery will consume one of the 1000 lifetime charges and reduce the overall life of the battery.

A technique for improving overall lifetime of the battery is to only recharge the battery when the charge level falls below a specified threshold level of charge. For example, if the threshold is 80% of total charge, the charging system can induce a charging cycle after the battery charge level falls below the threshold charge level. In addition to having a threshold charge level, the battery control system can measure a threshold period of time that the battery is below the charge level threshold. Batteries when pulsed often report lower than actual readings until they stabilize from the pulse cycle. So specifying a charge level and subsequent time below that level would increase the life of the battery on a drilling rig and reduce the overall cost of the system over its lifetime by optimizing the charge cycles of the battery itself.

The battery control system 1104 as shown in FIG. 11 can be programmed to monitor and determine the battery storage level with respect to the use of drilling rig 210 operations as shown in FIG. 2. A drilling rig event that uses high power will take a recovery time in the battery to know its true level. The battery control system 1104 can receive information that the drilling rig has just performed one or more actions that used significant power and delay measuring the charge level of the battery for an appropriate period of time. The battery control system 1104 can also use the drill operation information to determine a time estimate when a measurement of battery storage capacity would be reliable, and then determine and report the battery charge level after that time period.

The battery control system 1104 can use information of rig operations or rig states to determine when to charge the battery. For example, if the drilling rig 210, as shown in FIG. 2, is tripping out of the hole, the battery charging system should attempt to run the battery down to 20%, because there is more potential energy when tripping in so the battery control system 1104 could maximize regenerative charge at that time and provide the most value for the regenerative system and the maximum battery cycle. So using the average power per stand, and the number of stands in the hole, the battery charging system could optimize for the battery discharge and charge cycle. Even if the battery charge is below a predetermined threshold charged level (e.g., 80%), if the drill system is tripping out, the battery control system 1104 should let the drill power control system draw nearly all the power from the one or more batteries so that the battery charging cycles can be optimized for the events ongoing at the rig.

The battery control system 1104 can use the knowledge of battery states and charge cycles of the one or more batteries and the known charge loss due to charging cycles to alter the use model of the one or more batteries to adjusting the use/charge cycles to optimize its life cycle in a system. For example, the a battery cycle is at 1000 charges and is 50% total charge capacity, the battery charging system can adjust the battery charging cycle. For example, instead of charging the battery below a lower threshold (e.g., 20% of total charge level), the battery control system 1104 could raise the lower threshold level to charge at 50% of total charge level in order to manage the late life cycle of the battery.

In various embodiments, if the battery control system 1104 is not using regenerative power harvesting, the power control system 1102 can use rig times and/or states to optimize battery charge. For example, if a drilling rig power system drained a battery during tripping out operation, during the rig setup, rig control system 1116 could use Rig setup, to run the generators at the optimized level to charge and to run the rig. The power control system can determine any time the drill system may perform a drill action to increase the potential energy of the rig. The power control system 1102 can determine ways to capture the potential energy of the rig as stored energy using regenerative power devices. Alternatively, the power control system 1102 can determine the times of lower power requirements reduce need for the generator 1108 for current power requirements, and use that time of available power for charging the one or more batteries 1106.

The power control system 1102 can use rig state to determined periods of time or conditions that the battery control system 1104 can be charging the batteries 1106 at a fast rate or slow rate of charge. The speed of the battery charge cycle, depending on battery chemistry, can also have an impact on the life expectancy of the battery 1106. If the power control system has information about oil field operations (e.g., knowing the rig is performing operations to trip in) may mean that only 24 hours have elapsed since drilling a hole 20,000 feet deep so the battery charging system may want to slow charge the battery 1106. Alternatively, the hole depth is only 2,000 feet, the battery control system 1104 may attempt to fast charge the battery 1106 to better manage the battery state and life span.

The battery control system 1104 can optimize battery lifespan by allowing operations to discharge the battery 1106 to a modest level rather than always charging the battery 1106 as it reaches small amount of discharge. The battery control system 1104 can using information about use and charging time in determining the battery level of charge.

The battery changing system can also consider a minimum safe battery charge level or any energy storage medium for that matter to safely accomplish returning the rig to a safe state should generators fail for a given zone of the well. This minimum safe charge level can be larger if the drilling rig is in an area of the well where the drill needs to pull back a few stands to ensure well control. This state may also be defined by a minimum amount of time that the system must operate in a brownout similar to the way an uninterruptable power supply (UPS) is sized. This is applicable for high line power that could be lost dues to wind storm for instance or a generator mechanical malfunction locally on site.

The battery charging system can adjust charging and use of the energy storage device as a function of outside or battery temperature. This could be an additional variable in the automation of activity and power management. For example, in cold weather lithium ion batteries lose some of their efficiency. In hot weather, conductors can have higher resistance. The power control system can use choppers to help heat the battery systems under some environmental conditions to improve battery efficiency.

Figure 14:
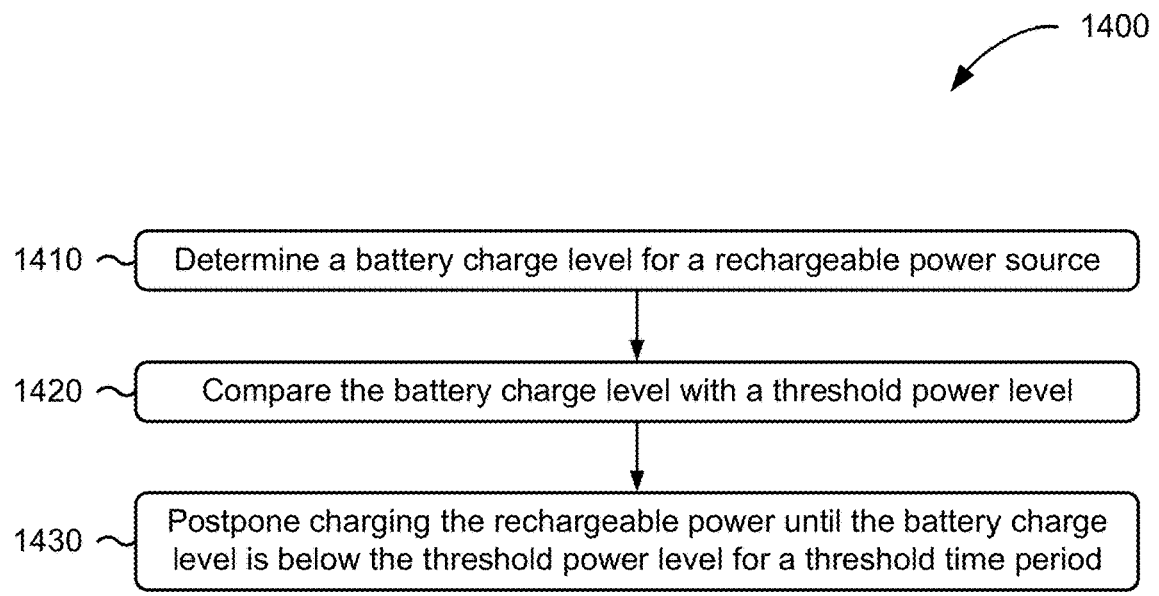
FIG. 14 illustrates an exemplary flow diagram for a technique of charging a power storage system.

FIG. 14 is a flowchart of an example process 1400 associated with power automation and control. In some implementations, one or more process blocks of FIG. 14 may be performed by a power generation and control system 1100 of FIG. 11.

As shown in FIG. 14, process 1400 may include determining a battery charge level for a rechargeable power source (block 1410). For example, the power generation and control system may determine a battery charge level for a rechargeable power source, as described above.

As further shown in FIG. 14, process 1400 may include comparing the battery charge level with a threshold power level (block 1420). For example, the power generation and control system may compare the battery charge level with a threshold power level, as described above.

As further shown in FIG. 14, process 1400 may include postponing charging the rechargeable power until the battery charge level is below the threshold power level for a threshold time period (block 1430). For example, the power generation and control system may postpone charging the rechargeable power until the battery charge level is below the threshold power level for a threshold time period, as described above.

Process 1400 may include additional implementations, such as any single implementation or any combination of implementations described below and/or in connection with one or more other processes described elsewhere herein.

In a first implementation, process 1400 includes receiving information relating to one or more oil field operations, determining a recovery time following the one more oil field operations, the recovery time allows the rechargeable power source to stabilize from a pulse cycle, delaying measurement of the battery charge level until after the recovery time.

In a second implementation, alone or in combination with the first implementation, process 1400 includes receiving information on a current life cycle of the rechargeable power source, and adjusting a charging threshold for charging the rechargeable power source based at least in part on the current life cycle.

In a third implementation, alone or in combination with one or more of the first and second implementations, process 1400 includes receiving information relating to a state of a rig during one or more oil field operations, and determining an optimal time to recharge the rechargeable power source based at least in part on the information.

In a fourth implementation, alone or in combination with one or more of the first through third implementations, process 1400 includes receiving information relating to a state of a rig during one or more oil field operations within a predetermined time history, the state of the rig provides information on a chemistry of the rechargeable power source, determining a rate for recharging the rechargeable power source based at least in part on the received information, and adjusting the recharging of the rechargeable power source to the determined rate.

In a fifth implementation, alone or in combination with one or more of the first through fourth implementations, process 1400 includes receiving information relating to a state of a rig during one or more oil field operations, determining a minimum safe charge level for the rechargeable power source based at least in part on the state of the rig, and setting a threshold for recharging the rechargeable power source above the minimum safe charge level.

In a sixth implementation, alone or in combination with one or more of the first through fifth implementations, process 1400 includes determining a temperature of the rechargeable power source, and adjusting the temperature of the rechargeable power source based at least in part on the determined temperature.

Although FIG. 14 shows example blocks of process 1400, in some implementations, process 1400 may include additional blocks, fewer blocks, different blocks, or differently arranged blocks than those depicted in FIG. 14. Additionally, or alternatively, two or more of the blocks of process 1400 may be performed in parallel.

The specific details of particular embodiments may be combined in any suitable manner or varied from those shown and described herein without departing from the spirit and scope of embodiments of the disclosure.

V. MicroGrid System Controller

Figure 15:
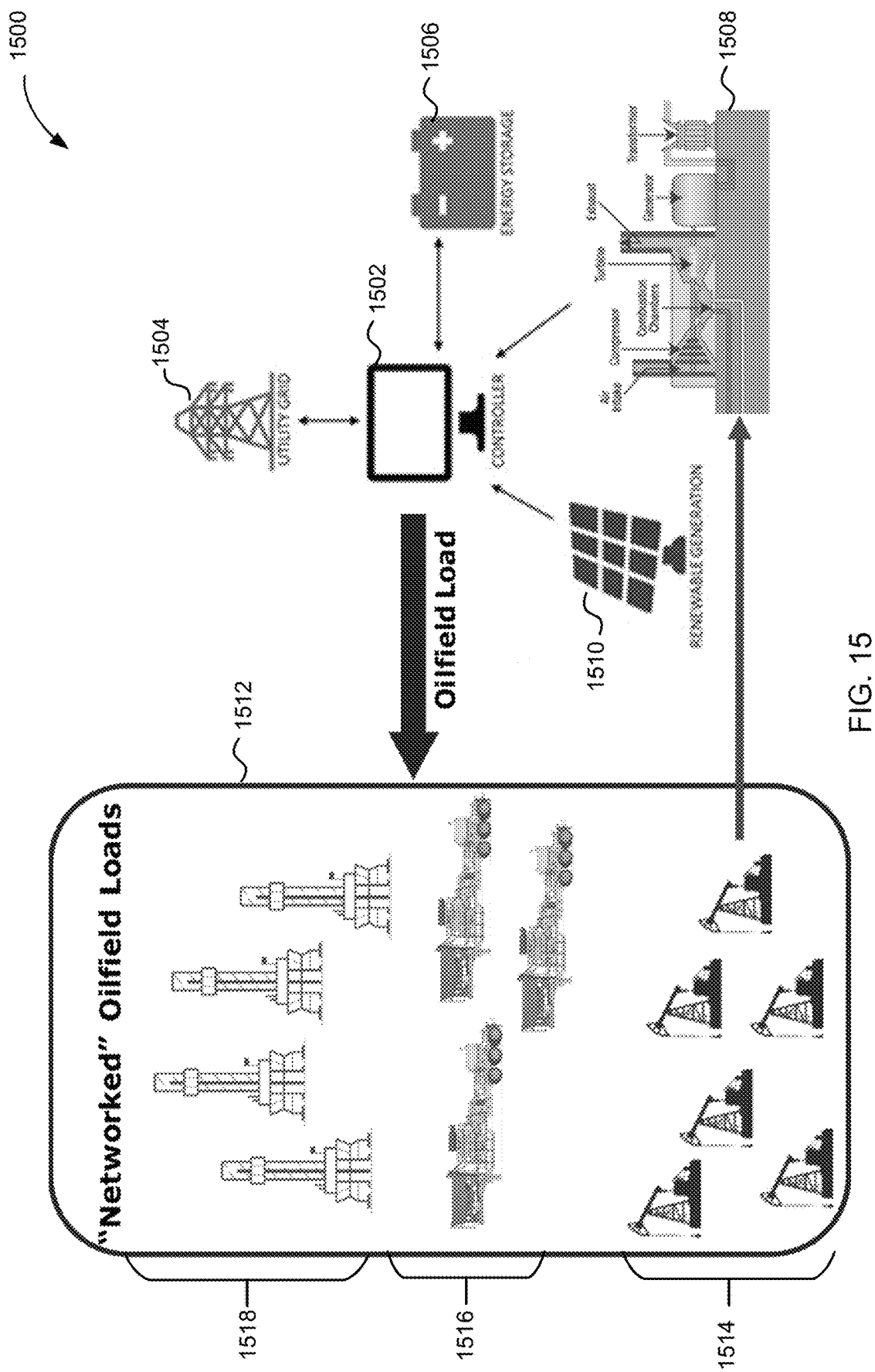
FIG. 15 illustrates an exemplary architecture of a MicroGrid system.

FIG. 15 illustrates an exemplary architecture of a MicroGrid system 1500. A MicroGrid system 1500 can link a power controller with one or more sources of electrical power (e.g., utility grid, energy storage devices, renewable generation, portable generation units) and one or more electrical loads (e.g., drilling rigs, oil derrick pumps, and mobile drilling rigs). Existing power generation systems can be very inefficient because the power generation systems tend to generate more power than average demand for electrical power to account for spikes in current draw during specific events (e.g., fracking events). A critical mass centralized power system can overcome some of the drawbacks of existing power generation systems and hybrid natural gas systems. A power consumption arbitration engine can help drilling crews schedule and manage drilling events for a given region accounting for power consumption for particular drilling events. As an oil field matures, the electrical power requirements change (e.g., more pump jacks lifting oil out of the ground) instead of specific drilling events. In the aggregate these pump jacks can aggregate into to a large electrical load, especially when numerous upstrokes happen at the same time. But, a power consumption arbitration engine using digital controls can manage the field of pump jacks efficiently so the timing of the upstroke cycle is offset thereby normalizing the current draw for the field.

The MicroGrid system 1500 can be modular to service the worst case power scenario and time aggregate/arbitrate the power generation/distribution to allow multiple generators in a centralized power plant to be removed as the system becomes more sustaining in production. The removed generators can be moved to the next MicroGrid modular system. In addition, if the field becomes more mature, the system can leverage the additional power of the system to actually add the power to the power grid for revenue. In addition, the available power from the MicroGrid system can be used for a high-current load industry business (e.g., mining for bitcoin, commercial welding, or server farms).

A MicroGrid system 1500 can be operated in a way that serves as part of an overall Environmental, Social, and Corporate Governance (ESG) approach. A MicroGrid system 1500 can result in a significant greenhouse gas (GHG) reduction for the oil production process. A GHG is generally understood as a gas that absorbs and emits radiant energy within the thermal infrared range, causing the greenhouse effect. The primary greenhouse gases in Earth's atmosphere are water vapor ($H^2O$), carbon dioxide ($CO^2$), methane ($CH^4$), nitrous oxide ($N^2O$). The MicroGrid system 1500 can provide meaningful GHG improvement compared to other rig generation options and in some cases up to 4 times the reduction. It is believed, that in some cases it can result in a reduction of 160 tons of $CO^2$.

Gas turbine generators generally are close to 100% loading to be efficient. Using a token system, discussed below, can allow consumers of electrical power to pay a premium or obtain a discount based on the source of the electrical power generation. For example, a consumer can pay a higher premium for electrical power generated through renewable sources. Further, the token system can allow for prioritization of electrical power (e.g., priority to hospitals). In addition, a customer might prefer to pay a premium in exchange for avoiding any delays or rescheduling, such as the rescheduling of a fracturing or other drilling operation.

In addition, the MicroGrid system 1500 can recapture one or more byproducts of power generation or drilling operations. For example, carbon dioxide ($CO^2$) can be captured during power generation operations and can be injected into wellbores for enhanced oil recovery operations.

By centrally locating the MicroGrid system 1500, harmful emissions can be reduced because of the reduction of the need to transport the fuel (e.g., via diesel trucks) to the sites. In addition, by having other electrical generation sources available, (e.g., wind and solar) fuel consumption for power generation can be reduced. The MicroGrid system 1500 can include electric vehicles (e.g., forklifts, cranes, vehicles) on site that can use the power generated locally. The MicroGrid system 1500 can provide sources of electrical power through storage assets (e.g., batteries) that can be either fixed or mobile assets. In some embodiments, the storage assets can be a large physical battery or a collection of batteries. In various embodiments, the storage assets can be one or more electric vehicles that can supply electrical power to other devices.

A MicroGrid system 1500 can capture stranded natural gas and convert it to electrical power. The electrical power can be used an electrical power source for the drilling operation and/or any available power can be put back on the grid, adding to net profit of the operations. In addition there can be tax benefits from direct asset conversion of byproducts of oil drilling operations.

The MicroGrid system 1500 can provide networked industrial adaptive monitoring, management, and control of electrical generation sources and electrical distribution. The MicroGrid system 1500 can be connected to control systems used for drilling, completion, and production for oil drilling operations to allow for scheduling and load balancing of electrical power distribution based on current electrical power generation and scheduled demand.

The MicroGrid system 1500 can also be used for non-oilfield deployments (e.g., disaster relief, remote locations, or use in developing countries). In developing countries, the power generation system can be combined with other logistic systems (e.g., fiber for communications or water lines or sewer lines) resulting in a modular infrastructure system.

The MicroGrid system 1500 can include a power controller 1502. The power controller 1502 can connect to various sources of electrical power. The electrical power can be either alternating current or direct current. The power controller 1502 can connect with a utility grid 1504 (e.g., through local electric utility lines), energy storage devices 1506 (e.g., batteries, power cells), local generation sources 1508 (e.g., portable generation systems); renewable generation sources 1510 (e.g., solar power, wind power, geothermal). While diagram illustrates the local generation source 1508 as a single device, it can be one or multiple types of generators running off a variety of fuels.

The power controller 1502 can receive load information from an oil field network 1512. The oil field network 1512 can include one or more of drilling rigs 1514, hydraulic fracturing equipment 1516, and oil pump jacks 1518.

The power controller 1502 can manage and distribute power from the various power sources based at least in part on the load requirement of the oil field network 1512. The power controller 1502 can interact with other drilling control systems to improve efficiencies in electrical power generation and distribution.

It is anticipated that the MicroGrid system 1500 as shown and described herein can be used in local and regional applications, such as a region within a particular oil and gas basin where multiple wells are being drilled and/or multiple pump jacks are in operation. Often, such regions are located in rural and/or remote areas. They can be in tropical or polar regions, jungles or deserts, flat prairies or mountains, and so on. In general, the region of interest for application of the MicroGrid system can be a region in which the power sources and power loads are generally in a circle defined by a diameter less than 100 miles, or 50 miles, or 25 miles, or 10 miles. While the MicroGrid system 1500 and process 2000 have been described mostly in the context of use in oil and gas exploration and production, it should be noted that the MicroGrid system 1500 and process 2000 need not be so limited. For example, a MicroGrid system 1500 could be extremely useful for disaster recovery efforts, such as after an earthquake, hurricane, tornado, flooding, or other disasters. In addition, the MicroGrid system could be an important step in developing a power grid in remote or impoverished regions, such as remote villages in Africa, Asia, and elsewhere. Even in developed countries, the MicroGrid system 1500 might be useful for local purposes, such as supplying power to multiple stations and/or towns in the Outback regions of Australia.

Rural communities typically have power infrastructure designed for houses and farms. The rural power systems may not be designed for industrial spikes. Oil field loads can represent the worst possible case power requirements for rural infrastructure due to the dynamic loads that may exist. The dynamic loads can result from some cases in which no available power is available to other cases where plenty of available power exists. The industrial power spikes can overwhelm a local utility and can result in brown outs. By networking and synchronizing the power requirements, the power requirements for the area can be synchronized instead of working against each other and account for the worst case scenarios.

The MicroGrid system 1500 can be configured to schedule and perform events to be done differently to align the processes as a closed loop system. For example, events can be delayed intentionally to avoid conflicts. The rig systems can be scheduled using a hive-process to align events and actions intentionally more than just an allocation on the source side that performs a pre-emptive load adjustment for automation.

In reality every device that connects to the MicroGrid system 1500 may not be networked. The MicroGrid system 1500 can have the capability to co-exist with legacy control systems and devices. A non load-optimized rig may still receive power from the MicroGrid system 1500 and can be services through additional source storage capacity. In various embodiments, the system can use a token system for allocating electrical power to customers on an as needed priority basis. The MicroGrid system 1500 can allocated power for legacy non-harmonizing loads. In this way, the system can service various needs without resulting in a brown out scenario. The token system allows for varying costs for power based on priority, and can be used to charge a premium for a rig or equipment that is not able to adjust its power consumption pursuant to control from the Micro-Grid system 1500. Some power generation can cost a premium amount so that load will not degrade other user's functionality in servicing the new load. The Load Scheduler and the Load Prediction Engine can schedule power consumption and activities of other rigs and equipment within the system 1500 while accounting for and allocating power to those rigs and/or equipment whose power consumption is not adjustable by the MicroGrid system 1500.

Figure 16:
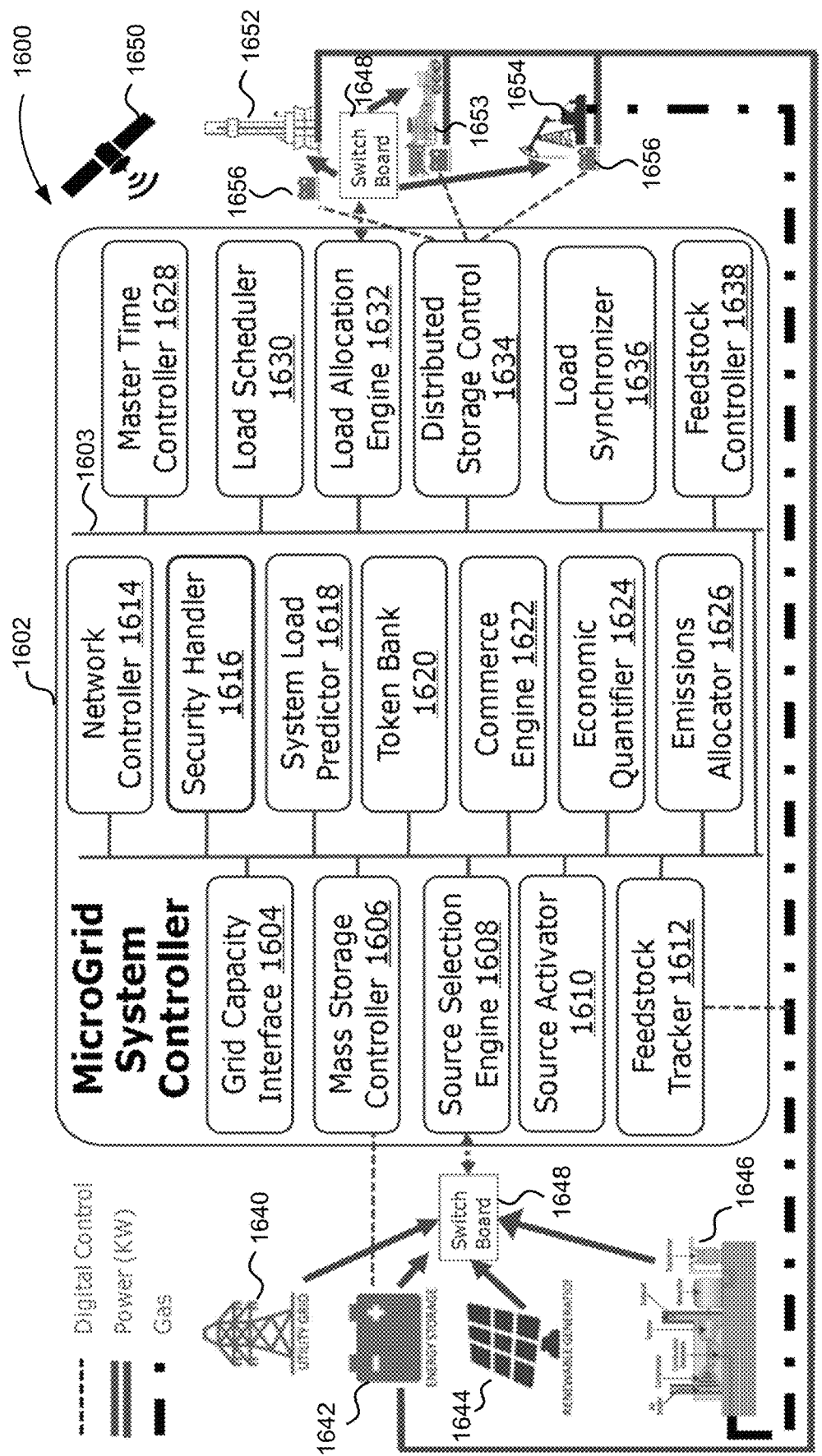
FIG. 16 illustrates an exemplary MicroGrid controller and components of an exemplary MicroGrid system.

FIG. 16 illustrates an exemplary power controller 1602 and components of an exemplary MicroGrid system 1600. The MicroGrid power controller 1602 can correspond to the power controller 1502 as depicted in FIG. 15. The MicroGrid controller 1602 can include one or more modules. The modules can include a grid capacity interface 1604, a mass storage controller 1606, a source selection engine 1608, a source activator 1610, and a feedstock tracker 1612. The modules can also include a network controller 1614, a security handler 1616, a system load predictor 1618, a token bank 1620, a commerce engine 1622, an economic quantifier 1624, and an emissions allocator 1626. The modules can also include a master time controller 1628, a load scheduler 1630, a load allocation engine 1632, a distributed storage control 1634, a load synchronizer 1636, and a feedstock controller 1638.

The one or more modules, components, or interfaces can be connected via one or more buses 1603. The MicroGrid controller 1602 can communicate and monitor various sources of electrical power (e.g., utility grid 1640, energy storage 1642, renewable energy sources 1644, and location generation sources 1646. The MicroGrid controller 1602 can also monitor and control the distribution of electrical power through a switchboard 1648. The MicroGrid controller 1602 can communicate with the one or more load devices requiring an electrical power load (e.g., one or more of drilling rigs 1652, hydraulic fracturing equipment 1653, and oil pump jacks 1654). The electrical power can be supplied to the one or more load devices through the switchboard 1648.

The MicroGrid controller 1602 can include a Grid Capacity Interface 1604. The Grid Capacity Interface 1604 can request power from a utility power grid 1640 when local storage or generation sources are not sufficient for MicroGrid loads. For example, the Grid Capacity Interface 1604 can provide information on the power transmission capabilities of local transmission lines. When a surplus of power is generated by the MicroGrid system 1600, the Grid Capacity Interface 1604 can facilitate by injecting electrical power into the utility grid 1640. In various embodiments, the injection of power is accomplished through one or more switching units. Multiple MicroGrid systems 1600 may exist and the Grid Capacity Interface 1604 can also be used to share power resources between various MicroGrid systems 1600 in a modular fashion.

The MicroGrid controller 1602 can include a Mass Storage Controller 1606. The Mass Storage Controller 1606 can maintain capacity of the primary centralized storage device for the MicroGrid system 1600. The storage units can be fixed or mobile. The storage can come in the form of batteries, water storage, pressure, mechanical potential energy or any other mechanism to store power for later use. The Mass Storage Controller 1606 also has the ability to coordinate and share power amongst the local storage controllers located across the grid and at the target load systems. Electrical power is much more efficient to transfer as alternating current. However, converting direct current into alternating current requires an inverter and results in losses during the conversion. A combination of alternating and direct current systems can be used and can be included in the MicroGrid to maximize efficiency, with the direct current sources able to supply by wire and/or mobile sources (e.g., a truck with one or more batteries). For example, when using renewable sources, such as solar panels, the power can be direct current power used to charge a mobile storage device such as a battery which can be transported from a remote location to, for example, a rig site and used to provide power to the rig.

The MicroGrid controller 1602 can include a Source Selection Engine 1608. The Source Selection Engine 1608 can identify the source or sources of power used and facilitates power delivery to the targeted load. In conjunction with other controls in the MicroGrid system 1600, priority can be provided and allocated to certain power sources based at least in part on economic or environmental advantages for the load. For example, an operator can request that at least a predefined portion of their power originate from renewable sources such as solar or wind. In another example, an operator may configure the Source Selection Engine 1608 to choose only the most cost-effective source of power. In a third example, an operator may select activity to occur at certain times of day that might be cost or environmentally advantaged. For example, certain activities can be scheduled during the time of day when solar generation is anticipated to be high. In another example, certain activities can be scheduled at periods of ideal winds for wind capture. The MicroGrid controller 1602 can received real-time input of weather conditions for the Source Selection Engine 1608. The Source Selection Engine 1608 can also determine if the requested mix of available sources is actually available. For example, a customer may request that 80% of their power is generated using solar power. However, only 20% may be available. The Source Selection Engine 1608 determine alternate sources of energy to fulfill customer's request.

The Source Selection Engine 1608 can receive information on present electrical load or impending electrical load. The Source Selection Engine 1608 can use the load information to increase or reduce the number of electrical generation systems being used to source the load. For example, based on an increased load requirement the source selection engine can start up an additional electrical generator. In various embodiments, one or more drilling events can be delayed until the additional electrical generator is producing sufficient electrical power. In various embodiments, the Source Selection Engine 1608 can reduce a current electrical generation capacity by turning off one or more electrical generation systems based on present or anticipated electrical power requirements.

The MicroGrid controller 1602 can include a Source Activator 1610. The Source Activator 1610 can control which power generation or storage devices are online or active either by control or by monitoring. In concert with the Grid Capacity Interface 1604 and the Mass Storage Controller 1606, this system can convey and adjust capacities so that the token engine and other systems can plan accordingly. For example, this Source Activator 1610 may turn on an additional gas generator to build up storage in the mass storage system in anticipation of power capacity reductions due to weather or time of day in order to ensure capacity is available to support what the system load predictor forecasts as needs.

The MicroGrid controller 1602 can include a Feedstock Tracker 1612. This tracker is intended to verify sufficient volume and quality of feedstock is available to maintain the primary generator that is leveraging feedstock from the local field. It is assumed that in most cases this will be natural gas in oilfield applications but the feedstock could be anything in other deployment examples including oil, coal, wood, hydrogen, trash, etc. The Feed Stock Tracker 1612 can be used to determine quantity and value of the feedstock used in the production of electrical power. In various embodiments, the quantity and/or value of the feedstock used can determine payment for the feed stock.

The MicroGrid controller 1602 can include a Network Controller 1614. The Network Controller 1614 can enable time-synchronized communication across all loads and power systems within the MicroGrid system 1600 network. The Network Controller 1614 can form a local network or can be connected to a wide area network. In various embodiments, the Network Controller 1614 can connect to the Internet. The Network Controller 1614 allows for communications between different devices minimizing or eliminating arbitration issues. This can allow for time critical events to be synchronized, cost allocation to be communicated, and allows real-time awareness of all pending events within the system. The MicroGrid system 1600 network can be based on electrical carrier, wired, optical, Wi-Fi, cellular, or use any other form of wired or wireless communication. The interface between the total network will leverage time synchronization from the Master Time Controller 1628 module to keep all communication and scheduling of tasks in synch. Communication across the network can be secured by leveraging the Security Handler Module 1616 and may include aspects of firewalls, cyber security preventative measure or local network encryption including structures like block chain to protect the commercial and token exchange actions.

The MicroGrid controller 1602 can include a Security Handler 1616. The Security Handler 1616 can protect all communication within the MicroGrid system 1600 and to the outside world against cyber threats but also to protect commercial transactions and all other transactions. The Security Handler 1616 can be used to protect power generation and power distribution systems. The Security Handler 1616 can employ various security protocols (e.g., block chain encryption) to ensure that the transactional components are not manipulated. The Security Handler 1616 can also include appropriate software to detect and protect against potential hacking intrusions and provide appropriate cybersecurity measures, such as scanning for, detecting and removing or otherwise protecting against computer viruses and other malware, ransomware, and the like. Transactions can include barter exchanges and circulation of environmental tracking elements such as carbon capture tax allocations. In non-oilfield applications, such as where the system is providing a complete modular infrastructure for a developing community, the system may also provide security protection for anything from critical infrastructure, to banking, to end use Internet access.

The MicroGrid controller 1602 can include a System Load Predictor 1618. The System Load Predictor 1618 can aggregate on local based prediction inputs into a common system timeline for forecasted loads. It also has the ability to leverage historical trends and forecasted changes or addition/subtraction of loads. With this information a safety factor can be established to avoid loads exceeding the MicroGrid system 1600 capacity. This can be particularly important when other non-networked based loads are added to the MicroGrid system 1600. The MicroGrid system 1600 can also adjust load predictions based on environmental tendencies such as weather or even anticipate load changes based on dates and or time of day trends. A profile for devices connected to the system can be a key component in predicting what that load might be in conjunction with all the other scheduled loads. In the oilfield, MicroGrid system 1600 application operations are often 24/7 continuous. In other use cases there may be anticipated load reductions based on holidays or increased load due to seasonal or real time temperature changes.

The MicroGrid controller 1602 can include a token bank 1620. The token bank 1620 can be designed to allocate units of future consumption with time stamps to allow loads to be used when the MicroGrid system 1600 can most efficiently provide power. These tokens can be tracked such that they expire based on defined times or can be checked in and out to facilitate load needs. The key of use of tokens is to plan power utilization so that the maximum amount of power can be provided without peaks of power draw that might destabilize the grid. The tokens can be specified for certain time periods (e.g., peak or off-peak time periods). The tokens can also be assigned to have dynamic variable pricing, long-term schedule pricing, forecasted price variance, such as by time of day, day of the week, weather, one or more commodity prices, and so forth. The number of available tokens or units can be a function of the source activator and the tracking of other storage and regenerative power resources within the MicroGrid system 1600 system.

The MicroGrid controller 1602 can include a Commerce Engine 1622. The Commerce Engine 1622 can track and automatically bill the appropriate entity based on power used and the source of that power. The Commerce Engine 1622 can use the tokens to determine power costs on a real time basis. In the event a consumer of power is also a contributor of feedstock (e.g., natural gas for the natural gas turbine generator) the appropriate transactions will be made to net out what is owed or even what is credited. In some cases, the MicroGrid system 1600 can also automate the purchasing of feedstock, grid power or other inputs into the MicroGrid system 1600 system. Commerce Engine 1622 could be compared to the banker or the accounts payable/receivable component of the system and the automation of that function provides greater efficiency and transparency with a relatively complex real-time adjusting of transactions occurring to balance loads and feedstocks.

The Commerce Engine 1622 can alter priority of power allocation for usage based on payment terms or based in part on customer payments. For example, customers that are late or behind on payments can receive a lower priority.

The MicroGrid controller 1602 can include an Economic Quantifier 1624. In support of the Commerce Engine 1622 the Economic Quantifier 1624 can be designed to quantify values of feedstocks and power from different sources. The MicroGrid system 1600 provides a dynamic lookup table for the power and feedstock sources that for example adjusts as grid power or natural gas prices change. In another example, the cost of solar sourced power might be cheap on a locally sunny day but natural gas power might be much cheaper at night or during inclement weather (e.g., overcast sky conditions). Additionally, costs associated with emissions penalties or carbon taxes can be quantified and tracked in this Economic Quantifier 1624 as well.

The MicroGrid controller 1602 can include an Emissions Allocator 1626. For example, the Emissions Allocator 1626 can allocate power from solar or wind to one customer drilling the well and/or can allocate energy generated by coal power from the grid to another customer drilling a different well or electrical power generated from a co-op source to a third customer. With a variety of power sources contributing to the MicroGrid system 1600 and a variety of priorities and willingness to pay a premium for more green centric power, a tool is needed to track the source and destination to establish the carbon footprint of each load or consumer. For example, Company A might want to source 50% green energy regardless of cost and select tokens that have been allocated from the appropriate source. It can be virtually impossible to track the flow of actual electrons, but the emissions allocator can track the contributors and use of power in such a way to provide the effective equivalent. This allows the system to allocate ESG preferable content to a customer or to capture and quantify what the $CO^2$ equivalent that is produced for the generation of that power. Some customers may desire to, for example, run on solar or wind during the day and battery power at night and they may be willing to pay a premium for that selection. Other customers may just want to quantify their total ESG costs to drill a gas well for reporting requirements. An emissions rating system for the different consumer can be tracked and reported by the system.

There is also a value per ton of greenhouse gas in taxes that could be allocated by customer and by project that can be significant. Therefore, it may be economical to use power from solar or wind and pay three times the price rather than be penalized for greenhouse gas emissions based on the source of power. Therefore, the Emissions Allocator 1626 can be both important from the image perspective but also could be a true commercial tie in for penalties and taxes customers become obligated to pay. The Emissions Allocator 1626 can also be programmed to provide output data formatted for reporting to, and/or can provide such data directly and automatically and/or periodically to one or more regulatory agencies to streamline the reporting of such information to local, state, and/or federal, national, or international agencies or other institutions (which may be private institutions monitoring compliance, for example). Such direct reporting will help reduce the costs and increase the accuracy of reporting such information to such agencies or institutions.

The MicroGrid controller 1602 can include a Master Time Controller 1628. The Master Time Controller 1628 can leverage Global Navigation Satellite System (GNSS) (e.g., Global Positioning System (GPS), GLONASS, Galileo, Beidou) time stamps or other absolute time references such as network base Coordinated universal time (UTC) time confirmation to time align all actions and transactions across the system. The GNSS time stamps can include a plurality of GNSS satellites 1650 that provide timing signals. It can be important to have an accurate clock/time source to be able to provide highly accurate phase/time aligned load distribution. The satellite in FIG. 16 is shown not just to indicate that data communication via satellite is possible, but also to indicate that the GPS signal transmitted by the satellites may be received and used. The GPS timing signal can be one way to have very accurate time alignment between the various rigs. The carefully planning timing between rigs can be disrupted if the different rigs are not synchronized on a common clock time. If the rigs are in different time zones, they can be synchronized to a common Universal Coordinated Time (UTC). Although FIG. 16 illustrates one or more GNSS satellites 1650 for accurate time synchronization, these techniques are not limited to using satellite communications for time synchronization. Other time synchronization techniques can be used (e.g., cellular or hardline networked solutions in addition to various other commercially available techniques).

The MicroGrid controller 1602 can include a Load Scheduler 1630. The Load Scheduler 1630 can be in constant communication with all loads and allocates and tracks the tokens in real time to avoid conflict. The Load Scheduler 1630 can also normalize total current consumption to avoid over- or under-generation. In various embodiments, the Load Scheduler 1630 can, for example, plan for 80% allocation to allow for a power availability of 20%. These percentages can vary as appropriate. The available power can be used for on demand scenarios (e.g., running a pump-jack faster or charging a battery). The Load Scheduler 1630 can be used to align the power requirements with the load generation within reasonable constraints. Forecasting seconds, minutes, hours or even days in advance allows the Source Activator 1610 and token bank 1620 to scale up and down with a high degree of efficiency.

The MicroGrid controller 1602 can include a Load Allocation Engine 1632. Distribution of power to the loads might be on a single or multiple branches of the MicroGrid system 1600. The Load Allocation Engine 1632 controls the physical distribution and metering of the power connections to the loads as well as polices the token use. The Load Allocation Engine 1632 can determine priority among various demand loads. The priority can be determined based one or more factors such as nature of activities of load demand, scheduling priorities, and various payment rates.

The MicroGrid controller 1602 can include a Distributed Storage Controller 1634. The Distributed Storage Controller 1634 allows buildup of local storage 1656 in close proximity to the loads which might be advantageous under certain operations or in anticipation of loads requiring more power than the MicroGrid system 1600 can facilitate in the future. For example, load local storage 1656 might be fully charged leading up to a time when power generation is low or a larger portion of the loads are anticipated to be active. Conversely, if a surplus of storage exists at a load device or is it is in higher demand power can be transferred back to the primary storage or converted directly to grid contribution. It can be technically possible for this power to be shared on a direct current (DC) bus but it is highly improbable that this would be economic. Losses can also occur when DC power is passed through an inverter to service alternating current (AC) loads. All of these concerns can be considered when the distributed storage control system reallocates power around the system.

The MicroGrid controller 1602 can include a Load Synchronizer 1636. As production devices such as a pump jack 1654 go through their cyclical states of pumping fluid out of the ground the power required fluctuates significantly. During fracking operations, pumps can be brought up to pressure to excite and activate stages of fracking in the downhole environment. The Load Synchronizer 1636 allows multiple loads to be timed such that the peak draw of the total system is more consistent. Load synchronization can be compared to the timing of an engine where the cylinders are phase adjusted such that even power can be generated at the crankshaft. In the practical pumping example, a timing system can accelerate or decelerate individual pump jacks 1654 so that the strokes of the pumps do not all occur at the same time. In addition to synchronizing multiple pumps at the same time, the Load Synchronizer 1636 can also merge and exit individual pumps into phase alignment as they come online or stop operation. This centralized production synchronizer can communicates with all of the local load synchronizers that might relate to fracking sequencing or pump actions. For example, the Load Synchronizer 1636 can send control signals to pump jacks to slow down pumping operations to minimize their power usage for a given time period, and can be programmed so that the slow down does not fall below a minimum cycle time for any pump jack (such as to avoid a shutdown of the pump jack or interrupting the flow of hydrocarbons from the well).

The MicroGrid controller 1602 can include a Feedstock Controller 1638. The Feedstock Controller 1638 controller can be designed to work in concert with local production managers to increase or decrease the flow of natural gas or other feedstocks to the primary generation systems. Selection of feedstocks to be used might be a function of the demand, the price, the environmental quality or the desired mixing of multiple feedstocks to optimize efficiency of the complete system. The Feedstock Controller 1638 can control the opening and closing of valves for fuel lines (e.g., oil and gas).

VI. Load System Controller

Figure 17:
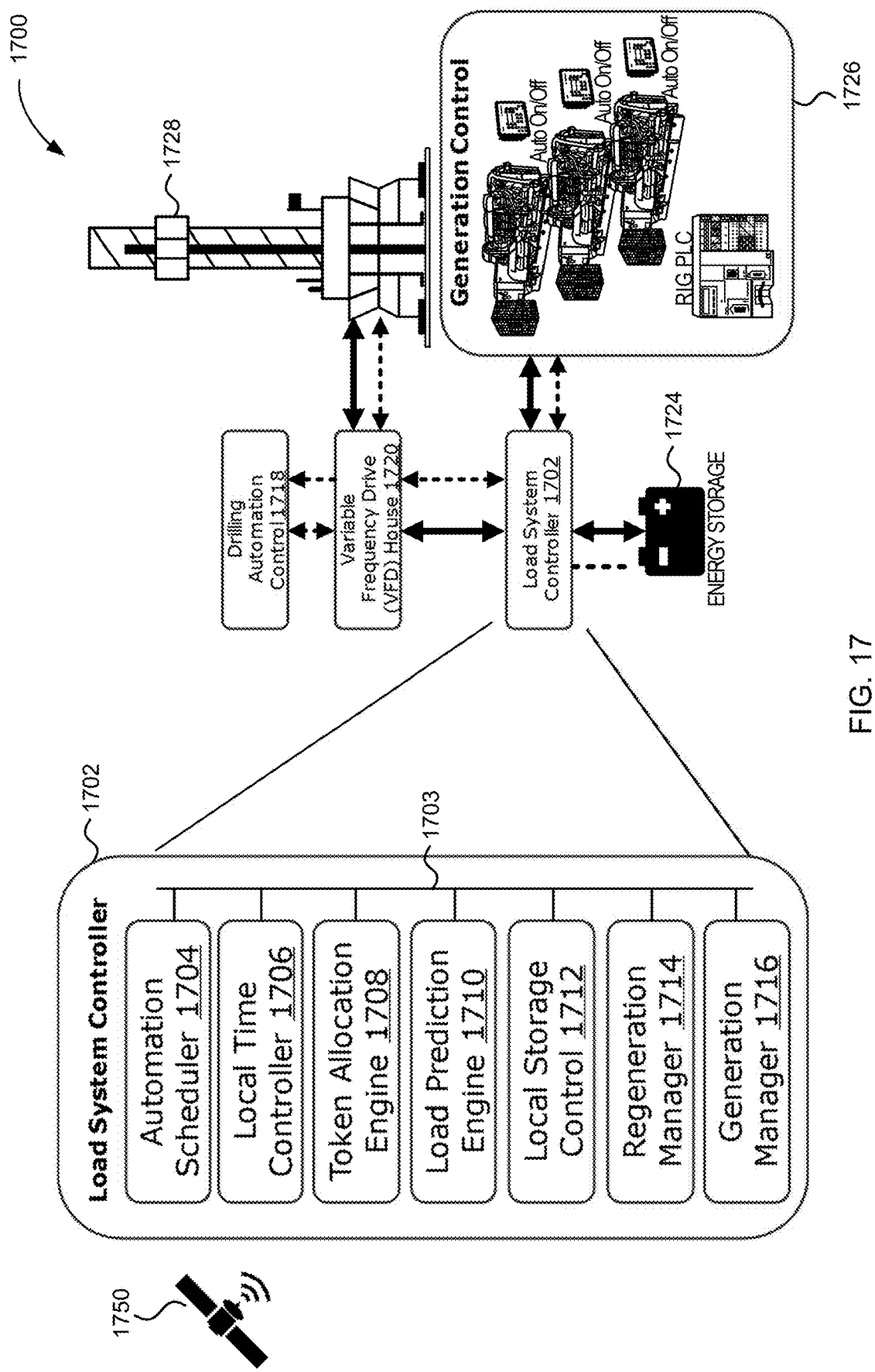
FIG. 17 illustrates an exemplary load system controller as related to a generation control system.

FIG. 17 illustrates an exemplary load system controller 1702 as related to a generation control system 1700. The load system controller 1702 can include one or modules. The modules can include an automation scheduler 1704, a local time controller 1706, a token allocation engine 1708, a load prediction engine 1710, a local storage control 1712, a regeneration manager 1714, and a generation manager. The one or more modules can be connected via a bus 1703. The load system controller 1702 can communicate with an energy source 1724 (e.g., a battery or power storage cell). The load system controller 1702 can also communicate with a power generation control system 1726. The power generation control system can control one or more electrical generators. The power generation control system can include programmable logic controls (PLC) for an oilrig.

The load system controller 1702 can include an Automation Scheduler 1704. The Automation Scheduler 1704 can work with the control system of the load to schedule tasks and power draws based on the available, time constrained tokens managed by the Token Allocation Engine 1708. Timing of high or low power tasks may be shifted to allow for more optimal use of tokens which could be economic, environmental or grid stability influenced. The load system controller 1702 can work in concert with the Automation Scheduler 1704 and may change, delay or accelerate activities to optimize as a complete system level. For example, hoisting the drill string off bottom might be delayed by 30 seconds to avoid peak current occurring until after a regional fracking pump completes a peak load activity. As another example, a fracking operation can delay pumping a stage until a nearby rig completes tripping in 30 minutes. As another example, an area of pump jacks or submersible pumps might accelerate pumping in synchronization while some rig crews or fracking crews are moving and a surplus of power is available from green energy sources on the MicroGrid system 1600. For example, the surplus power can be used for various loads (e.g., irrigation pumps, water wells, or pumping frack water to a centralized pond). There are various loads that many not be time sensitive. In various embodiments available power can be used for pump pressure in storing $CO^2$ byproducts.

The load system controller 1702 can include a Local Time Controller 1706. Similar to the Master Time Controller 1628 shown in FIG. 16, this system is designed to synchronize the load to a common clock system, e.g., a time received from a GNSS satellite 1750, and therefore enable precise time alignment in phase and time for local loads and the entire MicroGrid system 1700 system. Although FIG. 17 illustrates one or more GNSS satellites 1750 for accurate time synchronization, these techniques are not limited to using satellite communications for time synchronization. Other time synchronization techniques can be used (e.g., cellular or hardline networked solutions in addition to various other commercially available techniques).

The load system controller 1702 can include a Token Allocation Engine 1708. The Token Allocation Engine 1708 engine tracks available time specific currents available and allocated for the local load. Multiple business models can be used with this system with some allowing unused tokens to be returned to the token bank for full or reduced credit or converted into local storage through charging of a battery bank for example. It can be important to avoid over allocation of power to all loads leading to inefficiencies, but also allow for situations where loads are disrupted due to unexpected events such as a safety concern or a wellbore stability issue. The frequency of trading of tokens between systems could be at high or low frequency but it is expected that it will be with a resolution of seconds or minutes with forecasting being in much longer term to secure more predictable costs and activities. In various embodiments, there can also be guaranteed service scenarios that can ensure tokes are available. As an example, a more general MicroGrid system 1600 deployment, such as at a hospital, might take precedence over an industrial load in token allocation. In an oil basin, a fracking load might be guaranteed some level of token availability during peak loads to maintain pressure on a fracking stage. The token allocation engine can acquire green energy tokens as they become available or be tuned to balance economic/environmental tradeoffs similar to how someone might select direct flights vs. a connecting flight based on cost delta and schedule. Although the tokens can be used to allocate power to loads, at a system level this can allow for economic and environmental optimization at every stage of automated decision-making.

The load system controller 1702 can include Load Prediction Engine 1710. Similar to the system load predictor 1618, shown in FIG. 16, the Load Prediction Engine 1710 looks at current activity, future activity and historical trends to anticipate loads that will need to be serviced in the future. For example, if a drilling rig is within 10 feet of total depth (TD) of the well, the engine can anticipate the remaining time to reach TD and the pre-tripping activities on previous rigs to determine when continuous and larger loads will need to be supported for an extended period of time. This information can be shared using the system load predictor 1618. The local Load Prediction Engine 1710 can request and or purchase power allocation tokens for the appropriate time. While it is not expected that these predictions will be perfect, they certainly can be more accurate than what historically is available to a traditional grid or centralized power source.

The load system controller 1702 can include a Local Storage Controller 1712. As loads vary throughout the execution of activities at the local load site, energy storage devices 1724 can be used to capture available power or pre-charged to support future local peak loads. Additionally, regenerative systems on location can add power to the energy storage devices 1724. The Local Storage Controller 1712 can also pre-charge the local storage while it is economically or environmentally advantage in anticipation of a future peak load that might exceed local generation or allocation potential. As an example, in anticipation of a tripping cycle on a rig, the Local Storage Controller 1712 can seek to use local generators, regenerative power or grid power to fully charge a battery storage device to ensure plenty of power is available for tripping out of the hole at a rapid pace.

The load system controller 1702 can include a Regeneration Manager 1714. As certain function are performed there are mechanical processes where power is able to be captured rather than converting available energy into heat. For example, the drawworks of a drilling rig may be able to electrically break the downward motion of a load harnessing the power into charging capacity for local storage. This energy may even be redirected back to the MicroGrid system 1600 as an additive power source if the local power storage is saturated or if an offsite load is in need of additional power.

The load system controller 1702 can include a Generation Manager 1716. The Generation Manager 1716 can plan which generators are active on a rig or in any scenario where a generation device coexists with the load. By balancing the generation activity with known on and offsite power reserves and in collaboration with the local storage control, an optimal number of generators can be engaged, and their target operating speed/load can be optimized for best fuel economy and/or emissions. Additionally, in some circumstances it might be beneficial to allow distributed generation to service the MicroGrid system 1600. For example, a rig that is in a low current mode could run generators to provide supporting power to another load in the area to overcome MicroGrid system 1600 shortages and operate rig site generators at a more optimal load.

The load system controller 1702 can communicate with the variable frequency drive (VFD) 1720 of an oilrig 1728. The VFD 1820 can monitor and control the parameters of the oilrig 1728. The VFD 1720 can communicate with drilling automation and control system 1718.

Figure 18:
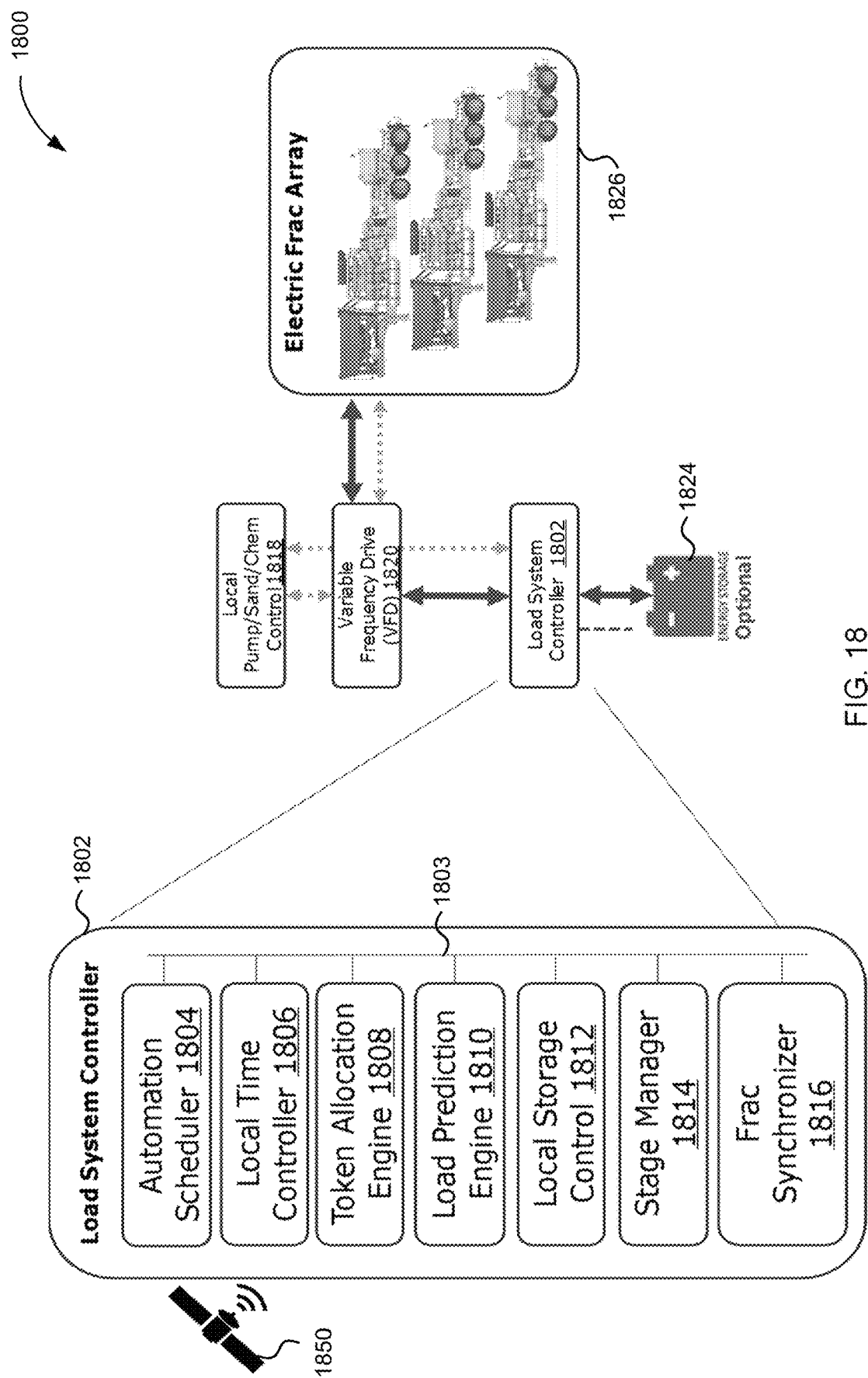
FIG. 18 illustrates an exemplary load system controller as related to an electric fracking array.

FIG. 18 illustrates an exemplary load system controller 1802 as related to a generation control system 1800 for a fracking operation. The load system controller 1802 can include one or modules. The modules can include an automation scheduler 1804, a local time controller 1806 (that can communicate with one or more GNSS satellites 1850), a token allocation engine 1808, a load prediction engine 1810, and a local storage control 1812. These modules perform essentially the same functions the corresponding modules as described above for the generation control system 1700 shown in FIG. 17. The load system controller 1802 can also include modules for a stage manager 1814 and a fracking synchronizer 1816. The one or more modules can be connected via a bus 1803. Although FIG. 18 illustrates one or more GNSS satellites 1850 for accurate time synchronization, these techniques are not limited to using satellite communications for time synchronization. Other time synchronization techniques can be used (e.g., cellular or hardline networked solutions in addition to various other commercially available techniques).

The load system controller 1802 can communicate with an energy source 1824 (e.g., a battery or power storage cell). The load system controller 1802 can also communicate with an electric fracking array 1826.

The load system controller 1802 can communicate with the variable frequency drive (VFD) 1820 of an electric fracking array 1826. The VFD 1820 can monitor and control the parameters of the electric fracking array 1826. The VFD 1820 can communicate with a local pump/sand/chemical control system 1818.

The load system controller 1802 can include a Stage Manager 1814. In the fracking process, a large amount of energy can be consumed when applying pressure to a targeted stage of a well. The Stage Manager 1814 can allow the system to optimize the timing of the load along with the Automation Scheduler 1804 but also enables fracking energy to be synchronized around the MicroGrid system 1600 by way of the Fracking Synchronizer 1816 for both power efficiency and in some case even intentional simultaneous or non-simultaneous excitation of nearby wells being fracked. Further the Stage Manager 1814 can help manage the impact of fracking on any nearby drilling or production activities.

The load system controller 1802 can include a Fracking Synchronizer 1816. In order to improve the stability of the MicroGrid system 1600 it can be advantageous to phase shift pumping and peak power intervals such that multiple fracking activities do not put a load on the MicroGrid system 1600 at the same time. By using a combination of the Automation Scheduler 1804 and the Stage Manager 1814 along with the Fracking Synchronizer 1816 this leveling of power draw can be better normalized. In some cases even piston stroke timing can be optimized across multiple pumping system to spread the time domain or spectrum of the peak power draws of the total system.

Figure 19:
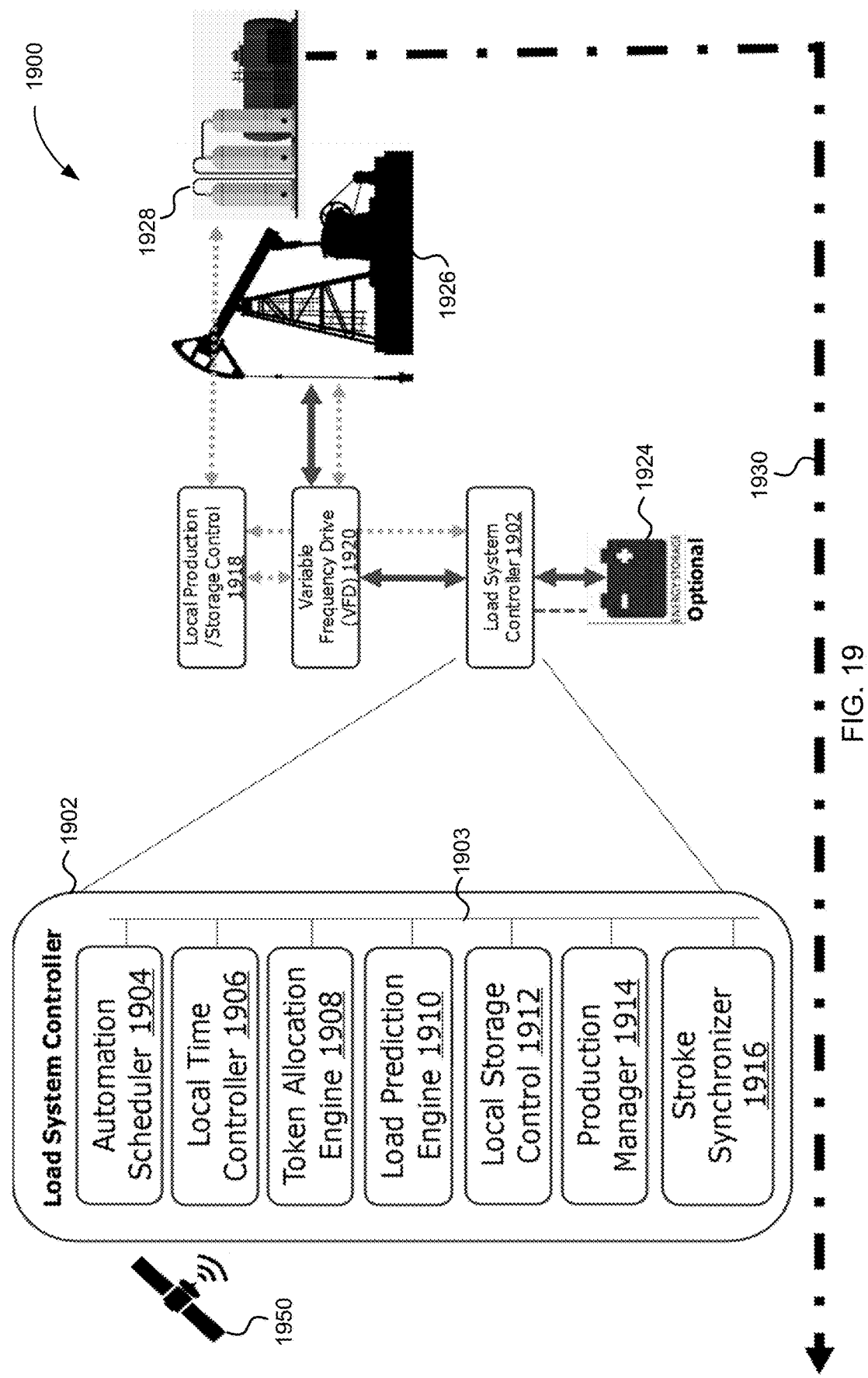
FIG. 19 illustrates an exemplary load system controller as related to a load production and storage control system.

FIG. 19 illustrates an exemplary load system controller 1902 as related to a generation control system 1900 for one or more oil pump jacks 1926. The load system controller 1902 can include one or modules. The modules can include an automation scheduler 1904, a local time controller 1906 (that can communicate with one or more GNSS satellites 1950), a token allocation engine 1908, a load prediction engine 1910, and a local storage control 1912. These modules perform essentially the same functions the corresponding modules as described above for the generation control system 1700 shown in FIG. 17. The load system controller 1902 can also include modules for a production manager 1914 and a stroke synchronizer 1916. The one or more modules can be connected via a bus 1903. Although FIG. 19 illustrates one or more GNSS satellites 1950 for accurate time synchronization, these techniques are not limited to using satellite communications for time synchronization. Other time synchronization techniques can be used (e.g., cellular or hardline networked solutions in addition to various other commercially available techniques).

The load system controller 1902 can communicate with an energy source 1924 (e.g., a battery or power storage cell). The load system controller 1902 can also communicate with one or more oil pump jacks 1926 or local storage tanks 1928. Natural gas stored in the local storage tanks 1928 can be transferred via a pipeline 1930 to a local natural gas network, other storage facilities, or other power generation facilities.

The load system controller 1902 can communicate with the variable frequency drive (VFD) 1920 of the one or more oil pump jacks 1926. The VFD 1920 can monitor and control the parameters of the oil pump jacks 1926. The VFD 1920 can communicate with a local production/storage control system 1918. The local production/storage control can communicate with the storage tanks 1928.

The load system controller 1902 can include a Production Manager 1914. The Production Manager 1914 can track tank volumes and gas pressures to better understand the feedstock capacity of the pumping system as well as categorize the quality of the feedstock available. Additionally, by understanding the limits of what can be produced relative to storage available this system can enhance logistics of mobile production pickup and predict limits of byproduct feedstock in the future. For example, if an oil storage tank 1928 is near capacity and a truck is not scheduled to visit the site to offload oil future the surface or downhole pump may need to be turned off and the natural gas feedstock may be disrupted. With anticipation of this contingency feedstock or power allocations can be planned for in advance. The Production Manager 1914 can also plan the activity of pumps and artificial lift devices in a way that is most advantageous for power costs and/or environmental considerations of the power source including time of day or weather variations to be more in line with more green energy supplies.

The load system controller 1902 can include a Stroke Synchronizer 1916. Similar to the Fracking Synchronizer 1816 shown in FIG. 18, controlling surface and downhole pumps can be timed such that peak current is normalized. If pump jacks 1926 are for instance allowed to run at semi random speeds a continuous variety of loads will be seen by the MicroGrid system 1600 as in some case all pump strokes happen at the same time or are distributed in a variety of ways. With the synchronization systems and the common time system the pumps can be programmed into any power/load profile distribution.

Figure 20:
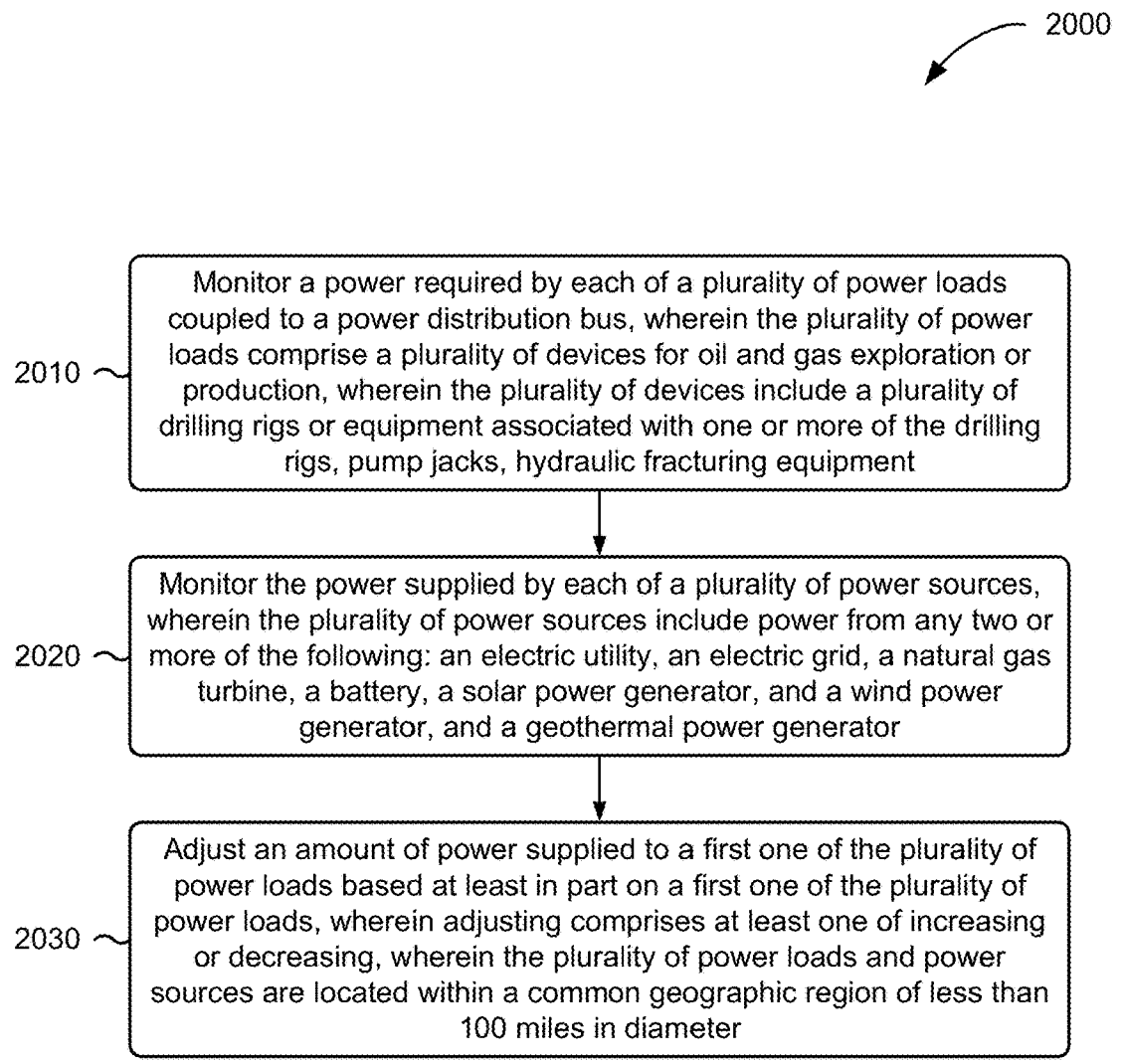
FIG. 20 illustrates a first exemplary flow diagram for a technique for control of a MicroGrid.

FIG. 20 is a flowchart of an example process 2000 associated with techniques for controlling MicroGrids. In some implementations, one or more process blocks of FIG. 20 may be performed by a power controller (e.g., power controller 1000). In some implementations, one or more process blocks of FIG. 20 may be performed by another device or a group of devices separate from or including the power controller. Additionally, or alternatively, one or more process blocks of FIG. 20 may be performed by one or more components of controller 1000, such as processor 1001, memory 1010, input device 1008, output device 1009, and/or network adapter 1020.

As shown in FIG. 20, process 2000 may include monitoring, at block 2010, a power required by each of a plurality of power loads coupled to a power distribution bus. The plurality of power loads can include a plurality of devices for oil and gas exploration or production. The plurality of devices can include a plurality of drilling rigs or equipment associated with one or more of the drilling rigs, pump jacks, hydraulic fracturing equipment. The monitoring can include measuring the current draw from any one of the plurality of devices. The monitoring can include receiving a signal or message via wired or wireless means from the one of more devices. The monitoring can include analyzing the drilling plan to see what a projected power requirement may be for a particular time.

As further shown in FIG. 20, process 2000 may include monitoring, at block 2020, the power supplied by each of a plurality of power sources coupled to the power distribution bus. The plurality of power sources can include power from any two or more of the following: an electric utility, an electric grid, a natural gas turbine, a battery, a solar power generator, and a wind power generator, and a geothermal power generator. The monitoring can include measuring the current production from any one of the plurality of devices. The monitoring can include receiving a signal or message via wired or wireless means from the one of more devices. Information on peak or expected power based at least in part on current conditions can received by the control system. The monitoring can include analyzing the drilling plan to see what a projected power production may be for a particular time.

As further shown in FIG. 20, process 2000 may include adjusting, at block 2030, an amount of power supplied to a first one of the plurality of power loads based at least in part on a first one of the plurality of power loads. The adjusting can include at least one of increasing or decreasing the power supplied. The plurality of power loads and power sources can be located within a geographic region of within a predetermined area (e.g., less than 100 miles in diameter.)

Process 2000 may include additional implementations, such as any single implementation or any combination of implementations described below and/or in connection with one or more other processes described elsewhere herein.

In a first implementation, the plurality of power sources further include one or more natural gas turbine generators, each coupled to a natural gas source associated with a drilling rig or a pump jack.

In a second implementation, alone or in combination with the first implementation, process 2000 includes receiving data from each of the plurality of power loads regarding upcoming operations of the respective one of the plurality of power loads and a timing thereof. In response to the data received from the plurality of power loads, the technique can include increasing the amount of power supplied to at least one of the plurality of power loads so that the at least one of the plurality of power loads will have additional power for the upcoming operations when needed by the at least one of the plurality of power loads.

In a third implementation, alone or in combination with one or more of the first and second implementations, process 2000 includes determining an amount of power potentially available from each of the plurality of power sources, determining which one or more of the plurality of power sources provides power with less environmental impact than other of the plurality of power sources, and selecting the one or more of the plurality of power sources with less environmental impact to provide the amount of power supplied to the plurality of power loads.

In a fourth implementation, alone or in combination with one or more of the first through third implementations, the environmental impact comprises at least one of a calculated carbon footprint, a number of particulates introduced into an environment, and a net energy consumption.

In a fifth implementation, alone or in combination with one or more of the first through fourth implementations, process 2000 includes determining the amount of power potentially available from each of the plurality of power sources, determining which one or more of the plurality of power sources provides power with less noise than other of the plurality of power sources, and selecting the one or more of the plurality of power sources with less noise to provide the amount of power supplied to the plurality of power loads.

Although FIG. 20 shows example blocks of process 2000, in some implementations, process 2000 may include additional blocks, fewer blocks, different blocks, or differently arranged blocks than those depicted in FIG. 20. Additionally, or alternatively, two or more of the blocks of process 2000 may be performed in parallel.

It should be noted that some of the power loads may be AC, while others may run on DC, and similarly, some of the power sources may be AC, while others provide DC power. For purposes of the disclosure herein, any or all of the power loads and/or power sources may be DC or AC, and one or more power converters may be used to convert from AC to DC and from DC to AC as may be needed or helpful in a given configuration.

Figure 21:
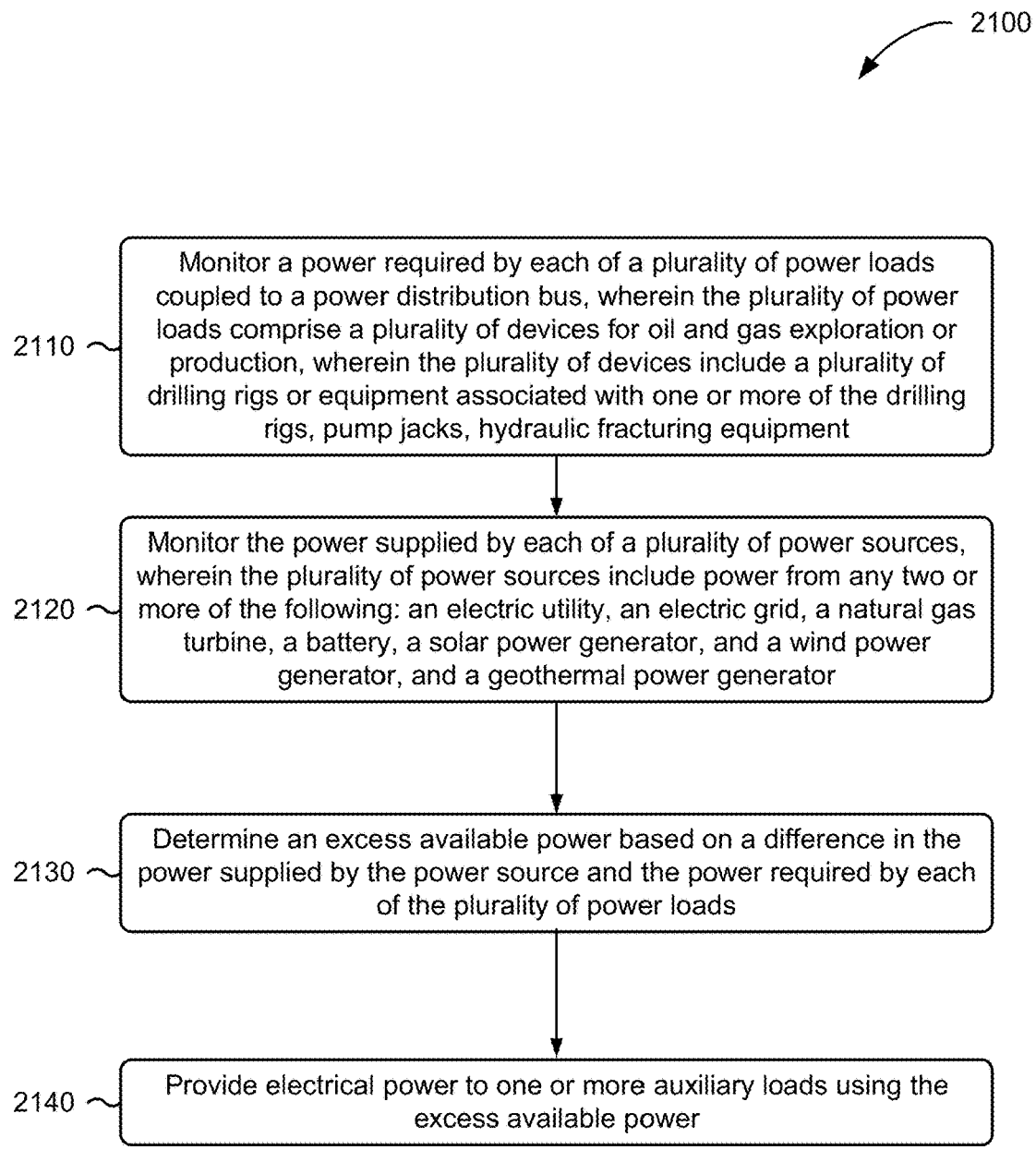
FIG. 21 illustrates a second exemplary flow diagram for a technique for control of a MicroGrid.

FIG. 21 is a flowchart of an example process 2100 associated with Systems and Techniques for Controlling MicroGrids. In some implementations, one or more process blocks of FIG. 21 may be performed by a controller (e.g., controller 1000). In some implementations, one or more process blocks of FIG. 21 may be performed by another device or a group of devices separate from or including the controller. Additionally, or alternatively, one or more process blocks of FIG. 21 may be performed by one or more components of controller 1000, such as processor 1001, memory 1010, input device 1008, output device 1009, and/or peripheral adapter 1006.

As shown in FIG. 21, process 2100 may include monitoring a power required by each of a plurality of power loads coupled to a power distribution bus, wherein the plurality of power loads comprise a plurality of devices for oil and gas exploration or production, wherein the plurality of devices include a plurality of drilling rigs or equipment associated with one or more of the drilling rigs, pump jacks, hydraulic fracturing equipment (block 2110). For example, the power controller may monitor a power required by each of a plurality of power loads coupled to a power distribution bus, wherein the plurality of power loads comprise a plurality of devices for oil and gas exploration or production, wherein the plurality of devices include a plurality of drilling rigs or equipment associated with one or more of the drilling rigs, pump jacks, hydraulic fracturing equipment, as described above.

As further shown in FIG. 21, process 2100 may include monitoring the power supplied by a power source coupled to the power distribution bus, wherein the power source includes power from any one of the following: an electric utility, an electric grid, a natural gas turbine, a battery, a solar power generator, and a wind power generator, and a geothermal power generator (block 2120). For example, the power controller may monitor the power supplied by a power source coupled to the power distribution bus, wherein the power source includes power from any one of the following: an electric utility, an electric grid, a natural gas turbine, a battery, a solar power generator, and a wind power generator, and a geothermal power generator, as described above.

As further shown in FIG. 21, process 2100 may include determining available power based on a difference in the power supplied by the power source and the power required by each of the plurality of power loads (block 2130). For example, the power controller may determine available power based on a difference in the power supplied by the power source and the power required by each of the plurality of power loads, as described above.

As further shown in FIG. 21, process 2100 may include performing one or more actions to dynamically manage the plurality of power loads for the power distribution bus (block 2140). For example, the power controller may perform one or more actions to dynamically manage the plurality of power loads for the power distribution bus, as described above.

Process 2100 may include additional implementations, such as any single implementation or any combination of implementations described below and/or in connection with one or more other processes described elsewhere herein.

In a first implementation, the one or more actions comprise rescheduling one or more drill operations based on the available power.

In a second implementation, alone or in combination with the first implementation, the one or more actions reduce a power requirement of an electrical power driven system until a generator is activated and producing a threshold power.

In a third implementation, alone or in combination with one or more of the first and second implementations, the one or more actions reduce a power requirement of an electrical power driven system until a power storage device is charged above a threshold power level.

In a fourth implementation, alone or in combination with one or more of the first through third implementations, process 2100 includes sending available power to one or more auxiliary loads. In various embodiments, the one or more auxiliary loads can include a server farm, one or more computers mining cryptocurrency, or one or more welding machines.

In a fifth implementation, alone or in combination with one or more of the first through fourth implementations, the one or more auxiliary loads comprise charging one or more storage batteries.

In a sixth implementation, alone or in combination with one or more of the first through fifth implementations, the one or more auxiliary loads comprise charging one or more electric vehicles.

In a seventh implementation, alone or in combination with one or more of the first through sixth implementations, process 2100 includes one or more natural gas turbine generators, each coupled to a natural gas source associated with a drilling rig or a pump jack.

In an eighth implementation, alone or in combination with one or more of the first through seventh implementations, process 2100 includes distributing the available power using a token-based system.

In a ninth implementation, alone or in combination with one or more of the first through eighth implementations, process 2100 includes determining an amount of power potentially available from each of the plurality of power sources, determining which one or more of the plurality of power sources provides power with less environmental impact than other of the plurality of power sources, and selecting the one or more of the plurality of power sources with less environmental impact to provide the amount of power supplied to the plurality of power loads.

In a tenth implementation, alone or in combination with one or more of the first through ninth implementations, the environmental impact comprises at least one of a calculated carbon footprint, a number of particulates introduced into an environment, and a net energy consumption.

In an eleventh implementation, alone or in combination with one or more of the first through tenth implementations, process 2100 includes a plurality of power sources, and determining the amount of power potentially available from each of the plurality of power sources, determining which one or more of the plurality of power sources provides power with less noise than other of the plurality of power sources, and selecting the one or more of the plurality of power sources with less noise to provide the amount of power supplied to the plurality of power loads.

Although FIG. 21 shows example blocks of process 2100, in some implementations, process 2100 may include additional blocks, fewer blocks, different blocks, or differently arranged blocks than those depicted in FIG. 21. Additionally, or alternatively, two or more of the blocks of process 2100 may be performed in parallel.

Figure 22:
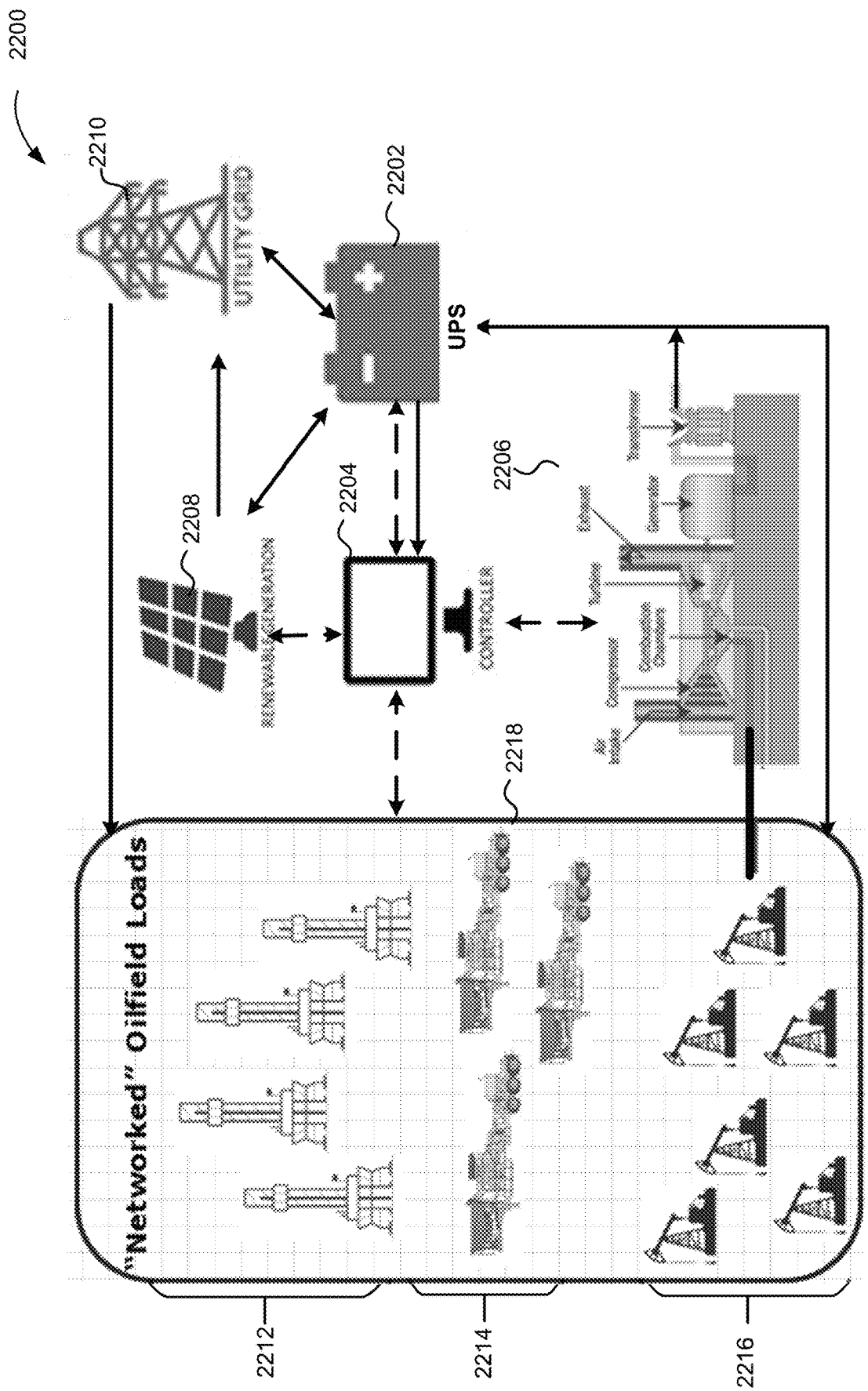
FIG. 22 illustrates an example of an uninterruptible power source (UPS) of a MicroGrid system.

FIG. 22 illustrates an example of the inclusion of an uninterruptible power source (UPS) 2202 of a MicroGrid system 2200. An uninterruptible power supply or uninterruptible power source (UPS) generally is an electrical apparatus that provides emergency power to a load when the input power source or mains power fails. A UPS differs from an auxiliary or emergency power system or standby generator in that it will provide near-instantaneous protection from input power interruptions, such as by supplying energy stored in batteries, supercapacitors, or flywheels. The on-battery run-time of most uninterruptible power sources is relatively short (e.g., only a few minutes) but sufficient to start a standby power source or properly shut down the protected equipment. The solid lines between various components in FIG. 22 indicates the transfer of electrical power between various components of the MicroGrid system 2200.

The dashed lines indicate communication paths between various components. For example the UPS 2202 can provide electrical power to the controller 2204. In addition the controller 2204 can have bi-directional communications with the UPS 2202.

A MicroGrid system 2200 can link a power controller with one or more sources of electrical power (e.g., utility grid, energy storage devices, renewable generation, portable generation units) and one or more electrical loads (e.g., drilling rigs, oil derrick pumps, and mobile drilling rigs). A critical mass centralized power system can overcome some of the drawbacks of existing power generation systems and hybrid natural gas systems. A power consumption arbitration engine can help drilling crews schedule and manage drilling events for a given region accounting for power consumption for particular drilling events. As an oil field matures, the electrical power requirements change (e.g., more pump jacks lifting oil out of the ground) instead of specific drilling events. In the aggregate these pump jacks can aggregate into to a large electrical load, especially when numerous upstrokes happen at the same time. But, a power consumption arbitration engine using digital controls can manage the field of pump jacks efficiently so the timing of the upstroke cycle is offset thereby normalizing the current draw for the field.

The MicroGrid system 2200 can provide networked industrial adaptive monitoring, management, and control of electrical generation sources and electrical distribution. The MicroGrid system 2200 can be connected to control systems used for drilling, completion, and production for oil drilling operations to allow for scheduling and load balancing of electrical power distribution based on current electrical power generation and scheduled demand.

The MicroGrid system 2200 can include a power controller 2204. The power controller 2204 can connect to various sources of electrical power. The electrical power can be either alternating current or direct current. The power controller 2204 can connect with a utility grid 2210 (e.g., through local electric utility lines), a UPS 2202 (e.g., batteries, power cells), local generation sources 2206 (e.g., portable generation systems); renewable generation sources 2208 (e.g., solar power, wind power, geothermal).

The power controller 2204 can receive load information from an oil field network 2218. The oil field network 2218 can include one or more of drilling rigs 2212, hydraulic fracturing equipment 2214, and oil pump jacks 2216.

The power controller 2204 can manage and distribute power from the various power sources based at least in part on the load requirement of the oil field network 2218. The power controller 2204 can interact with other drilling control systems to improve efficiencies in electrical power generation and distribution.

A UPS 2202 can be a battery based grid connection that can be used to clean and reduce peak current impacts to rural grids. The UPS 2202 can be coupled to and thus be monitored and controlled by a controller 2204. The UPS 2202 can store power in one or more battery cells. The UPS 2202 can receive power from a rig generator system 2206, renewable sources 2208 (e.g., wind, solar, and geothermal), and/or a utility grid 2210, and may receive power from different sources at different times. This allows the MicroGrid System 2200 to capture regenerative power from the drilling rig. The UPS 2202 can be used to provide some safety net in the event of a power outage on the MicroGrid System 2200.

In various embodiments, the utility grid 2210 can provide electrical power to one or more components of the oil field network 2218 and the UPS 2202. The UPS 2202 can provide electrical power to the oil field network 2218, the controller 2204, and the oil field network 2218.

The UPS 2202 can be networked across multiple rigs. This can form an edge-like system that can be easier to retrofit to older rigs but can still be integrated into the control system.

Figure 23:
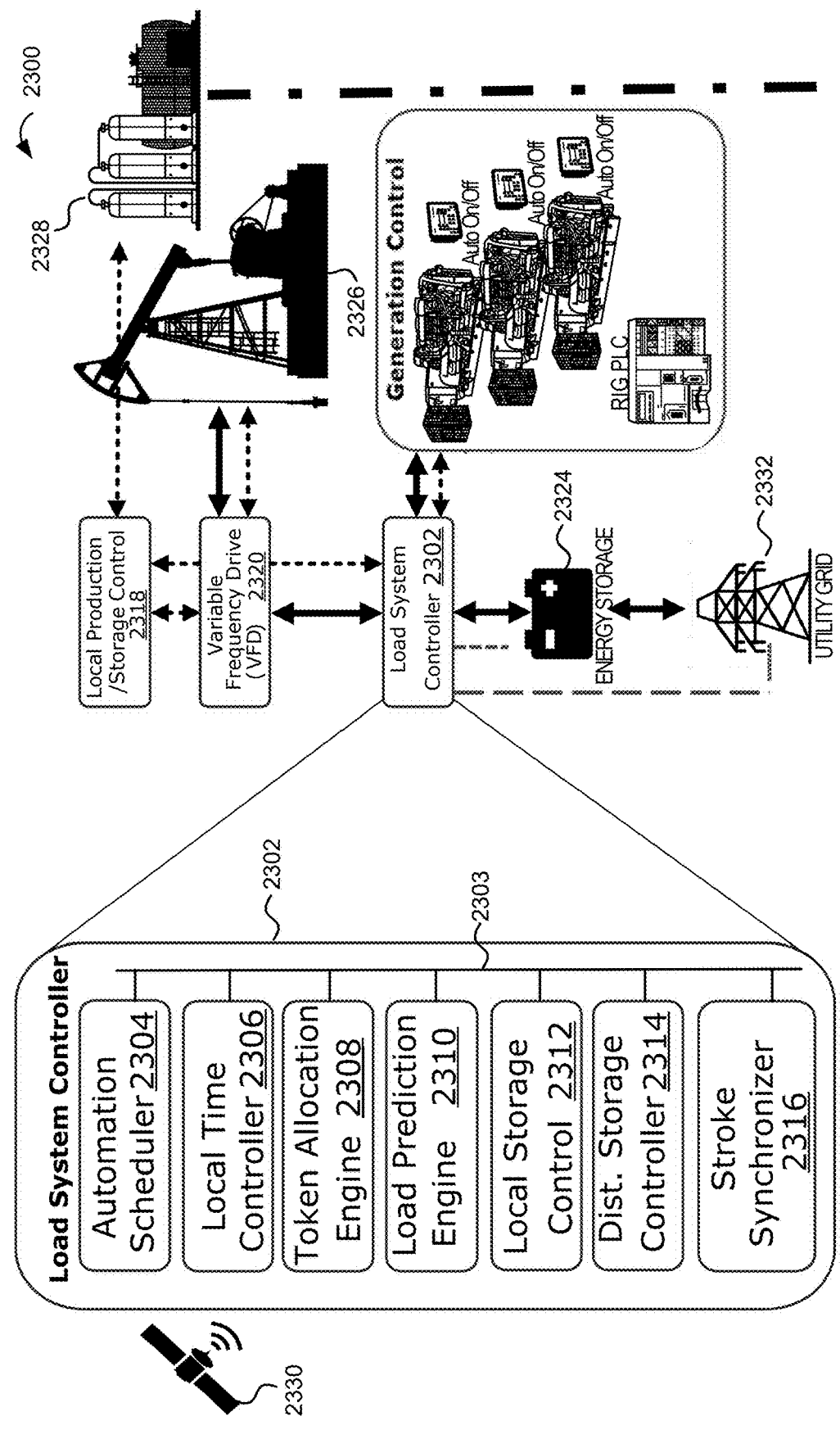
FIG. 23 illustrates an exemplary load system controller as related to an uninterruptible power source (UPS) of a MicroGrid system.

FIG. 23 illustrates an exemplary load system controller 2302 as related to a generation control system 1800 for one or more oil pump jacks 2326. The load system controller 2302 can include one or modules. The modules can include an automation scheduler 2304, a local time controller 2306 (that can communicate with one or more GNSS satellites 2350), a token allocation engine 2308, a load prediction engine 2310, and a local storage control 2312. Although FIG. 23 illustrates one or more GNSS satellites 2330 for accurate time synchronization, these techniques are not limited to using satellite communications for time synchronization. Other time synchronization techniques can be used (e.g., cellular or hardline networked solutions in addition to various other commercially available techniques). These modules perform essentially the same functions the corresponding modules as described above for the generation control system 1700 shown in FIG. 17. The load system controller 2302 can also include modules for a production manager 2314 and a stroke synchronizer 2316. The one or more modules can be connected via a bus 2303.

The load system controller 2302 can communicate with an energy source 2324 (e.g., a battery or power storage cell). The load system controller 2302 can also communicate with one or more oil pump jacks 2326 or local storage tanks 2328. A local utility grid 2332 can connect to the energy storage 2324. In this way, the energy storage 2324 can serve as a UPS for an existing rural grid (e.g., the local utility grid 2332). In the networked UPS case, a central computer and/or a local computer (e.g., the load system controller 2302) would control the UPS systems at the load and time shift automation and load consumption as appropriate in such a way to make the system more compatible with and more consistent for the local utility grid 2332. The local utility grid 2332 can feed the hub of the MicroGrid 2300 or can feed directly to the energy storage 2324 at the load. This can evolve into a full MicroGrid 2300 implementation and could also be used as a way to make legacy equipment/loads compatible with the new automated systems.

The load system controller 2302 can communicate with the variable frequency drive (VFD) 2320 of the one or more oil pump jacks 2326. The VFD 2320 can monitor and control the parameters of the oil pump jacks 2326. The VFD 2320 can communicate with a local production/storage control system 2318. The local production/storage control can communicate with the storage tanks 2328. Natural gas stored in the local storage tanks 2328 can be transferred via a pipeline 2330 to a local natural gas network, other storage facilities, or other power generation facilities.

The load system controller 2302 can include a Production Manager 2314. The Production Manager 2314 can track tank volumes and gas pressures to better understand the feedstock capacity of the pumping system as well as categorize the quality of the feedstock available. Additionally, by understanding the limits of what can be produced relative to storage available this system can enhance logistics of mobile production pickup and predict limits of byproduct feedstock in the future. For example, if an oil storage tank 2328 is near capacity and a truck is not scheduled to visit the site to offload oil future the surface or downhole pump may need to be turned off and the natural gas feedstock may be disrupted. With anticipation of this contingency feedstock or power allocations can be planned for in advance. The Production Manager 2314 can also plan the activity of pumps and artificial lift devices in a way that is most advantageous for power costs and/or environmental considerations of the power source including time of day or weather variations to be more in line with more green energy supplies.

The load system controller 2302 can include a Stroke Synchronizer 2316. Similar to the Fracking Synchronizer 1816 shown in FIG. 18, controlling surface and downhole pumps can be timed such that peak current is normalized. If pump jacks 2326 are for instance allowed to run at semi random speeds a continuous variety of loads will be seen by the MicroGrid system 2300 as in some case all pump strokes happen at the same time or are distributed in a variety of ways. With the synchronization systems and the common time system the pumps can be programmed into any power/load profile distribution.

The Load System controller 2302 can include a Distributed Storage Controller 2334. The Distributed Storage Controller 2334 allows buildup of local storage in close proximity to the loads which might be advantageous under certain operations or in anticipation of loads requiring more power than the MicroGrid system 2300 can facilitate in the future. For example, load local storage might be fully charged leading up to a time when power generation is low or a larger portion of the loads are anticipated to be active. Conversely, if a surplus of storage exists at a load device or is it is in higher demand power can be transferred back to the primary storage or converted directly to grid contribution. It can be technically possible for this power to be shared on a direct current (DC) bus but it is highly improbable that this would be economic. Losses can also occur when DC power is passed through an inverter to service alternating current (AC) loads. All of these concerns can be considered when the distributed storage control system reallocates power around the system. The Distributed Storage Controller 2334 would allow control of a local grid 2332.

As used below, any reference to a series of examples is to be understood as a reference to each of those examples disjunctively (e.g., "Examples 1-4" is to be understood as "Examples 1, 2, 3, or 4").

Example 1 is a method for electrical power generation and control, the method comprising: receiving information regarding current electrical power requirements for a drilling rig based at least in part on oil field operations; receiving information regarding projected electrical power requirements for the drilling rig based at least in part on the oil field operations; determining a current power generation capacity for an electrical power source; and determining one or more actions based a plurality of factors to optimize power generation and load requirements for the drilling rig.

Example 2 is the method of example 1, wherein the one or more actions delay one or more oil field operations that cause a spike in current requirement.

Example 3 is the method of example 1, wherein the one or more actions reduce a power requirement of an electrical power driven system until a generator is activated or a power storage device is charged above a threshold power level.

Example 4 is the method of example 1, wherein the one or more actions include adjusting the current power generation capacity in anticipation of a pending load transition.

Example 5 is the method of example 4, wherein the adjusting the current power generation capacity includes reducing an output of a power generation system when the pending load transition is to a state of lower current requirement.

Example 6 is the method of example 4, wherein the adjusting the current power generation capacity includes increasing an output of a power generation system when the pending load transition is to a state of higher current requirements.

Example 7 is the method of example 1, wherein the projected electrical power requirements for the drilling rig is based at least in part on stored historical load profiles.

Example 8 is the method of example 1, wherein the plurality of factors include at least one of a commercial loss of rig productivity, an impact to well bore placement and quality, an impact to ESG emissions, an impact to fuel consumption for power generation systems, and an impact to rig safety.

Example 9 is the method of example 1, further comprising: generating power using regenerative power techniques by converting kinetic energy of the drilling rig into electrical energy for charging a power storage device of the drilling rig.

Example 10 is the method of example 9, further comprising: determining a time for generating power using regenerative power techniques based at least in part in current operations or forecast operations of the drilling rig.

Example 11 is the method of example 10, further comprising: adjusting generator output during the time for generating power using regenerative power techniques.

Example 12 is the method of example 9, further comprising: determining a charge state of the power storage device prior to generating power using regenerative power techniques; comparing the charge state of the power storage device with a charge threshold; and ceasing the generating power using regenerative power techniques if the charge state of the power storage device exceeds the charge threshold.

Example 13 is the method of example 12, further comprising: applying a resistive load to convert unnecessary electrical power into heat.

Example 14 is the method of example 12, further comprising: diverting excess power capacity to other electrical systems without passing through the power storage device.

Example 15 is the method of example 1, further comprising: determining that the current or the projected electrical power requirements will exceed the current power generation capacity.

Example 16 is a system for electrical power generation and control, the system comprising: a processor; a memory coupled to the processor, wherein the memory comprises a plurality of instructions executable by the processor, and wherein the instructions comprise instructions for executing any one of the methods of examples 1-14.

Example 17 is a computer readable medium comprising instructions executable by a processor, the instructions comprising instructions for executing any one of the methods of examples 1-15.

Example 18 is a mobile power device, comprising: a chassis connected to a vehicle body comprising one or more power storage units; a power control system electrically connected to the one or more power storage units; and a docking interface to connect the one or more power storage units to an external load.

Example 19 is the mobile power device of example 18, further comprising: a power generation system configured to charge the one or more power storage units.

Example 20 is the mobile power device of example 19, wherein the power generation system comprises at least one of a mechanical power charging system, a hydrocarbon fuel based generator, or a capacitor system, or any combination thereof.

Example 21 is the mobile power device of example 18, wherein the docking interface is configured to power at least one of a crane, a suction pump, a fork lift, a front end elevator, and any combination thereof.

Example 22 is the mobile power device of example 18, wherein the one or more power storage units provides electrical power for an electrical motor connected to the chassis.

Example 23 is a method for electrical power generation and control, the method comprising: determining a battery charge level for a rechargeable power source; comparing the battery charge level with a threshold power level; and postponing charging the rechargeable power source until the battery charge level is below the threshold power level for a threshold time period.

Example 24 is the method of example 23, further comprising: receiving information relating to one or more oil field operations; determining a recovery time following the one or more oil field operations, the recovery time allows the rechargeable power source to stabilize from a pulse cycle; delaying measurement of the battery charge level until after the recovery time.

Example 25 is the method of example 23, further comprising: receiving information on a current life cycle of the rechargeable power source; and adjusting a charging threshold for charging the rechargeable power source based at least in part on the current life cycle.

Example 26 is the method of example 23, further comprising: receiving information relating to a state of a rig during one or more oil field operations; and determine an optimal time to recharge the rechargeable power source based at least in part on the information.

Example 27 is the method of example 23, further comprising: receiving information relating to a state of a rig during one or more oil field operations within a predetermined time history, the state of the rig provides information on a chemistry of the rechargeable power source; determining a rate for recharging the rechargeable power source based at least in part on the received information; and adjusting the recharging of the rechargeable power source to the determined rate.

Example 28 is the method of example 23, further comprising: receiving information relating to a state of a rig during one or more oil field operations; determining a minimum safe charge level for the rechargeable power source based at least in part on the state of the rig; and setting a threshold for recharging the rechargeable power source above the minimum safe charge level.

Example 29 is the method of example 23, further comprising: determining a temperature of the rechargeable power source; and adjusting the temperature of the rechargeable power source based at least in part on the determined temperature.

Example 30 is a system for electrical power generation and control, the system comprising: a processor; a memory coupled to the processor, wherein the memory comprises a plurality of instructions executable by the processor, and wherein the instructions comprise instructions for executing any one of the methods of examples 23-29.

Example 31 is a computer readable medium comprising instructions executable by a processor, the instructions comprising instructions for executing any one of the methods of examples 23-29.

Example 32 is a method, comprising: monitoring a power required by each of a plurality of power loads coupled to a power distribution bus, wherein the plurality of power loads comprise a plurality of devices for oil and gas exploration or production, wherein the plurality of devices include a plurality of drilling rigs or equipment associated with one or more of the drilling rigs, pump jacks, hydraulic fracturing equipment; monitoring the power supplied by a power source coupled to the power distribution bus, wherein the power source includes power from any one of the following: an electric utility, an electric grid, a natural gas turbine, a battery, a solar power generator, and a wind power generator, and a geothermal power generator; and either or both of adjusting an amount of power supplied to a first one of the plurality of power loads based at least in part on a first one of the plurality of power loads, wherein adjusting comprises at least one of increasing or decreasing, and adjusting the timing of an activity associated with a drilling rig, hydraulic fracturing equipment, or a pump jack responsive to the power available from the power source.

Example 33 is the method of example 32, further comprising a plurality of power sources, wherein the plurality of power sources further comprise one or more natural gas turbine generators, each coupled to a natural gas source associated with a drilling rig or a pump jack.

Example 34 is the method of example 32, further comprising: receiving data from each of the plurality of power loads regarding upcoming operations of the respective one of the plurality of power loads and a timing thereof; and responsive to the data received from the plurality of power loads, increasing the amount of power supplied to at least one of the plurality of power loads so that the at least one of the plurality of power loads will have additional power for the upcoming operations when needed by the at least one of the plurality of power loads.

Example 35 is the method of example 33, further comprising: determining an amount of power potentially available from each of the plurality of power sources; determining which one or more of the plurality of power sources provides power with less environmental impact than other of the plurality of power sources; and selecting the one or more of the plurality of power sources with less environmental impact to provide the amount of power supplied to the plurality of power loads.

Example 36 is the method of example 35, wherein the environmental impact comprises at least one of a calculated carbon footprint, a number of particulates introduced into an environment, and a net energy consumption.

Example 37 is the method of example 34, further comprising a plurality of power sources, and: determining the amount of power potentially available from each of the plurality of power sources; determining which one or more of the plurality of power sources provides power with less noise than other of the plurality of power sources; and selecting the one or more of the plurality of power sources with less noise to provide the amount of power supplied to the plurality of power loads.

Example 38 is a power control system for a local power grid system, the power control system comprising: a processor; a memory coupled to the processor, wherein the memory stores instructions executable by the processor for: receiving information from a power source coupled to a power grid, wherein the power source comprises one or more natural gas turbine generators, one or more batteries, one or more solar power generators, one or more wind power generators, one or more geothermal power generators, a second power grid, or a power generation facility of a utility; receiving information from a plurality of power loads, wherein the plurality of power loads comprise one or more drilling rigs or equipment for drilling, one or more pump jacks, one or more items of equipment for hydraulic fracturing, and wherein the plurality of power loads are located within a 50 mile diameter; responsive to information received from one or more of the plurality of power loads, determining that at least one of the plurality of power loads will either increase its power consumption or decrease its power consumption, and a timing of the increase or decrease; and responsive to the timing of the increase or decrease, determining when to add more power to a power distribution bus coupled to the power source and power loads or to decrease the power supplied to a distribution bus.

Example 39 is the power control system of example 38, wherein the instructions further comprise instructions for determining a desired operating capacity for a natural gas turbine generator responsive to the determining of when to add more power or decrease the power supplied.

Example 40 is the power control system of example 39, wherein the instructions further comprise instructions for sending a control signal to one or more pump jacks or one or more drilling rigs to provide natural gas to the natural gas turbine generator and an amount thereof.

Example 41 is a non-transitory computer-readable medium storing a set of instructions, the set of instructions comprising: one or more instructions that, when executed by one or more processors of a power control system, cause the power control system to: monitor a power required by each of a plurality of power loads coupled to a power distribution bus, wherein the plurality of power loads comprise a plurality of devices for oil and gas exploration or production, wherein the plurality of devices include a plurality of drilling rigs or equipment associated with one or more of the drilling rigs, pump jacks, hydraulic fracturing equipment; monitor the power supplied by each of a plurality of power sources coupled to a power distribution bus, wherein the plurality of power sources include power from any two or more of the following: an electric utility, an electric grid, a natural gas turbine, a battery, a solar power generator, and a wind power generator, and a geothermal power generator; and adjust an amount of power supplied to a first one of the plurality of power loads based at least in part on a first one of the plurality of power loads, wherein adjusting comprises at least one of increasing or decreasing, wherein the plurality of power loads and power sources are located within a geographic region of less than 10 miles in diameter.

Example 42 is the non-transitory computer-readable medium of example 41, wherein the plurality of power sources further comprise one or more natural gas turbine generators, each coupled to a natural gas source associated with a drilling rig or a pump jack.

Example 43 is the non-transitory computer-readable medium of example 41, wherein the one or more instructions further cause the power control system to: receive data from each of the plurality of power loads regarding upcoming operations of the respective plurality of power loads and a timing thereof; and responsive to the data received from the plurality of power loads, increasing the amount of power supplied to at least one of the plurality of power loads so that the at least one of the plurality of power loads will have sufficient power for an upcoming operation when needed by the at least one of the plurality of power loads.

Example 44 is the non-transitory computer-readable medium of example 43, wherein the one or more instructions further cause the power control system to: determine an amount of power potentially available from each of the plurality of power sources; determine which one or more of the plurality of power sources provides power with less environmental impact than other of the plurality of power sources; and select the one or more of the plurality of power sources with less environmental impact to provide the amount of power supplied to the plurality of power loads.

Example 45 is the non-transitory computer-readable medium of example 44, wherein the environmental impact comprises at least one of a calculated carbon footprint, a number of particulates introduced into an environment, and a net energy consumption.

Example 46 is the non-transitory computer-readable medium of example 43, wherein the one or more instructions further cause the power control system to: determine the amount of power potentially available from each of the plurality of power sources; determine which one or more of the plurality of power sources provides power with less noise than other of the plurality of power sources; and select the one or more of the plurality of power sources with less noise to provide the amount of power supplied to the one or more of the plurality of power loads.

Example 47 is a power control system, comprising: one or more memories; and one or more processors, communicatively coupled to the one or more memories, configured to: monitor a power required by each of a plurality of power loads coupled to a power distribution bus, wherein the plurality of power loads comprise a plurality of devices for oil and gas exploration or production, wherein the plurality of devices include a plurality of drilling rigs or equipment associated with one or more of the drilling rigs, pump jacks, hydraulic fracturing equipment; monitor the power supplied by a power source coupled to the power distribution bus, wherein the power source includes power from any one or more of the following: an electric utility, an electric grid, a natural gas turbine, a battery, a solar power generator, and a wind power generator, and a geothermal power generator; and adjust an amount of power supplied to a first one of the plurality of power loads based at least in part on a first one of the plurality of power loads, wherein adjusting comprises at least one of increasing or decreasing, wherein the plurality of power loads and the power source are located within a geographic region of less than 100 miles in diameter.

Example 48 is the power control system of example 47, wherein the plurality of power sources further comprise one or more natural gas turbine generators, each coupled to a natural gas source associated with a drilling rig or a pump jack.

Example 49 is the power control system of example 47, wherein the one or more processors are further configured to: receive data from the plurality of power loads regarding upcoming operations of each of the plurality of power loads and a timing thereof; and responsive to the data received from the plurality of power loads, increasing the amount of power supplied to at least one of the plurality of power loads so that the at least one of the plurality of power loads will have sufficient power for an upcoming operation when needed by the at least one of the plurality of power loads.

Example 50 is the power control system of example 48, wherein the one or more processors are further configured to: determine an amount of power potentially available from each of a plurality of power sources; determine which one or more of the plurality of power sources provides power with less environmental impact than other of the plurality of power sources; and select the one or more of the plurality of power sources with less environmental impact to provide the amount of power supplied to the at least one of the plurality of power loads.

Example 51 is the power control system of example 49, wherein the environmental impact comprises at least one of a calculated carbon footprint, a number of particulates introduced into an environment, and a net energy consumption.

Example 52 is the power control system of example 48, wherein the one or more processors are further configured to: determine the amount of power potentially available from each of the plurality of power sources; determine which one or more of the plurality of power sources provides power with less noise than other of the plurality of power sources; and select the one or more of the plurality of power sources with less noise to provide the amount of power supplied to the at least one of the plurality of power loads.

Example 53 is a method, comprising: monitoring a power required by each of a plurality of power loads coupled to a power distribution bus, wherein the plurality of power loads comprise a plurality of devices for oil and gas exploration or production, wherein the plurality of devices include a plurality of drilling rigs or equipment associated with one or more of the drilling rigs, pump jacks, hydraulic fracturing equipment; monitoring the power supplied by a power source coupled to the power distribution bus, wherein the power source includes power from any one of the following: an electric utility, an electric grid, a natural gas turbine, a battery, a solar power generator, and a wind power generator, and a geothermal power generator; determining available power based on a difference in the power supplied by the power source and the power required by each of the plurality of power loads; and performing one or more actions to dynamically manage the plurality of power loads for the power distribution bus.

Example 54 is the method of example 53, wherein the one or more actions comprise rescheduling one or more drill operations based on the available power.

Example 55 is the method of example 53, wherein the one or more actions reduce a power requirement of an electrical power driven system until a generator is activated and producing a threshold power.

Example 56 is the method of example 53, wherein the one or more actions reduce a power requirement of an electrical power driven system until a power storage device is charged above a threshold power level.

Example 57 is the method of example 53, further comprising sending available power to one or more auxiliary loads.

Example 58 is the method of example 57, wherein the one or more auxiliary loads comprise charging one or more storage batteries.

Example 59 is the method of example 57, wherein the one or more auxiliary loads comprise charging one or more electric vehicles.

Example 60 is the method of example 53, further comprising a plurality of power sources, wherein the plurality of power sources further comprise one or more natural gas turbine generators, each coupled to a natural gas source associated with a drilling rig or a pump jack.

Example 61 is the method of example 53, further comprising: distributing the available power using a token-based system.

Example 62 is the method of example 61, further comprising: determining an amount of power potentially available from each of the plurality of power sources; determining which one or more of the plurality of power sources provides power with less environmental impact than other of the plurality of power sources; and selecting the one or more of the plurality of power sources with less environmental impact to provide the amount of power supplied to the plurality of power loads.

Example 63 is the method of example 62, wherein the environmental impact comprises at least one of a calculated carbon footprint, a number of particulates introduced into an environment, and a net energy consumption.

Example 64 is the method of example 61, further comprising a plurality of power sources, and: determining the amount of power potentially available from each of the plurality of power sources; determining which one or more of the plurality of power sources provides power with less noise than other of the plurality of power sources; and selecting the one or more of the plurality of power sources with less noise to provide the amount of power supplied to the plurality of power loads.

Example 65 is a power control system for a local power grid system, the power control system comprising: a processor; a memory coupled to the processor, wherein the memory stores instructions executable by the processor for: receiving information from a power source coupled to a power grid, wherein the power source comprises one or more natural gas turbine generators, one or more batteries, one or more solar power generators, one or more wind power generators, one or more geothermal power generators, a second power grid, or a power generation facility of a utility; receiving information from a plurality of power loads, wherein the plurality of power loads comprise one or more drilling rigs or equipment for drilling, one or more pump jacks, one or more items of equipment for hydraulic fracturing, and wherein the plurality of power loads are located within a 50 mile diameter; responsive to information received from one or more of the plurality of power loads, determining available power based on a difference in the power supplied by the power source and the power required by each of the plurality of power loads; and performing one or more actions to dynamically manage the plurality of power loads for the power distribution bus.

Example 66 is the power control system of example 65, wherein the one or more actions comprise rescheduling one or more drill operations based on the available power.

Example 67 is the power control system of example 65, wherein the one or more actions reduce a power requirement of an electrical power driven system until a generator is activated and producing a threshold power.

Example 68 is the power control system of example 65, wherein the one or more actions reduce a power requirement of an electrical power driven system until a power storage device is charged above a threshold power level.

Example 69 is the power control system of example 65, further comprising sending available power to one or more auxiliary loads.

Example 70 is the power control system of example 69, wherein the one or more auxiliary loads comprise charging one or more storage batteries.

Example 71 is the power control system of example 69, wherein the one or more auxiliary loads comprise charging one or more electric vehicles.

Example 72 is the power control system of example 65, wherein the instructions further comprise instructions for determining a desired operating capacity for a natural gas turbine generator responsive to the determining of when to add more power or decrease the power supplied.

Example 73 is the power control system of example 65, wherein the instructions further comprise instructions for sending a control signal to one or more pump jacks or one or more drilling rigs to provide natural gas to the natural gas turbine generator and an amount thereof.

Example 74 is a non-transitory computer-readable medium storing a set of instructions, the set of instructions comprising: one or more instructions that, when executed by one or more processors of a power control system, cause the power control system to: monitor a power required by each of a plurality of power loads coupled to a power distribution bus, wherein the plurality of power loads comprise a plurality of devices for oil and gas exploration or production, wherein the plurality of devices include a plurality of drilling rigs or equipment associated with one or more of the drilling rigs, pump jacks, hydraulic fracturing equipment; monitor the power supplied by each of a plurality of power sources coupled to a power distribution bus, wherein the plurality of power sources include power from any two or more of the following: an electric utility, an electric grid, a natural gas turbine, a battery, a solar power generator, and a wind power generator, and a geothermal power generator; determine available power based on a difference in the power supplied by the power source and the power required by each of the plurality of power loads; and performing one or more actions to dynamically manage the plurality of power loads for the power distribution bus.

Example 75 is the non-transitory computer-readable medium of example 74, wherein the one or more actions comprise rescheduling one or more drill operations based on the available power.

Example 76 is the non-transitory computer-readable medium of example 74, wherein the one or more actions reduce a power requirement of an electrical power driven system until a generator is activated and producing a threshold power.

Example 77 is the non-transitory computer-readable medium of example 74, wherein the one or more actions reduce a power requirement of an electrical power driven system until a power storage device is charged above a threshold power level.

Example 78 is the non-transitory computer-readable medium of example 74, further comprising sending available power to one or more auxiliary loads.

Example 79 is the non-transitory computer-readable medium of example 78, wherein the one or more auxiliary loads comprise charging one or more storage batteries.

Example 80 is the non-transitory computer-readable medium of example 78, wherein the one or more auxiliary loads comprise charging one or more electric vehicles.

Example 81 is the non-transitory computer-readable medium of example 74, wherein the plurality of power sources further comprise one or more natural gas turbine generators, each coupled to a natural gas source associated with a drilling rig or a pump jack.

Example 82 is the non-transitory computer-readable medium of example 74, wherein the one or more instructions further cause the power control system to: distribute the available power using a token-based system.

Example 83 is the non-transitory computer-readable medium of example 74, wherein the one or more instructions further cause the power control system to: determine an amount of power potentially available from each of the plurality of power sources; determine which one or more of the plurality of power sources provides power with less environmental impact than other of the plurality of power sources; and select the one or more of the plurality of power sources with less environmental impact to provide the amount of power supplied to the plurality of power loads.

Example 84 is the non-transitory computer-readable medium of example 83, wherein the environmental impact comprises at least one of a calculated carbon footprint, a number of particulates introduced into an environment, and a net energy consumption.

Example 85 is the non-transitory computer-readable medium of example 74, wherein the one or more instructions further cause the power control system to: determine the amount of power potentially available from each of the plurality of power sources; determine which one or more of the plurality of power sources provides power with less noise than other of the plurality of power sources; and select the one or more of the plurality of power sources with less noise to provide the amount of power supplied to the one or more of the plurality of power loads.

The above description of exemplary embodiments of the disclosure has been presented for the purposes of illustration and description. It is not intended to be exhaustive or to limit the disclosure to the precise form described, and many modifications and variations are possible in light of the teaching above. The embodiments were chosen and described in order to best explain the principles of the disclosure and its practical applications to thereby enable others skilled in the art to best utilize the disclosure in various embodiments and with various modifications as are suited to the particular use contemplated.

All publications, patents, and patent applications cited herein are hereby incorporated by reference in their entirety for all purposes.

What is claimed is:

1. A system for electrical power generation and control, the system comprising:
    a controller comprising a processor;
    a memory coupled to the processor, wherein the memory comprises a plurality of instructions executable by the processor to perform operations comprising:
        receiving information regarding current electrical power requirements for a drilling rig based at least in part on oil field operations;
        receiving information regarding projected electrical power requirements for the drilling rig based at least in part on the oil field operations and a historical load profile;
        determining a current power generation capacity for at least two different electrical power sources comprising one or more generators, one or more batteries, a line power of a remote power plant, or one or more regenerative power units;
        determining an impending load transition from a first load state to a second load state due to a change in the oil field operations;
        assigning a cost to each of a plurality of ESG-environmental, social, governance (ESG) emissions components of the system; wherein a cost for each ESG component is based at least in part on a geometry and at least one tool associated with an oil field operation of the oil fields operations or of an operation of the historical load profile;
        determining a minimum cost for power generation based at least in part on the cost of each of the plurality of ESG components; and
        adjusting the power generation to operate with the minimum cost.

2. The system of claim 1, further comprising determining one or more actions based on a plurality of factors to optimize power generation and load requirements for the drilling rig, wherein the one or more actions delay one or more of the oil field operations that cause a spike in the current electrical power requirements.

3. The system of claim 1, further comprising determining one or more actions based on a plurality of factors to optimize power generation and load requirements for the drilling rig, wherein the one or more actions reduce a power requirement of an electrical power driven system until a generator is activated or a power storage device is charged above a threshold power level.

4. The system of claim 1, further comprising determining one or more actions based on a plurality of factors to optimize power generation and load requirements for the drilling rig, wherein the one or more actions include adjusting the current power generation capacity in anticipation of a pending load transition.

5. The system of claim 4, wherein the adjusting the current power generation capacity includes reducing an output of a power generation system when the pending load transition is to a state of lower current requirement.

6. The system of claim 4, wherein the adjusting the current power generation capacity includes increasing an output of a power generation system when the pending load transition is to a state of higher current requirements.

7. The system of claim 1, further comprising
determining a set of options for each of the current field operations and each operation of the stored historical load profiles;
assigning a cost to each option of each set of options; and
generating a solution from each set of options, wherein the solution comprises a lowest cost of each option of each set of options.

8. The system of claim 7, further comprising:
applying a resistive load to convert unnecessary electrical power into heat.

9. The system of claim 7, further comprising:
diverting excess power capacity to other electrical systems without passing through a power storage device.

10. The system of claim 7, further comprising:
determining that the current or the projected electrical power requirements will exceed the current power generation capacity.

11. A method for electrical power generation and control comprising:
receiving, at a controller, information regarding current electrical power requirements for a drilling rig based at least in part on oil field operations;
receiving, at the controller, information regarding projected electrical power requirements for the drilling rig based at least in part on the oil field operations, wherein the projected electrical power requirements comprise anticipated downhole tool stalling;
determining a current power generation capacity for at least two different electrical power sources comprising one or more generators, one or more batteries, or one or more regenerative power units;
assigning a cost to each of a plurality of ESG-environmental, social, governance (ESG) emissions components of the system; wherein a cost for each ESG component is based at least in part on a geometry and at least one tool associated with an oil field operation of the oil fields operations or of an operation of the historical load profile;
determining a minimum cost for power generation based at least in part on the cost of each of the plurality of ESG components; and
adjusting the power generation to operate with the minimum cost.

12. The method of claim 11, wherein the projected electrical power requirements for the drilling rig is based at least in part on stored historical load profiles.

13. The method of claim 11, further comprising generating, by the controller, power using regenerative power techniques by converting kinetic energy of the drilling rig into electrical energy for charging a power storage device of the drilling rig.

14. The method of claim 11, further comprising:
determining, by the controller, a time for generating power using regenerative power techniques based at least in part in current operations or forecast operations of an oil field.

15. The method of claim 13, further comprising:
adjusting, by the controller, generator output during a time for generating power using regenerative power techniques.

16. The method of claim 11, further comprising:
determining, by the controller, a charge state of a power storage device prior to generating power using regenerative power techniques;
comparing, by the controller, the charge state of the power storage device with a charge threshold; and
ceasing, by the controller, the generating power using the regenerative power techniques if the charge state of the power storage device exceeds the charge threshold.

17. The method of claim 15, further comprising:
applying, by the controller, a resistive load to convert unnecessary electrical power into heat.

18. The method of claim 15, further comprising:
diverting, by the controller, excess power capacity to other electrical systems without passing through the power storage device.

19. The method of claim 11, further comprising:
determining, by the controller, that the current electrical power requirements or the projected electrical power requirements will exceed the current power generation capacity.

* * * * *